United States Patent
Nosaka et al.

(10) Patent No.: US 12,054,611 B2
(45) Date of Patent: Aug. 6, 2024

(54) POLY(PHENYLENE ETHER), CURABLE COMPOSITION CONTAINING POLY(PHENYLENE ETHER), DRY FILM, PREPREG, CURED OBJECT, LAMINATE, AND ELECTRONIC COMPONENT

(71) Applicant: TAIYO HOLDINGS CO., LTD., Hiki-gun (JP)

(72) Inventors: Mami Nosaka, Hiki-gun (JP); Satoko Matsumura, Hiki-gun (JP); Nobuhiro Ishikawa, Hiki-gun (JP); Toshiaki Masuda, Hiki-gun (JP)

(73) Assignee: TAIYO HOLDINGS CO., LTD., Hiki-gun (JP)

( * ) Notice: Subject to any disclaimer, the term of this patent is extended or adjusted under 35 U.S.C. 154(b) by 852 days.

(21) Appl. No.: 17/259,463

(22) PCT Filed: Jul. 17, 2019

(86) PCT No.: PCT/JP2019/028180
§ 371 (c)(1),
(2) Date: Jan. 11, 2021

(87) PCT Pub. No.: WO2020/017570
PCT Pub. Date: Jan. 23, 2020

(65) Prior Publication Data
US 2021/0301129 A1    Sep. 30, 2021

(30) Foreign Application Priority Data

Jul. 17, 2018 (JP) .................................. 2018-134338
Sep. 28, 2018 (JP) .................................. 2018-185476
(Continued)

(51) Int. Cl.
C08L 71/12    (2006.01)
C08G 65/44    (2006.01)
(Continued)

(52) U.S. Cl.
CPC .............. *C08L 71/12* (2013.01); *C08G 65/44* (2013.01); *C08G 65/485* (2013.01); *C08J 5/18* (2013.01);
(Continued)

(58) Field of Classification Search
CPC .............................. C08G 65/44; C08G 65/485
See application file for complete search history.

(56) References Cited

U.S. PATENT DOCUMENTS

| | | | | |
|---|---|---|---|---|
| 5,945,253 A | * | 8/1999 | Narang | B41J 2/1632 |
| | | | | 430/311 |
| 2003/0162006 A1 | * | 8/2003 | Ikeguchi | H05K 3/4655 |
| | | | | 428/473.5 |

(Continued)

FOREIGN PATENT DOCUMENTS

| | | | |
|---|---|---|---|
| CN | 1231 486 A | | 10/1999 |
| CN | 102167823 A | * | 8/2011 |

(Continued)

OTHER PUBLICATIONS

International Preliminary Report on Patentability and Written Opinion issued Jan. 28, 2021 in PCT/JP2019/028180 (submitting English translation only), 18 pages.

(Continued)

*Primary Examiner* — Michael M Dollinger
(74) *Attorney, Agent, or Firm* — Oblon, McClelland, Maier & Neustadt, L.L.P.

(57) ABSTRACT

The present invention provides a poly(phenylene ether) which retains low-dielectric characteristics and is soluble in various solvents. The poly(phenylene ether) is characterized by being obtained from one or more raw-material phenols including a phenol satisfying at least Requirement 1 (to have (Continued)

hydrogen atoms in the ortho and para positions) and by having a slope calculated from a conformational plot of less than 0.6.

19 Claims, 1 Drawing Sheet

(30) Foreign Application Priority Data

| Sep. 28, 2018 | (JP) | 2018-185477 |
|---|---|---|
| Nov. 27, 2018 | (JP) | 2018-221566 |
| Nov. 27, 2018 | (JP) | 2018-221567 |
| Dec. 10, 2018 | (JP) | 2018-231211 |
| Dec. 10, 2018 | (JP) | 2018-231212 |
| Feb. 28, 2019 | (JP) | 2019-036181 |
| Feb. 28, 2019 | (JP) | 2019-036182 |
| Feb. 28, 2019 | (JP) | 2019-036183 |
| Mar. 11, 2019 | (JP) | 2019-043573 |
| May 31, 2019 | (JP) | 2019-103234 |

(51) Int. Cl.

| C08G 65/48 | (2006.01) |
|---|---|
| C08J 5/18 | (2006.01) |
| C08J 5/24 | (2006.01) |
| C08K 3/36 | (2006.01) |
| C08K 7/02 | (2006.01) |
| C08L 63/00 | (2006.01) |
| C08L 79/04 | (2006.01) |

(52) U.S. Cl.
CPC ............. *C08J 5/244* (2021.05); *C08J 5/245* (2021.05); *C08J 5/249* (2021.05); *C08K 3/36* (2013.01); *C08K 7/02* (2013.01); *C08L 63/00* (2013.01); *C08L 79/04* (2013.01); *C08K 2201/011* (2013.01); *C08L 2203/20* (2013.01); *C08L 2205/03* (2013.01)

(56) References Cited

U.S. PATENT DOCUMENTS

| 2004/0265595 | A1* | 12/2004 | Tokiwa | C08G 65/485 |
|---|---|---|---|---|
| | | | | 525/396 |
| 2007/0135609 | A1 | 6/2007 | Carrillo et al. | |
| 2007/0213499 | A1 | 9/2007 | Uera et al. | |
| 2009/0018303 | A1* | 1/2009 | Onizuka | C08G 59/621 |
| | | | | 528/110 |
| 2009/0247724 | A1 | 10/2009 | Carrillo et al. | |
| 2012/0189859 | A1* | 7/2012 | Nozaki | H05K 1/0346 |
| | | | | 428/458 |
| 2022/0380538 | A1* | 12/2022 | Nosaka | B32B 5/00 |

FOREIGN PATENT DOCUMENTS

| JP | 50-117897 A | 9/1975 |
|---|---|---|
| JP | 56-120729 A | 9/1981 |
| JP | 57-109826 A | 7/1982 |
| JP | 4-234430 A | 8/1992 |
| JP | 2000-104014 A | 4/2000 |
| JP | 2004-339342 A | 12/2004 |
| JP | 2006-057079 A | 3/2006 |
| JP | 2006-316091 A | 11/2006 |
| JP | 2007-45943 A | 2/2007 |
| JP | 2007-70598 A | 3/2007 |
| JP | 2007-166985 A | 7/2007 |
| JP | 2008-232721 A | 10/2008 |
| JP | 2009046631 A * | 3/2009 |
| JP | 2009-518521 A | 5/2009 |
| JP | 2015-90954 A | 5/2015 |
| JP | 2018-115225 A | 7/2018 |
| JP | 2018-131519 A | 8/2018 |
| KR | 1999-0083015 A | 11/1999 |
| MY | 121055 A | 12/2005 |

OTHER PUBLICATIONS

Japanese Office Action issued on Mar. 22, 2023 in the corresponding Japanese Patent Application No. 2019-132323 (with Unedited Computer Generated English Translation) citing references 15 and 16 therein, 5 pages.

Japanese Office Action issued on Mar. 22, 2023 in the corresponding Japanese Patent Application No. 2019-132320 (with Unedited Computer Generated English Translation) citing references 15 and 17-19 therein, 10 pages.

Japanese Office Action issued on Mar. 22, 2023 in the corresponding Japanese Patent Application No. 2019-132318 (with Unedited Computer Generated English Translation) citing reference 15 therein, 10 pages.

International Search Report issued Oct. 15, 2019 in PCT/JP2019/028180 filed Jul. 17, 2019, citing documents AA-AC, AJ-AO and AS-AV therein, 2 pages.

Nunoshige, J. et al., "Efficient Oxidative Coupling Polymerization for Synthesis of Thermosetting Poly(phenylene ether) Copolymer with a Low Dielectric Loss", Journal of Polymer Science: Part A: Polymer Chemistry, DOI:10.1002/pola, vol. 46, 2008, pp. 5278-3223.

\* cited by examiner

POLY(PHENYLENE ETHER), CURABLE COMPOSITION CONTAINING POLY(PHENYLENE ETHER), DRY FILM, PREPREG, CURED OBJECT, LAMINATE, AND ELECTRONIC COMPONENT

TECHNICAL FIELD

The present invention relates to a poly(phenylene ether), and further relates to a curable composition containing the poly(phenylene ether), a dry film, a prepreg, a cured product, a laminate, and an electronic component.

BACKGROUND ART

Along with widespread of millimeter-wave radars and the like for high-capacity and high-speed communication typified by the 5th generation communication system (5G) or advanced driver assistance system (ADAS) of automobiles, higher frequency of signals of communication equipment is progressing.

However, in the case of using an epoxy resin or the like as a wiring board material, since a relative dielectric constant (Dk) and a dielectric loss tangent (Df) are not sufficiently low, transmission loss derived from dielectric loss increases as the frequency becomes higher, and thus problems such as signal attenuation and heat generation have arisen. Therefore, a poly(phenylene ether) excellent in low-dielectric characteristics has been used.

Furthermore, Non Patent Literature 1 has proposed poly(phenylene ether) in which heat resistance is improved by introducing an allyl group into the molecule of the poly(phenylene ether) to become a thermosetting resin.

CITATION LIST

Non Patent Literature

Non Patent Literature 1: J. Nunoshige, H. Akahoshi, Y. Shibasaki, M. Ueda, J. Polym. Sci. Part A: Polym. Chem. 2008, 46, 5278-3223.

SUMMARY OF INVENTION

Technical Problem

However, there is a limitation of solvents in which the poly(phenylene ether) is soluble, and the poly(phenylene ether) obtained by the method of Non Patent Literature 1 is also soluble only in a highly toxic solvent such as chloroform or toluene. Therefore, there are problems in that a resin varnish is difficult to handle and exposure to a solvent in a step of forming a coating film for a wiring board and curing the coating film is difficult to manage.

In this regard, an object of the present invention is to provide a poly(phenylene ether) which retains low-dielectric characteristics and is soluble in various solvents (an organic solvent other than a highly toxic organic solvent, for example, cyclohexanone).

Solution to Problem

The present inventors have conducted intensive studies for achieving the above-described object, and as a result, found that, when a specific phenol is used as a raw material for a poly(phenylene ether) and the obtained poly(phenylene ether) has specific properties, the above-described problems can be solved, thereby completing the present invention. That is, the present invention is as follows.

The present invention (1) is
a poly(phenylene ether) characterized by being obtained from one or more raw-material phenols including a phenol satisfying at least Requirement 1 and by having a slope calculated from a conformational plot of less than 0.6.
(Requirement 1)
To have hydrogen atoms in the ortho and para positions
The poly(phenylene ether) may be
a terminal-modified poly(phenylene ether) in which a terminal hydroxyl group is modified.
The poly(phenylene ether) may include, as the raw-material phenols,
the phenol satisfying at least Requirement 1, and
a phenol that is a polyhydric phenol having two or more phenolic hydroxyl groups in a molecular structure and does not have a hydrogen atom in the ortho position of the phenolic hydroxyl group.
The raw-material phenol may include
a phenol (A) satisfying at least both Requirement 1 below and Requirement 2 below, or
a mixture of a phenol (B) satisfying at least Requirement 1 below but not satisfying Requirement 2 below and a phenol (C) not satisfying Requirement 1 below but satisfying Requirement 2 below.
(Requirement 1)
To have hydrogen atoms in the ortho and para positions
(Requirement 2)
To have a hydrogen atom in the para position and have a functional group containing an unsaturated carbon bond
The poly(phenylene ether) may be
a side-chain epoxidized poly(phenylene ether) in which a part or the whole of the unsaturated carbon bond derived from the raw-material phenol (A) or the raw-material phenol (C) is epoxidized.
The present invention (2) is
a curable composition characterized by containing the poly(phenylene ether) of the above-described invention (1) and by satisfying one or more of (i) to (vi) below:
(i) to contain silica;
(ii) to contain a cellulose nanofiber;
(iii) to contain a phosphorus compound incompatible with the poly(phenylene ether);
(iv) to contain an epoxy resin and an elastomer having a reactive functional group that reacts with an epoxy group;
(v) to contain a cyanate ester resin; and
(vi) to contain an elastomer and a dispersant.
Incidentally, the curable composition of the present invention (2) may satisfy only any one of (i) to (vi) and may satisfy arbitrary two or more of (i) to (vi).
The present invention (3) is
a dry film or prepreg characterized by being obtained by applying the curable composition of the above-described invention (2) to a base material.
The present invention (4) is
a cured product characterized by being obtained by curing the curable composition of the above-described invention (2).
The present invention (5) is
a laminate characterized by including the cured product of the above-described invention (4).
The present invention (6) is
an electronic component characterized by including the cured product of the above-described invention (4).

Advantageous Effects of Invention

According to the present invention, it is possible to provide a poly(phenylene ether) which retains low-dielectric characteristics and is soluble in various solvents.

DESCRIPTION OF EMBODIMENTS

Figure 1:
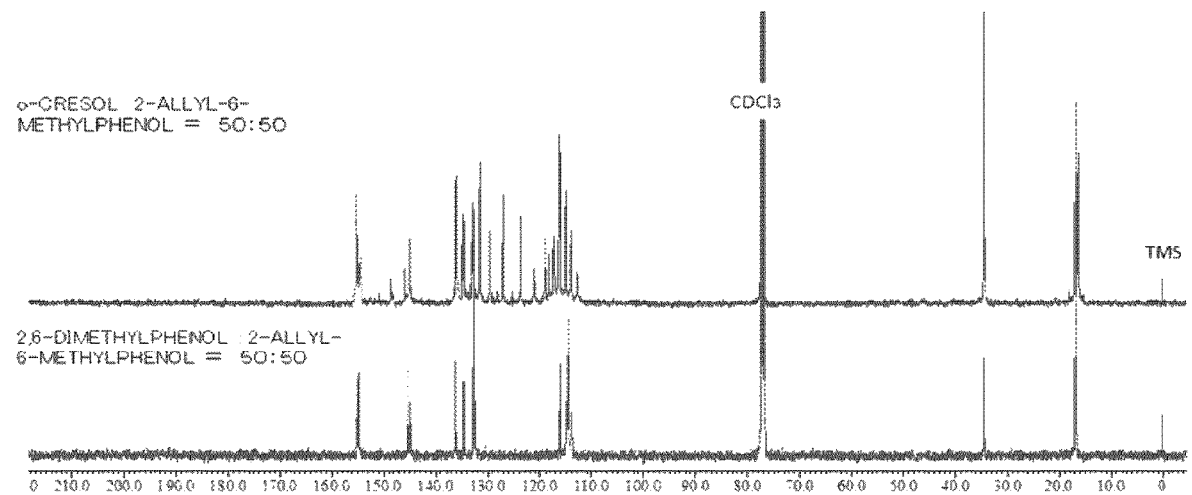
FIG. 1 shows NMR analysis results of a poly(phenylene ether).

In the present specification, the entire contents of Japanese Patent Application Nos. 2018-134338, 2018-185476, 2018-185477, 2018-221566, 2018-221567, 2018-231211, 2018-231212, 2019-036181, 2019-036182, 2019-036183, 2019-043573, and 2019-103234 are hereby incorporated by reference.

Hereinafter, a poly(phenylene ether) and a curable composition containing a poly(phenylene ether) will be described; however, the present invention is not limited to embodiments specifically described below. Specifically, respective configuration requirements related to the poly(phenylene ether) and the curable composition exemplified in the present specification can be appropriately and freely combined in a range not contradictory, and another poly(phenylene ether) and another curable composition can be produced. More specifically, it should be construed that all combinations of respective configuration requirements (described matters) of specific raw materials for obtaining a poly(phenylene ether), modification of a poly(phenylene ether) by specific components, and a curable composition containing these poly(phenylene ethers) and specific additional components are substantially disclosed in the present specification.

Incidentally, in a case where the compounds described have isomers, unless otherwise specified, all isomers that may be present can be used in the present invention.

Furthermore, in the present invention, the term "unsaturated carbon bond" indicates an ethylenic or acetylenic carbon-carbon multiple bond (a double bond or a triple bond) unless otherwise specified.

In the present invention, phenols that are used as raw materials for the poly(phenylene ether) (PPE) and may be constituent units of the poly(phenylene ether) are collectively referred to as "raw-material phenols".

In the present invention, in the case of expressing the "ortho position", the "para position", and the like when raw-material phenols are described, unless otherwise specified, these expressions are based on the position of a phenolic hydroxyl group (ipso position).

In the present invention, the case of simply expressing the "ortho position indicates "at least one of the ortho positions" and the like. Therefore, in the case of simply expressing the "ortho position", it may be interpreted that it indicates any one of the ortho positions and both the ortho positions as long as inconsistency does not occur.

In the present invention, the expression "not containing a component" indicates that the component is contained in a content or less in which the component being blended based on technical intention can be determined, and preferably indicates that the content of the component is equal to or less than an inevitably content.

In the present invention, a poly(phenylene ether) in which a part or the whole of the functional group (for example, a hydroxyl group, a functional group containing an unsaturated carbon bond, or the like) of the poly(phenylene ether) is modified is simply expressed as the "poly(phenylene ether)" in some cases. Therefore, in the case of expression as "poly(phenylene ether)", both of an unmodified poly(phenylene ether) and a modified poly(phenylene ether) are included as long as inconsistency does not occur particularly.

In the present specification, the case of separately describing an upper limit value and a lower limit value in a numerical range means that all combinations of each lower limit value and each upper limit value are substantively described in a range not contradictory.

Incidentally, in this application, when simply expressing "phenol", the phenol generally means a phenol that is not a polyhydric phenol, that is, a monohydric phenol, but may include a polyhydric phenol according to circumstances.

Hereinafter, the poly(phenylene ether) and the curable composition containing a poly(phenylene ether) (also simply expressed as the composition) will be described.

<<<<Poly(phenylene ether)>>>>

Hereinafter, a poly(phenylene ether) having a predetermined branched structure according to the present invention is expressed as a predetermined poly(phenylene ether) or a branched poly(phenylene ether) in some cases. Furthermore, a poly(phenylene ether) not having a predetermined branched structure is expressed as a linear poly(phenylene ether) in some cases.

<<<<Basic Predetermined poly(phenylene ether)>>>>

The predetermined poly(phenylene ether) is obtained from a phenol satisfying Requirement 1 below. More specifically, the predetermined poly(phenylene ether) is obtained by oxidation-polymerizing a raw-material phenol including a phenol satisfying Requirement 1 below as an essential component.

(Requirement 1)

To have hydrogen atoms in the ortho and para positions

The phenol satisfying Requirement 1 {for example, a phenol (A) and a phenol (B) described below} has a hydrogen atom in the ortho position, and thus, at the time of oxidation polymerization with the phenol, an ether bond is likely to be formed not only in the ipso position and the para position but also in the ortho position, and thereby a branched structure can be formed.

A phenol not satisfying Requirement 1 {for example, a phenol (C) and a phenol (D) described below} forms an ether bond in the ipso position and the para position and is linearly polymerized when being oxidation-polymerized.

As such, a part of the structure of the predetermined poly(phenylene ether) is branched by a benzene ring to which at least three positions of the ipso position, the ortho position, and the para position are ether-bonded. It is considered that the predetermined poly(phenylene ether) is, for example, a compound that is a poly(phenylene ether) having at least a branched structure represented by Formula (100) in the skeleton.

[Chemical Formula 1]

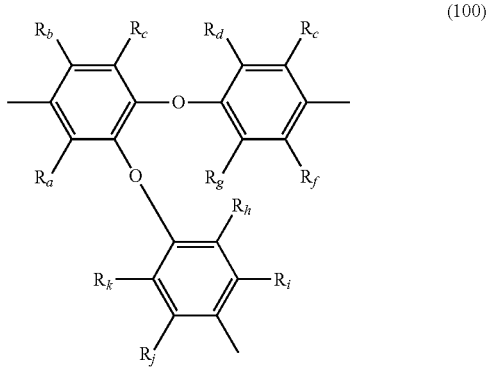

In Formula (100), $R_a$ to $R_k$ are a hydrogen atom or a hydrocarbon group having 1 to 15 carbon atoms (preferably, 1 to 12 carbon atoms).

The raw-material phenol may include other phenols not satisfying Requirement 1 within the range that would not impair the effects of the present invention.

Examples of the other phenols include phenols (C) and phenols (D) described below and a phenol not having a hydrogen atom in the para position. In order to increase the molecular weight of the poly(phenylene ether), it is preferable that the poly(phenylene ether) further includes the phenol (C) and the phenol (D) as raw-material phenols.

A particularly preferred poly(phenylene ether) is a poly(phenylene ether) composed of one or more raw-material phenols including a phenol (A) satisfying at least both Requirement 1 below and Requirement 2 below, or a mixture of a phenol (B) satisfying at least Requirement 1 below but not satisfying Requirement 2 below and a phenol (C) not satisfying Requirement 1 below but satisfying Requirement 2 below. As described below, the preferred poly(phenylene ether) has an unsaturated carbon bond at the side chain. At the time of curing, this unsaturated carbon bond makes three-dimensional cross-linking possible. As a result, heat resistance and solvent resistance are extremely excellent.

Specifically, the predetermined poly(phenylene ether) is obtained by oxidation-polymerizing (Embodiment 1) a raw-material phenol including a phenol (A) satisfying at least both of Requirement 1 below and Requirement 2 below as an essential component, or (Embodiment 2) a raw-material phenol including a mixture of a phenol (B) satisfying at least Requirement 1 below but not satisfying Requirement 2 below and a phenol (C) not satisfying Requirement 1 below but satisfying Requirement 2 below as an essential component.

(Requirement 1)
To have hydrogen atoms in the ortho and para positions (Requirement 2)
To have a hydrogen atom in the para position and have a functional group containing an unsaturated carbon bond The phenol satisfying Requirement 2 {for example, the phenol (A) and the phenol (C)} has at least a hydrocarbon group containing an unsaturated carbon bond. Therefore, the poly(phenylene ether) synthesized by using the phenol satisfying Requirement 2 as a raw material has a hydrocarbon group containing an unsaturated carbon bond as a functional group, and thereby has a crosslinking property. Further, in a case where the poly(phenylene ether) has such a hydrocarbon group containing an unsaturated carbon bond, modification to a side-chain epoxidized poly(phenylene ether) described below can be executed.

As such, a part of the structure of the preferred predetermined poly(phenylene ether) is branched by a benzene ring to which at least three positions of the ipso position, the ortho position, and the para position are ether-bonded. It is considered that the poly(phenylene ether) is, for example, a poly(phenylene ether) having at least a branched structure represented by Formula (100) in the skeleton, and is a compound having a hydrocarbon group containing at least one unsaturated carbon bond as a functional group. That is, at least one of $R_a$ to $R_k$ in the above Formula (100) is a hydrocarbon group having an unsaturated carbon bond.

Next, Embodiment 1 described above may be an embodiment further including a phenol (B) and/or a phenol (C) as raw-material phenols. Furthermore, Embodiment 2 described above may be an embodiment further including a phenol (A) as a raw-material phenol.

Furthermore, the raw-material phenol may include other phenols within the range that would not impair the effects of the present invention.

As other phenols, for example, a phenol (D) that is a phenol having a hydrogen atom in the para position, not having a hydrogen atom in the ortho position, and not having a functional group containing an unsaturated carbon bond is exemplified.

In both Embodiment 1 and Embodiment 2 described above, in order to increase the molecular weight of the poly(phenylene ether), it is preferable that the poly(phenylene ether) further includes the phenol (D) as a raw-material phenol.

In Embodiment 2 described above, the poly(phenylene ether) is most preferably an embodiment further including the phenol (D) as a raw-material phenol.

Moreover, in the above-described Embodiment 2, from industrial and economic viewpoints, it is preferable that the phenol (B) is at least any one of o-cresol, 2-phenylphenol, 2-dodecylphenol, and phenol, and the phenol (C) is 2-allyl-6-methylphenol.

Hereinafter, the phenols (A) to (D) will be described in more detail.

The phenol (A) is a phenol satisfying both Requirement 1 and Requirement 2 as described above, that is, a phenol having hydrogen atoms in the ortho and para positions and having a functional group containing an unsaturated carbon bond, and is preferably a phenol (a) represented by Formula (1) below.

[Chemical Formula 2]

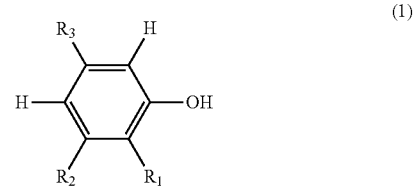

In Formula (1), $R_1$ to $R_3$ are a hydrogen atom or a hydrocarbon group having 1 to 15 carbon atoms. However, at least one of $R_1$ to $R_3$ is a hydrocarbon group having an unsaturated carbon bond. Incidentally, from the viewpoint of easily performing polymerization upon oxidation polymerization, the number of carbon atoms of the hydrocarbon group is preferably 1 to 12.

Examples of the phenol (a) represented by Formula (1) include o-vinylphenol, m-vinylphenol, o-allylphenol, m-allylphenol, 3-vinyl-6-methylphenol, 3-vinyl-6-ethylphenol, 3-vinyl-5-methylphenol, 3-vinyl-5-ethylphenol, 3-allyl-6-methylphenol, 3-allyl-6-ethylphenol, 3-allyl-5-methylphenol, and 3-allyl-5-ethylphenol. Only one kind of the phenol represented by Formula (1) may be used, or two or more kinds thereof may be used.

The phenol (B) is a phenol satisfying Requirement 1 but not satisfying Requirement 2 as described above, that is, a phenol having hydrogen atoms in the ortho and para positions and not having a functional group containing an unsaturated carbon bond, and is preferably a phenol (b) represented by Formula (2) below.

[Chemical Formula 3]

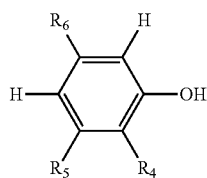

(2)

In Formula (2), $R_4$ to $R_6$ are a hydrogen atom or a hydrocarbon group having 1 to 15 carbon atoms. However, $R_4$ to $R_6$ do not have an unsaturated carbon bond. Incidentally, from the viewpoint of easily performing polymerization upon oxidation polymerization, the number of carbon atoms of the hydrocarbon group is preferably 1 to 12.

Examples of the phenol (b) represented by Formula (2) include phenol, o-cresol, m-cresol, o-ethylphenol, m-ethylphenol, 2,3-xylenol, 2,5-xylenol, 3,5-xylenol, o-tert-butylphenol, m-tert-butylphenol, o-phenylphenol, m-phenylphenol, and 2-dodecylphenol. Only one kind of the phenol represented by Formula (2) may be used, or two or more kinds thereof may be used.

The phenol (C) is a phenol not satisfying Requirement 1 but satisfying Requirement 2 as described above, that is, a phenol having a hydrogen atom in the para position, not having a hydrogen atom in the ortho position, and having a functional group containing an unsaturated carbon bond, and is preferably a phenol (c) represented by Formula (3) below.

[Chemical Formula 4]

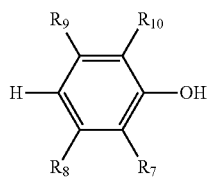

(3)

In Formula (3), $R_7$ and $R_{10}$ are a hydrocarbon group having 1 to 15 carbon atoms, and $R_8$ and $R_9$ are a hydrogen atom or a hydrocarbon group having 1 to 15 carbon atoms. However, at least one of $R_7$ to $R_{10}$ is a hydrocarbon group having an unsaturated carbon bond. Incidentally, from the viewpoint of easily performing polymerization upon oxidation polymerization, the number of carbon atoms of the hydrocarbon group is preferably 1 to 12.

Examples of the phenol (c) represented by Formula (3) include 2-allyl-6-methylphenol, 2-allyl-6-ethylphenol, 2-allyl-6-phenylphenol, 2-allyl-6-styrylphenol, 2,6-divinylphenol, 2,6-diallylphenol, 2,6-diisopropenylphenol, 2,6-dibutenylphenol, 2,6-diisobutenylphenol, 2,6-diisopentenylphenol, 2-methyl-6-styrylphenol, 2-vinyl-6-methylphenol, and 2-vinyl-6-ethylphenol. Only one kind of the phenol represented by Formula (3) may be used, or two or more kinds thereof may be used.

As described above, the phenol (D) is a phenol having a hydrogen atom in the para position, not having a hydrogen atom in the ortho position, and not having a functional group containing an unsaturated carbon bond, and a phenol (d) represented by Formula (4) below is preferred.

[Chemical Formula 5]

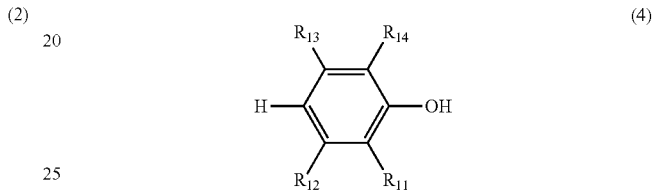

(4)

In Formula (4), $R_{11}$ and $R_{14}$ are a hydrocarbon group having 1 to 15 carbon atoms and not having an unsaturated carbon bond, and $R_{12}$ and $R_{13}$ are a hydrogen atom or a hydrocarbon group having 1 to 15 carbon atoms and not having an unsaturated carbon bond. Incidentally, from the viewpoint of easily performing polymerization upon oxidation polymerization, the number of carbon atoms of the hydrocarbon group is preferably 1 to 12.

Examples of the phenol (d) represented by Formula (4) include 2,6-dimethylphenol, 2,3,6-trimethylphenol, 2-methyl-6-ethylphenol, 2-ethyl-6-n-propylphenol, 2-methyl-6-n-butylphenol, 2-methyl-6-phenylphenol, 2,6-diphenylphenol, and 2,6-ditolylphenol. Only one kind of the phenol represented by Formula (4) may be used, or two or more kinds thereof may be used.

Herein, in the present invention, examples of the hydrocarbon group include an alkyl group, a cycloalkyl group, an aryl group, an alkenyl group, and an alkynyl group, and an alkyl group, an aryl group, and an alkenyl group are preferred. Examples of the hydrocarbon group having an unsaturated carbon bond include an alkenyl group and an alkynyl group. Incidentally, these hydrocarbon groups may be linear or branched.

Moreover, as other phenols, phenols not having a hydrogen atom in the para position, and the like may be included.

The proportion of the phenol satisfying Requirement 1 with respect to the total of the raw-material phenols is preferably 1 to 50 mol %.

The phenol satisfying Requirement 2 may not be used, but when it is used, the proportion of the phenol satisfying Requirement 2 with respect to the total of the raw-material phenols is preferably 0.5 to 99 mol % and more preferably 1 to 99 mol %.

The number average molecular weight of the poly(phenylene ether) obtained by oxidation-polymerizing the raw-material phenols as described above by a conventionally known method is preferably 2,000 to 30,000, more preferably 5,000 to 30,000, further preferably 8,000 to 30,000, and particularly preferably 8,000 to 25,000. Moreover, the polydispersity index (PDI: weight average molecular weight/number average molecular weight) of the poly(phenylene ether) is preferably 1.5 to 20.

In the present invention, the number average molecular weight and the weight average molecular weight are measured by gel permeation chromatography (GPC) and converted based on a calibration curve produced using standard polystyrene.

The hydroxyl value of the poly(phenylene ether) may be 7.0 or more in a case where the number average molecular weight (Mn) is 10,000 or more. In other words, in a case where the number average molecular weight (Mn) is 5,000 or more, the hydroxyl value of the poly(phenylene ether) may be 14.0 or more, and in a case where the number average molecular weight (Mn) is 20,000 or more, the hydroxyl value thereof may be 3.5 or more.

The solution viscosity of the poly(phenylene ether) is preferably 250 or less (P) in a case where the weight average molecular weight (Mw) is 130,000 or more and the concentration in the case of being dissolved with respect to chloroform is 0.5 (g/mL). Furthermore, in a case where the weight average molecular weight (Mw) is 35,000 or more and the concentration is 0.5 (g/mL), the solution viscosity is preferably 250 or less (P).

1 g of the predetermined poly(phenylene ether) is soluble preferably in 100 g of cyclohexanone (more preferably, in 100 g of cyclohexanone, DMF, and PMA) at 25° C. Incidentally, 1 g of the predetermined poly(phenylene ether) being soluble in 100 g of a solvent (for example, cyclohexanone) indicates that, when 1 g of the poly(phenylene ether) is mixed with 100 g of a solvent, turbidity and precipitation cannot be confirmed by visual inspection. It is more preferable that 1 g or more of the predetermined poly(phenylene ether) is soluble in 100 g of cyclohexanone at 25° C.

The predetermined poly(phenylene ether) has a branched structure, and thereby solubility in various solvents and compatibility with other components in the composition are improved. Therefore, the respective components of the composition are homogeneously dissolved or dispersed so that a homogeneous cured product can be obtained. As a result, this cured product is extremely excellent in heat resistance, a tensile strength, and solvent resistance. In particular, the preferred predetermined poly(phenylene ethers) (branched poly(phenylene ethers) containing an unsaturated carbon bond) can be cross-linked to each other or can be cross-linked to other components containing an unsaturated carbon bond. As a result, the heat resistance, and the like of a cured product to be obtained become more satisfactory.

<<<Predetermined poly(phenylene ether) not Containing Unsaturated carbon Bond>>>

The predetermined poly(phenylene ether) may be a predetermined poly(phenylene ether) not containing an unsaturated carbon bond. That is, the predetermined poly(phenylene ether) may be a poly(phenylene ether) obtained from one or more raw-material phenols including a phenol satisfying at least Requirement 1 and not including a phenol satisfying Requirement Z below.

(Requirement Z)

To include a functional group having an unsaturated carbon bond

The predetermined poly(phenylene ether) not containing an unsaturated carbon bond includes a phenol satisfying Requirement 1 but not satisfying Requirement Z {for example, the phenol (B)} as an essential component. The predetermined poly(phenylene ether) not containing a saturated carbon bond may include another phenol not satisfying Requirement Z as a further raw-material phenol. As other phenols not satisfying Requirement Z, for example, a phenol (D) that is a phenol having a hydrogen atom in the para position, not having a hydrogen atom in the ortho position, and not having a functional group containing an unsaturated carbon bond, a phenol not having a hydrogen atom in the para position and not having a functional group containing an unsaturated carbon bond, and the like are exemplified. In order to increase the molecular weight of the poly(phenylene ether), it is preferable that the predetermined poly(phenylene ether) not containing an unsaturated carbon bond further includes the phenol (D) as a raw-material phenol.

In particular, in such a predetermined poly(phenylene ether) not containing an unsaturated carbon bond, the terminal hydroxyl group is preferably modified into a functional group having an unsaturated carbon bond by using a compound for modification described below, or the like. The terminal-modified poly(phenylene ether) obtained in this way does not include the phenol satisfying Requirement Z as a raw-material phenol, and thus an unsaturated carbon bond is not introduced into the side chain. A part or the whole of the terminal hydroxyl group of the poly(phenylene ether) obtained by oxidation polymerization of the raw-material phenols is modified into a functional group having an unsaturated carbon bond, and thereby curing property is imparted. As a result, degradation of low-dielectric characteristics, light resistance, and environment resistance due to the terminal hydroxyl group is suppressed, the unsaturated carbon bond at the terminal site has excellent reactivity, and thereby a high strength and excellent crack resistance as a cured product with a crosslinking curing agent described below are obtained.

In a case where the predetermined poly(phenylene ether) does not contain an unsaturated carbon bond, the phenol satisfying Requirement 1 but not satisfying Requirement Z with respect to the total of the raw-material phenols is, for example, 10 mol % or more.

Herein, examples of the hydrocarbon group not containing a functional group having an unsaturated carbon bond include an alkyl group, a cycloalkyl group, an aryl group, an alkenyl group, and an alkynyl group. Incidentally, these hydrocarbon groups may be linear or branched.

<<<Predetermined poly(phenylene ether) Including polyhydric phenol as Raw Material>>>

Herein, the predetermined poly(phenylene ether) may include a predetermined polyhydric phenol as a raw material in addition to the raw-material phenols described above. More specifically, the predetermined poly(phenylene ether) may be obtained from a polymerization solution containing a predetermined polyhydric phenol (the polymerization solution will be described below). The predetermined polyhydric phenol is a compound having at least two (preferably two) phenolic hydroxyl groups in the molecular structure and not having a hydrogen atom in the whole ortho position of the at least two phenolic hydroxyl groups.

The phenolic hydroxyl group of the polyhydric phenol yields a polymerization reaction, and thereby a poly(phenylene ether) chain having the branched structure as described above is added to both ends of the polyhydric phenol and/or the skeleton of the poly(phenylene ether) is grown. As a result, a poly(phenylene ether) having a complicated structure (having a high degree of branching) as compared to a conventional case, and thus solubility in cyclohexanone or the like is improved. Furthermore, since the poly(phenylene ether) chain is present in both ends of the polyhydric phenol, the number of terminal hydroxyl groups is increased as compared to the case not using the polyhydric phenol. This is advantageous in a case where a poly(phenylene ether) is modified by modifying a terminal hydroxyl group.

It is preferable that the predetermined polyhydric phenol does not have a hydrogen atom in the para position of the at least two phenolic hydroxyl groups. Since the predetermined polyhydric phenol does not have a hydrogen atom in the para position, the reaction is easily controlled, and the molecular weight of a poly(phenylene ether) to be obtained is easily increased.

The predetermined polyhydric phenol has two or more phenolic hydroxyl groups in the molecular structure and does not have a hydrogen atom in the ortho position of the phenolic hydroxyl groups. It is preferable that the predetermined polyhydric phenol does not have a hydrogen atom in the para position of the phenolic hydroxyl groups. For example, a polyhydric phenol (e) represented by Formula (9) below or a polyhydric phenol (f) represented by Formula (10) below are mentioned.

[Chemical Formula 6]

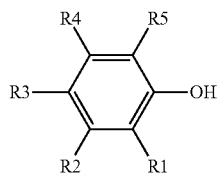

(9)

In Formula (9), R1 to R5 are a hydrogen atom, a hydroxyl group, or a hydrocarbon group having 1 to 15 carbon atoms, at least one of R1 to R5 is a hydroxyl group, and the ortho position of the hydroxyl group is not a hydrogen atom. Incidentally, from the viewpoint of easily performing polymerization upon oxidation polymerization, the number of carbon atoms of the hydrocarbon group is preferably 1 to 12.

Of the polyhydric phenols (e) represented by Formula (9), dihydric phenols are compounds represented by Formula (9-1) to Formula (9-3) below.

[Chemical Formula 7]

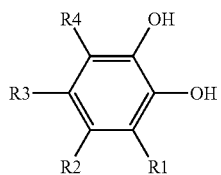

(9-1)

[Chemical Formula 8]

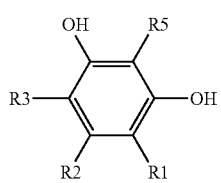

(9-2)

[Chemical Formula 9]

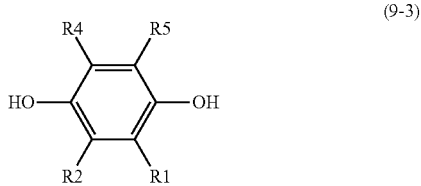

(9-3)

In Formula (9-1), R1 and R4 are a hydrocarbon group having 1 to 15 carbon atoms, and R2 and R3 are a hydrogen atom or a hydrocarbon group having 1 to 15 carbon atoms.

In Formula (9-2), R1, R3, and R5 are a hydrogen atom or a hydrocarbon group having 1 to 15 carbon atoms, and R12 is a hydrogen atom or a hydrocarbon group having 1 to 15 carbon atoms.

In Formula (9-3), R1 to R5 are a hydrocarbon group having 1 to 15 carbon atoms.

Incidentally, from the viewpoint of easily performing polymerization upon oxidation polymerization, the number of carbon atoms of the hydrocarbon group is preferably 1 to 12.

Examples of the polyhydric phenol (e) represented by Formula (9) include 3,6-dimethylcatechol, 3,6-t-butylcatechol, 3,6-diallylcatechol, 3-methyl-6-allylcatechol, 3-methyl-6-cyclohexylcatechol, 3-methyl-6-phenylcatechol, 3-methyl-6-benzylcatechol, 3,4,6-trimethylcatechol, tetramethylcatechol, 2,4,6-trimethylresorcinol, tetramethylresorcinol, tetramethylhydroquinone, 4,6-dimethylpyrogallol, trimethylphloroglucinol, trimethylhydroxyquinol, and hexahydroxybenzene. Only one kind of the polyhydric phenol (e) represented by Formula (9) may be used, or two or more kinds thereof may be used.

[Chemical Formula 10]

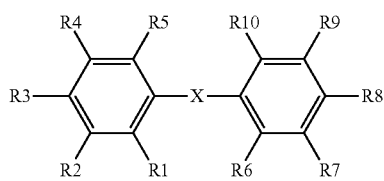

(10)

In Formula (10), X is a single bond or a bivalent organic group. Examples of the bivalent organic group include a bivalent hydrocarbon group (preferably an alkylene group or an alkylidene group), a phosphine atom group (—PR$_X$—), an amine atom group (—NR$_X$—), an amide bond (—CO—NH—), and an azo group (—N=N—). R$_X$ is a hydrogen atom or a hydrocarbon group having 1 to 15, preferably 1 to 6 carbon atoms. The number of carbon atoms of the bivalent hydrocarbon group is preferably 1 to 12 and more preferably 1 to 3.

In Formula (10), R1 to R10 are a hydrogen atom, a hydroxyl group, or a hydrocarbon group having 1 to 15 carbon atoms, at least one of R1 to R5 is a hydroxyl group, at least one of R6 to R10 is a hydroxyl group, and the ortho position of the hydroxyl group is not a hydrogen atom. From the viewpoint of easily performing polymerization upon oxidation polymerization, the number of carbon atoms of the hydrocarbon group is preferably 1 to 12.

Of the polyhydric phenols (f) represented by Formula (10), dihydric phenols are compounds represented by Formula (10-1) to Formula (10-6) below.

[Chemical Formula 11]

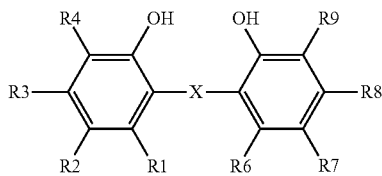

(10-1)

[Chemical Formula 12]

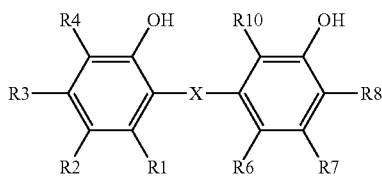

(10-2)

[Chemical Formula 13]

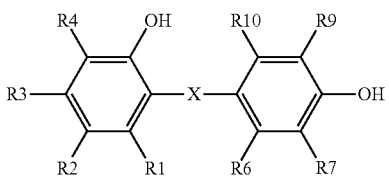

(10-3)

[Chemical Formula 14]

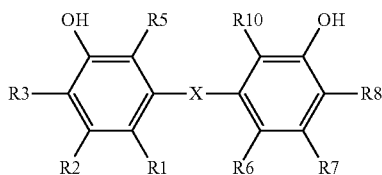

(10-4)

[Chemical Formula 15]

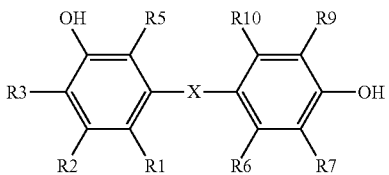

(10-5)

[Chemical Formula 16]

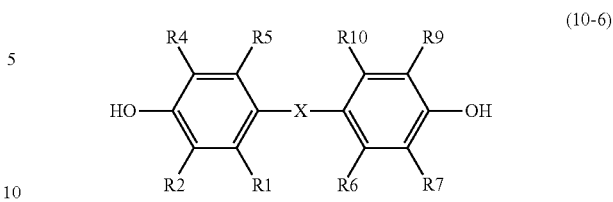

(10-6)

In Formula (10-1), R1 to R3 and R6 to R8 are a hydrogen atom or a hydrocarbon group having 1 to 15 carbon atoms, and R4 and R9 are a hydrocarbon group having 1 to 15 carbon atoms.

In Formula (10-2), R1 to R3, R6, and R7 are a hydrogen atom or a hydrocarbon group having 1 to 15 carbon atoms, and R4, R8, and R10 are a hydrocarbon group having 1 to 15 carbon atoms.

In Formula (10-3), R1 to R3, R6, and R10 are a hydrogen atom or a hydrocarbon group having 1 to 15 carbon atoms, and R4, R7, and R9 are a hydrocarbon group having 1 to 15 carbon atoms.

In Formula (10-4), R1, R2, R6, and R7 are a hydrogen atom or a hydrocarbon group having 1 to 15 carbon atoms, and R3, R5, R8, and R10 are a hydrocarbon group having 1 to 15 carbon atoms.

In Formula (10-5), R1, R2, R6, and R10 are a hydrogen atom or a hydrocarbon group having 1 to 15 carbon atoms, and R3, R5, R7, and R9 are a hydrocarbon group having 1 to 15 carbon atoms.

In Formula (10-6), R1, R5, R6, and R10 are a hydrogen atom or a hydrocarbon group having 1 to 15 carbon atoms, and R2, R4, R7, and R9 are a hydrocarbon group having 1 to 15 carbon atoms.

Incidentally, from the viewpoint of easily performing polymerization upon oxidation polymerization, the number of carbon atoms of the hydrocarbon group is preferably 1 to 12.

Examples of the polyhydric phenol (f) represented by Formula (10) include
2,2'-dihydroxy-3,3'-dimethylbiphenyl,
2,2'-dihydroxy-3,3'-diallylbiphenyl,
2,2'-dihydroxy-3,3'-dicyclohexylbiphenyl,
2,2'-dihydroxy-3,3'-diphenylbiphenyl,
2,2'-dihydroxy-3,3',5,5'-tetramethylbiphenyl,
2,2'-dihydroxy-3,3',5,5'-tetra-t-butylbiphenyl,
4,4'-dihydroxy-3,3',5,5'-tetramethylbiphenyl,
4,4'-dihydroxy-2,2',3,3',5,5'-hexamethylbiphenyl,
4,4'-dihydroxy-2,2',3,3',5,5',6,6'-octamethylbiphenyl,
4,4'-dihydroxy-3,3',5,5'-tetraisopropylbiphenyl,
4,4'-dihydroxy-3,3',5,5'-tetra-t-butylbiphenyl,
bis(2-hydroxy-3-methylphenyl)methane,
bis(2-hydroxy-3,5-dimethylphenyl)methane,
bis(2-hydroxy-3-t-butyl-5-methylphenyl)methane,
bis(4-hydroxy-3,5-dimethylphenyl)methane,
bis(4-hydroxy-3,5-diallylphenyl)methane,
bis(4-hydroxy-3,5-dicyclohexylphenyl)methane,
bis(4-hydroxy-3,5-diphenylphenyl)methane,
bis(4-hydroxy-3,5-dimethylphenyl)phenylmethane
1,1-bis(4-hydroxy-3,5-dimethylphenyl)ethane,
1,2-bis(4-hydroxy-3,5-dimethylphenyl)ethane
1,1-bis(4-hydroxy-3,5-dimethylphenyl)-1-phenylethane
2,2-bis(4-hydroxy-3,5-dimethylphenyl)propane,
2,2-bis(4-hydroxy-3-methyl-5-ethylphenyl)propane,
2,2-bis(4-hydroxy-3-phenyl-5-ethylphenyl)propane, 2,2-bis(4-hydroxy-3,5-dimethylphenyl)butane,
1,1-bis(4-hydroxy-3,5-dimethylphenyl)cyclohexane,
1,4-bis(4-hydroxy-3,5-dimethylphenyl)benzene,
9,9-bis(4-hydroxy-3,5-dimethylphenyl)fluorene,
bis(4-hydroxy-3,5-dimethylphenyl)phosphine,
bis(4-hydroxy-3,5-dimethylphenyl)phenylphosphine,
bis(4-hydroxy-3,5-dimethylphenyl)amine,
bis(4-hydroxy-3,5-dimethylphenyl)methylamine,
bis(4-hydroxy-3,5-dimethylphenyl)phenylamine,
4-hydroxy-3,5-dimethyl-N-(4-hydroxy-3,5-dimethylphenyl)benzamide, and
4,4'-dihydroxy-3,3',5,5'-tetrakismethylazobenzene. Only one kind of the polyhydric phenol (f) represented by Formula (10) may be used, or two or more kinds thereof may be used.

Herein, the predetermined polyhydric phenol may be polyhydric phenols other than the polyhydric phenol (e) represented by Formula (9) and the polyhydric phenol (f) represented by Formula (10). Examples thereof include tris(4-hydroxy-3,5-dimethylphenyl)methane, 1,1,1-tris(4-hydroxy-3,5-dimethylphenyl)ethane, 1,1,2-tris(4-hydroxy-3,5-dimethylphenyl)ethane, tetrakis(4-hydroxy-3,5-dimethylphenyl)methane, and tris(4-hydroxy-3,5-dimethylphenyl)amine.

<<<Modified Predetermined poly(phenylene ether)>>>
<<Modification of Terminal hydroxyl Group>>

The poly(phenylene ether) may be a terminal-modified poly(phenylene ether). That is, a part or the whole of the terminal hydroxyl group in the poly(phenylene ether) can be modified by using a compound for modification according to a conventionally known method. The type of a compound for modification, a reaction temperature, a reaction time, presence/absence of a catalyst, the type of a catalyst, and the like can be appropriately designed. Two or more kinds of compounds may be used as a compound for modification.

Since the terminal-modified poly(phenylene ether) has a branched structure and the terminal hydroxyl group is modified, a cured product with further reduced low-dielectric characteristics is obtainable while the poly(phenylene ether) is soluble in various solvents. Furthermore, the terminal-modified poly(phenylene ether) also has additional properties derived from the compound for modification used when the terminal hydroxyl group is modified.

Herein, the compound for modification is not limited as long as it can modify the terminal hydroxyl group, and specifically, an organic compound having 1 or more carbon atoms that can react with a phenolic hydroxyl group in the presence or absence of a catalyst. Such an organic compound may contain an oxygen atom, a nitrogen atom, a sulfur atom, a phosphorus atom, a halogen atom, or the like.

In the case of modifying the terminal hydroxyl group by the compound for modification, generally, the terminal hydroxyl group and the compound for modification form an ether bond or an ester bond.

Properties derived from the compound for modification can be imparted to the terminal-modified poly(phenylene ether). For example, the compound for modification contains a phosphorus atom (more specifically, the compound for modification is a halogenated organic phosphorus compound), and thereby flame retardancy of a cured product can be improved. Furthermore, from the viewpoint of heat resistance of a cured product, the compound for modification preferably contains a thermal reactive or photoreactive functional group. For example, the compound for modification contains an unsaturated carbon bond, a cyanate group, or an epoxy group, and thereby the reactivity of the terminal-modified poly(phenylene ether) can be improved.

Preferred examples of the compound for modification include organic compounds represented by Formula (11) below.

[Chemical Formula 17]

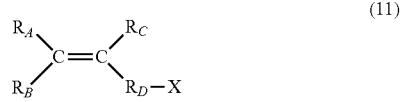

In Formula (11), $R_A$, $R_B$, and $R_C$ are each independently hydrogen or a hydrocarbon group having 1 to 9 carbon atoms, $R_D$ is a hydrocarbon group having 1 to 9 carbon atoms, and X is a group that can react with a phenolic hydroxyl group such as F, Cl, Br, I, or CN.

Modification of the terminal hydroxyl group of the poly (phenylene ether) can be confirmed by comparing hydroxyl values between the poly(phenylene ether) and the terminal-modified poly(phenylene ether). Incidentally, a part of the terminal-modified poly(phenylene ether) may remain an unmodified hydroxyl group.

As described above, in the case of using a polyhydric phenol as a raw material, the number of terminal hydroxyl groups becomes relatively larger. This is advantageous in a case where a poly(phenylene ether) is modified by modifying a terminal hydroxyl group.

<Modification of Predetermined poly(phenylene ether) not Containing Unsaturated carbon Bond>

As described above, the terminal hydroxyl group of the predetermined poly(phenylene ether) not containing an unsaturated carbon bond may be modified by a compound for modification containing a functional group having an unsaturated carbon bond.

The functional group of the unsaturated carbon bond is not particularly limited, but is preferably an alkenyl group (for example, a vinyl group or an allyl group), an alkynyl group (for example, an ethynyl group), or a (meth)acryloyl group, more preferably a vinyl group, an allyl group, or a (meth)acryloyl group from the viewpoint of having excellent curing property, and further preferably an allyl group from the viewpoint of having excellent low-dielectric characteristics. Incidentally, the number of carbon atoms of these functional groups having an unsaturated carbon bond can be set, for example, to 15 or less, 10 or less, 8 or less, 5 or less, 3 or less, and the like.

Preferred examples of the compound for modification include organic compounds represented by Formula (11-1) below.

[Chemical Formula 18]

In Formula (11-1), R is a vinyl group, an allyl group, or a (meth)acryloyl group, and X is a group that can react with a phenolic hydroxyl group such as F, Cl, Br, or I Such a terminal-modified poly(phenylene ether) has a branched structure, and thereby solubility in various solvents and compatibility with other components in the composition are improved. Therefore, the respective components of the composition are homogeneously dissolved or dispersed so that a homogeneous cured product can be obtained. As a result, this cured product is extremely excellent in various performances. Furthermore, the unsaturated carbon bonds at the terminals can be cross-linked to each other or can be cross-linked to other components containing an unsaturated carbon bond and the unsaturated carbon bond is disposed at the position of the terminal, resulting in extremely satisfactory reactivity, and thus various performances of a cured product to be obtained become satisfactory.

<<<Predetermined poly(phenylene ether) in which Side-Chain Unsaturated carbon Bond is Epoxidized>>>

In the predetermined poly(phenylene ether) having an unsaturated carbon bond at the side chain (the predetermined poly(phenylene ether) obtained from one or more raw-material phenols including a phenol satisfying Requirement 2), the unsaturated carbon bond present at the side chain thereof may be epoxidized. That is, the predetermined poly(phenylene ether) may be a side-chain epoxidized poly (phenylene ether) which has a branched structure and in which a part or the whole of a side-chain unsaturated carbon bond of the predetermined poly(phenylene ether) having a side-chain unsaturated carbon bond is epoxidized. The side-chain unsaturated carbon bond is typically derived from an unsaturated carbon bond which a raw-material phenol that is a constituent unit of the poly(phenylene ether) has as a substituent.

In the side-chain epoxidized poly(phenylene ether), a part or the whole of the side-chain unsaturated carbon bond is epoxidized. Therefore, a cured product more excellent in low-dielectric characteristics and solvent resistance is obtained. Furthermore, the thermal curing temperature can be set to be a relatively low temperature by epoxidation.

The number average molecular weight of the side-chain epoxidized poly(phenylene ether) is preferably 1,000 to 20,000 or 1,000 to 10,000. Moreover, the polydispersity index (PDI: weight average molecular weight/number average molecular weight) is preferably 1.5 to 20.

The epoxidation rate of the side-chain epoxidized poly (phenylene ether) is at least 1% and at most 100%. By adjusting the epoxidation rate to this range, low-dielectric characteristics and solvent resistance can be secured.

The epoxidation rate of the side-chain epoxidized poly (phenylene ether) refers to a proportion of the number of side-chain epoxy groups in the total of the number of side-chain unsaturated carbon bonds and the number of side-chain epoxy groups of the poly(phenylene ether). The respective numbers can be analyzed by using 1H NMR (400 MHz, CDCl3, TMS).

The side-chain epoxidized poly(phenylene ether) is typically obtained by epoxidizing a part or the whole of a side-chain unsaturated carbon bond in the poly(phenylene ether) having a side-chain unsaturated carbon bond by an epoxidizing agent.

The type of an epoxidizing agent, a reaction temperature, a reaction time, presence/absence of a catalyst, the type of a catalyst, and the like can be appropriately designed. Two or more kinds of compounds may be used as an epoxidizing agent.

The epoxidizing agent is not particularly limited as long as it can epoxidize an unsaturated carbon bond. Typically, an organic peracid is exemplified. As the organic peracid, a percarboxylic acid is exemplified. Examples of the percarboxylic acid include performic acid, peracetic acid, perpropionic acid, trifluoroperacetic acid, perbenzoic acid, m-chloroperbenzoic acid.

Incidentally, the terminal phenolic hydroxyl group of the side-chain epoxidized poly(phenylene ether) may be epoxidized with a predetermined epoxidizing agent. Examples of such an epoxidizing agent include epihalohydrin such as epichlorohydrin and epibromohydrin.

<<<Structural Analysis of poly(phenylene ether)>>>

An example of the structural analysis of the poly(phenylene ether) will be described.

FIG. 1 shows 13C-NMR spectra, the upper spectrum corresponds to a copolymer of o-cresol and 2-allyl-6-methylphenol (predetermined poly(phenylene ether)), and the lower spectrum corresponds to a copolymer of 2,6-dimethylphenol and 2-allyl-6-methylphenol. As shown in the spectrum chart, in the predetermined poly(phenylene ether) (PPE), identification of a peak is difficult.

Herein, as described above, although the structural analysis of the poly(phenylene ether) by NMR spectrum is difficult, the branched structure (the degree of branching) of the poly(phenylene ether) can be checked based on the following analytical procedure.

<Analytical Procedure>

Chloroform solutions of the poly(phenylene ether) are prepared with intervals of 0.1, 0.15, 0.2, and 0.25 mg/mL, a graph of a refractive index difference and a concentration is then created while the solutions are fed at 0.5 mL/min, and a refractive index increment dn/dc is calculated from the slope. Next, the absolute molecular weight is measured under the following device operation condition. By reference to the chromatogram of an RI detector and the chromatogram of a MALS detector, a regression line by a least-square method is obtained from a logarithmic graph (conformational plot) of the molecular weight and the rotation radius and the slope thereof is calculated.

<Measurement Conditions>

Device name: HLC8320GPC

Mobile phase: Chloroform

Column: TOSOH TSK guard column HHR-H
 +TSKgel GMHHR-H (×2)
 +TSKgel G2500HHR

Flow velocity: 0.6 mL/min.

Detector: DAWN HELEOS (MALS detector)
 +Optilab rEX (RI detector, wavelength: 254 nm)

Sample concentration: 0.5 mg/mL

Sample solvent: Same as the mobile phase. Dissolving 5 mg of the sample in 10 mL of the mobile phase Injection amount: 200 μL Filter: 0.45 μm STD reagent: Standard polystyrene Mw 37,900

STD concentration: 1.5 mg/mL

STD solvent: Same as the mobile phase Dissolving 15 mg of the sample in 10 mL of the mobile phase Analysis time: 100 min In resins having the same absolute molecular weight, as the branching of the polymer chain proceeds, a distance (rotation radius) from the center of gravity to each segment decreases. Therefore, a slope of a logarithmic plot of the absolute molecular weight obtained by GPC-MALS and the rotation radius indicates the degree of branching, and a smaller slope means that branching proceeds. In the present invention, a smaller slope calculated by the above-described conformational plot indicates that branching of the poly (phenylene ether) increases, and a larger slope indicates that branching of the poly(phenylene ether) decreases.

The above-described slope in the poly(phenylene ether) is, for example, less than 0.6, and is preferably 0.55 or less, 0.50 or less, 0.45 or less, or 0.40 or less. In a case where the above-described slope is in this range, it is considered that the poly(phenylene ether) has sufficient branching. Incidentally, the lower limit of the above-described slope is not particularly limited, and is, for example, 0.05 or more, 0.10 or more, 0.15 or more, or 0.20 or more.

Incidentally, the slope of the conformational plot can be adjusted by changing a temperature, a catalyst amount, a stirring speed, a reaction time, an oxygen supply amount, or a solvent amount at the time of synthesis of the poly(phenylene ether). More specifically, there is a tendency that the slope of the conformational plot is decreased (the poly(phenylene ether) is more easily branched) by increasing a temperature, increasing a catalyst amount, increasing a stirring rate, lengthening a reaction time, increasing an oxygen supply amount, and/or decreasing a solvent amount.

<<<Method for Producing poly(phenylene ether)>>>

The predetermined poly(phenylene ether) can be produced by applying a conventionally known poly(phenylene ether) synthesis method (polymerization conditions, presence/absence of a catalyst, the type of a catalyst, and the like), except that a specific material is used as a raw-material phenol.

Next, an example of a method for producing a predetermined poly(phenylene ether) will be described.

The poly(phenylene ether) of the present invention can be produced, for example, by preparing a polymerization solution containing a specific phenol, a catalyst, and a solvent (polymerization solution preparation step), ventilating oxygen in at least the solvent (oxygen supply step), and oxidation-polymerizing a phenol in the polymerization solution containing oxygen (polymerization step).

Hereinafter, the polymerization solution preparation step, the oxygen supply step, and the polymerization step will be described. Incidentally, the respective steps may be continuously performed, a part or the whole of a certain step and a part or the whole of another step may be performed at the same time, or a certain step may be interrupted and another step may be performed during the interruption. For example, the oxygen supply step may be executed during the polymerization solution preparation step or the polymerization step. Furthermore, the method for producing a poly(phenylene ether) of the present invention may include other steps as necessary. As other steps, for example, a step of extracting a poly(phenylene ether) obtained by a polymerization step (for example, a step of performing reprecipitation, filtration, and drying) and the like are exemplified.

<<Polymerization Solution Preparation Step>>

The polymerization solution preparation step is a step of preparing a polymerization solution by mixing respective raw materials including the phenol polymerized in the polymerization step. Examples of raw materials of the polymerization solution include a raw-material phenol, a catalyst, and a solvent.

<Catalyst>

The catalyst is not particularly limited, and may be an appropriate catalyst used in oxidation polymerization of the poly(phenylene ether).

Examples of the catalyst include an amine compound and a metal-amine compound consisting of a heavy-metal compound such as copper, manganese, or cobalt and an amine compound such as tetramethylethylene diamine, and particularly, in order to obtain a copolymer having a sufficient molecular weight, a copper-amine compound in which a copper compound is coordinated on an amine compound is preferably used. Only one kind of the catalyst may be used, or two or more kinds thereof may be used.

The content of the catalyst is not particularly limited, but may be set to, for example, 0.1 to 0.6 mol % in the polymerization solution with respect to the total of the raw-material phenols.

Such a catalyst may be dissolved in a proper solvent in advance.

<Solvent>

The solvent is not particularly limited, and may be an appropriate solvent used in oxidation polymerization of the poly(phenylene ether). As for the solvent, a solvent that can dissolve or disperse a phenolic compound and a catalyst is preferably used.

Specific examples of the solvent include aromatic hydrocarbons such as benzene, toluene, xylene, ethylbenzene, halogenated aromatic hydrocarbons such as chloroform, methylene chloride, chlorobenzene, dichlorobenzene, and trichlorobenzene, nitro compounds such as nitrobenzene, methyl ethyl ketone (MEK), cyclohexanone, tetrahydrofuran, ethyl acetate, N-methyl-2-pyrrolidone (NMP), N,N-dimethylformamide (DMF), propyleneglycol monomethyl ether acetate (PMA), and diethylene glycol monoethyl ether acetate (CA). Only one kind of the solvent may be used, or two or more kinds thereof may be used.

Incidentally, as the solvent, water, a solvent compatible with water, or the like may be contained.

The content of the solvent in the polymerization solution is not particularly limited, and may be appropriately adjusted.

<Other Raw Materials>

The polymerization solution may contain other raw materials within the range that would not impair the effects of the present invention.

<<Oxygen Supply Step>>

The oxygen supply step is a step of ventilating an oxygen-containing gas in the polymerization solution.

The ventilating time of oxygen gas and the oxygen concentration in the oxygen-containing gas can be appropriately changed according to atmospheric pressure, atmospheric temperature, and the like.

<<Polymerization Step>>

The polymerization step is a step of oxidation-polymerizing a phenol in a polymerization solution while oxygen is supplied to the polymerization solution.

Specific polymerization conditions are not particularly limited, and for example, it is sufficient to perform stirring under conditions of 25° C. to 100° C. and 2 to 24 hours.

<<<<Curable Composition<<<<

Next, the curable composition containing a predetermined poly(phenylene ether) will be described.

The curable composition may contain only one kind of the predetermined poly(phenylene ether) described above, and may contain a plurality of kinds thereof.

The curable composition may contain, for example, components such as silica, a phosphorus-based compound, a cellulose nanofiber, a cyanate ester resin, an epoxy resin, a phenol novolak resin, an elastomer, a dispersant, and other components (for example, peroxide, a crosslinking curing agent (including an epoxy group-reactive crosslinking curing agent), a thermosetting catalyst, and a solvent), other than the predetermined poly(phenylene ether) described above. Only one kind of these components may be used, or two or more kinds thereof may be used. The curable composition is obtained by appropriately mixing respective raw materials.

The content of the predetermined poly(phenylene ether) in the curable composition is typically 5 to 30% by mass or 10 to 20% by mass based on the total amount of solid content of the composition. Furthermore, from another viewpoint, the content of the predetermined poly(phenylene ether) in the curable composition is 20 to 60% by mass based on the total amount of solid content of the composition.

Incidentally, the solid content of the composition means a component constituting the composition other than a solvent (particularly, an organic solvent) or the mass or volume thereof.

<Silica>

The curable composition may contain silica. When the composition contains silica, the film formability of the composition can be improved. Moreover, flame retardancy can be imparted to a cured product to be obtained. More specifically, silica is blended in the composition, and thereby self-extinguishing property and a low dielectric loss tangent of the cured product can be realized at a high level.

The average particle diameter of silica is preferably 0.02 to 10 μm and more preferably 0.02 to 3 μm. Herein, the average particle diameter can be obtained as a median diameter (d50, volumetric basis) in a cumulative distribution from measurement values of a particle size distribution obtained by a laser diffraction scattering method by using a commercially available laser diffraction scattering-type particle size distribution measurement apparatus.

Silicas that differ in particle size can also be used in combination. From the viewpoint of highly filling with silica, for example, microscopic silica having an average particle diameter of less than 1 μm on the order of nanometers may be used in combination with silica having an average particle diameter of 1 μm or more.

The silica may be surface-treated by a coupling agent. The surface is treated by a silane coupling agent, and thereby dispersibility with the poly(phenylene ether) can be improved. Furthermore, affinity with the organic solvent can also be improved.

As the silane coupling agent, for example, an epoxysilane coupling agent, a mercaptosilane coupling agent, a vinylsilane coupling agent, and the like can be used. As the epoxysilane coupling agent, for example, y-glycidoxypropyltrimethoxysilane, y-glycidoxypropylmethyldimethoxysilane, and the like can be used. As the mercaptosilane coupling agent, for example, y-mercaptopropyltriethoxysilane and the like can be used. As the vinylsilane coupling agent, for example, vinyltriethoxysilane and the like can be used.

The amount of the silane coupling agent used may be, for example, 0.1 to 5 parts by mass or 0.5 to 3 parts by mass with respect to 100 parts by mass of silica.

The content of the silica may be 50 to 400 parts by mass or 100 to 400 parts by mass with respect to 100 parts by mass of the poly(phenylene ether). Alternatively, the content of the silica may be 10 to 30% by mass based on the total amount of solid content of the composition.

Furthermore, from another viewpoint, the blending amount of the silica may be 200 to 600 parts by mass with respect to 100 parts by mass of the poly(phenylene ether). In other words, the blending amount of the silica may be 40 to 80% by mass based on the total amount of solid content of the composition.

<Phosphorus-Based Compound>

The curable composition may contain a phosphorus-based compound. As a preferred phosphorus-based compound in the present invention, depending on the function, properties (blending purpose), and the like thereof, a phosphorus-containing flame retardant and a predetermined phosphorus compound are exemplified. Incidentally, since the phosphorus-containing flame retardant and the predetermined phosphorus compound are specified by the function, properties, and the like thereof, one phosphorus-based compound may correspond to both the predetermined phosphorus compound and the phosphorus-containing flame retardant, and may correspond only to any one thereof.

(Phosphorus-Containing Flame Retardant)

The curable composition may contain a phosphorus-containing flame retardant. The phosphorus-containing flame retardant is blended in the composition, and thereby the self-extinguishing property of the cured product obtained by curing the composition can be improved.

Examples of the phosphorus-containing flame retardant include phosphoric acid or esters thereof and phosphorus acid or esters thereof. Alternatively, condensates thereof are exemplified.

The phosphorus-containing flame retardant is preferably used in combination with silica. Therefore, the phosphorus-containing flame retardant is preferably compatible with the poly(phenylene ether) from the viewpoint of highly filling with silica. On the other hand, there is also a risk of bleeding-out of the phosphorus-containing flame retardant.

In a preferred embodiment for reducing the risk of bleeding-out, the phosphorus-containing flame retardant has one or more unsaturated carbon bonds in the molecular structure. The phosphorus-containing flame retardant having an unsaturated carbon bond can react with the poly(phenylene ether) having an unsaturated carbon bond to be integrated when curing the composition. As a result, the risk of bleeding-out of the phosphorus-containing flame retardant is reduced.

A preferred phosphorus-containing flame retardant has a plurality of unsaturated carbon bonds in the molecular structure of the phosphorus-containing flame retardant. The phosphorus-containing flame retardant having these plural unsaturated carbon bonds can function as a crosslinking curing agent described below. From the viewpoint of contributing to crosslinking of the poly(phenylene ether), the phosphorus-containing flame retardant having a plurality of unsaturated carbon bonds can also be expressed as a phosphorus-containing crosslinking curing agent or a phosphorus-containing crosslinking aid.

As the phosphoric acid or esters thereof, a compound represented by Formula (6) below is mentioned.

[Chemical Formula 19]

(6)

In Formula (6), $R_{61}$ to $R_{63}$ each independently represent a hydrogen atom or a hydrocarbon group having 1 to 15 (preferably 1 to 12) carbon atoms. The hydrocarbon group may have an unsaturated carbon bond. Furthermore, the hydrocarbon group may contain one or more heteroatoms such as oxygen, nitrogen, and sulfur. However, since polarity is increased to adversely affect dielectric characteristics when the hydrocarbon group contains these heteroatoms, it is preferable that the hydrocarbon group does not contain heteroatoms. Typical examples of such a hydrocarbon group include a methyl group, an ethyl group, an octyl group, a phenyl group, a cresyl group, a butoxyethyl group, a vinyl group, an allyl group, an acryloyl group, and a methacryloyl group.

Examples of the phosphoric acid ester include trimethyl phosphate, triethyl phosphate, tributyl phosphate, trioctyl phosphate, tributoxyethyl phosphate, triphenyl phosphate, tricresyl phosphate, cresyl diphenyl phosphate, octyl diphenyl phosphate, tri(2-ethylhexyl) phosphate, diisopropylphenyl phosphate, trixylenyl phosphate, tris(isopropylphenyl) phosphate, trinaphthyl phosphate, bisphenol A bisphosphate, hydroquinone bisphosphate, resorcinol bisphosphate, resorcinol-diphenyl phosphate, and trioxybenzene triphosphate.

Examples of the phosphoric acid ester having an unsaturated carbon bond in the molecular structure include trivinyl phosphate, triallyl phosphate, triacryloyl phosphate, trimethacryloyl phosphate, trisacryloyloxyethyl phosphate, and trismethacryloyloxyethyl phosphate.

As the phosphorus acid or esters thereof, a compound represented by Formula (7) below is mentioned.

[Chemical Formula 20]

(7)

In Formula (7), the description of $R_{61}$ to $R_{63}$ in Formula (6) is applied to $R_{71}$ to $R_{73}$.

Examples of the phosphorus acid ester include trimethyl phosphite, triethyl phosphite, tributyl phosphite, trioctyl phosphite, tributoxyethyl phosphite, triphenyl phosphite, tricresyl phosphite, cresyl diphenyl phosphite, octyl diphenyl phosphite, tri(2-ethylhexyl) phosphite, diisopropylphenyl phosphite, trixylenyl phosphite, tris(isopropylphenyl) phosphite, trinaphthyl phosphite, bisphenol A bisphosphite, hydroquinone bisphosphite, resorcinol bisphosphite, resorcinol-diphenyl phosphite, and trioxybenzene triphosphite.

Examples of the phosphorus acid ester having an unsaturated carbon bond in the molecular structure include trivinyl phosphite, triallyl phosphite, triacryloyl phosphite, and trimethacryloyl phosphite.

The content of the phosphorus-containing flame retardant may be 1 to 5% by mass as the phosphorus amount based on the total amount of solid content of the composition. Within the above-described range, self-extinguishing property, heat resistance, and dielectric characteristics of a cured product obtained by curing the composition can be realized at a high level in a balanced manner.

(Predetermined phosphorus Compound)

The curable composition contains the predetermined phosphorus compound, and thereby flame retardancy of a cured product obtained by curing the composition can be efficiently improved.

The predetermined phosphorus compound means a compound containing one or more phosphorus elements in the molecular structure and having a property of being incompatible with the aforementioned branched poly(phenylene ether).

Examples of the phosphorus compound include a phosphoric acid ester compound, a phosphinic acid compound, and a phosphorus-containing phenol compound.

As the phosphoric acid ester compound, a compound represented by Formula (6) below is mentioned.

[Chemical Formula 21]

(6)

In Formula (6), $R_{61}$ to $R_{63}$ each independently represent a hydrogen atom or a saturated or unsaturated hydrocarbon group having 1 to 15 (preferably 1 to 12) carbon atoms that is linear or branched. The hydrocarbon group is preferably an alkyl group, an alkenyl group, an unsubstituted aryl group or an alkyl group as a substituent, or an aryl group having an alkenyl group. Typical examples of such a hydrocarbon group include a methyl group, an ethyl group, an octyl group, a vinyl group, an allyl group, a phenyl group, a benzyl group, a tolyl group, and a vinylphenyl group.

Examples of the phosphoric acid ester compound include trimethyl phosphate, triethyl phosphate, triphenyl phosphate, tricresyl phosphate, trixylenyl phosphate, bisphenol A bisdiphenyl phosphate, resorcinol bis-diphenyl phosphate, 1,3-phenylene-tetrakis(2,6-dimethylphenyl phosphate), 1,4-phenylene-tetrakis(2,6-dimethylphenyl phosphate), and 4,4'-biphenylene-tetrakis(2,6-dimethylphenyl phosphate).

As the phosphinic acid compound, a metal phosphinate compound represented by Formula (8) below is preferred.

[Chemical Formula 22]

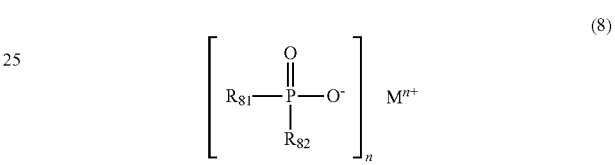

(8)

In Formula (8), $R_{81}$ and $R_{82}$ are independently a hydrogen atom or a saturated or unsaturated hydrocarbon group that is linear or branched. The hydrocarbon group is preferably a linear or branched alkyl group having 1 to 6 carbon atoms, a linear or branched alkenyl group having 1 to 6 carbon atoms, a cycloalkyl group having 3 to 6 carbon atoms, a phenyl group, a benzyl group, or a tolyl group. The hydrocarbon group is particularly preferably an alkyl group having 1 to 4 carbon atoms.

In Formula (8), M represents an n-valent metal ion. The metal ion M is an ion of at least one metal of the group consisting of Mg, Ca, Al, Sb, Sn, Ge, Ti, Fe, Zr, Ce, Bi, Sr, Mn, Li, Na, and K, and at least a part thereof is preferably an Al ion.

As the metal phosphinate compound, for example, aluminum diethylphosphinate is exemplified.

The metal phosphinate compound may be surface-treated so as to have an organic group by a coupling agent. The surface is treated by a silane coupling agent, and thereby affinity with the organic solvent can also be improved. Furthermore, by having an unsaturated carbon bond such as a vinyl group or a cyclic ether bond such as an epoxy group, cross-linkage with other components during curing is possible, and this leads to an improvement in heat resistance, prevention of bleeding-out, and the like.

As the silane coupling agent, for example, an epoxysilane coupling agent, a mercaptosilane coupling agent, a vinylsilane coupling agent, and the like can be used. As the epoxysilane coupling agent, for example, γ-glycidoxypropyltrimethoxysilane, γ-glycidoxypropylmethyldimethoxysilane, and the like can be used. As the mercaptosilane coupling agent, for example, γ-mercaptopropyltriethoxysilane and the like can be used. As the vinylsilane coupling agent, for example, vinyltriethoxysilane and the like can be used.

Examples of the phosphorus-containing phenol compound include diphenylphosphinyl hydroquinone, diphenylphosphenyl-1,4-dioxynaphthalene, 1,4-cyclooctylenephosphinyl-1,4-phenyldiol, and 1,5-cyclooctylenephosphinyl-1,4-phenyldiol.

As the predetermined phosphorus compound, from the viewpoint of having a high phosphorus content per molecule, a metal phosphinate compound not having compatibility with the branched poly(phenylene ether) is particularly preferred.

In the present invention, whether or not the phosphorus compound is compatible with the branched poly(phenylene ether) is determined based on the following test.

The branched poly(phenylene ether) is usually soluble in cyclohexanone. That is, if the phosphorus compound is also soluble in cyclohexanone, a mixture of the branched poly(phenylene ether) and the phosphorus compound can be said to be homogeneously compatibilized. Based on this, the degree of solubility of the phosphorus compound with respect to cyclohexanone is checked, and thereby whether or not the phosphorus compound is compatible with the branched poly(phenylene ether) is determined.

Specifically, to a 200 mL sample bottle, 10 g of a phosphorus compound and 100 g of cyclohexanone were input, stirred using a stirring bar at 25° C. for 10 minutes, and then left to stand at 25° C. for 10 minutes. A phosphorus compound having a degree of solubility of less than 0.1 (10 g/100 g) is determined to be incompatible with the branched poly(phenylene ether), and a phosphorus compound having a degree of solubility of 0.1 (10 g/100 g) or more is determined to be compatible with the branched poly(phenylene ether).

Incidentally, the degree of solubility of the phosphorus compound may be less than 0.08 (8 g/100 g) or less than 0.06 (6 g/100 g).

In the case of using the branched poly(phenylene ether) in combination with a flame retardant that is compatible with the branched poly(phenylene ether), the compatibility between the branched poly(phenylene ether) and the flame retardant becomes excessive, and as a result, a problem arises in that the heat resistance of a cured product to be obtained is decreased in some cases. Such a problem can be solved by using a flame retardant that is incompatible with the branched poly(phenylene ether).

The content of the phosphorus compound may be 1 to 10% by mass, 2 to 8% by mass, or 3 to 6% by mass based on the total amount of solid content of the composition. Within the above-described range, flame retardancy, heat resistance, and dielectric characteristics of a cured product obtained by curing the composition can be realized at a high level in a balanced manner.

<Cellulose Nanofiber>

The curable composition may contain a cellulose nanofiber. The number average fiber diameter (D) of the cellulose nanofiber is preferably 1 nm to 1000 nm, 1 nm to 200 nm, 1 nm to 100 nm, 1.5 nm to 50 nm, or 2 nm to 30 nm.

The number average fiber length (L) of the cellulose nanofiber is preferably 600 nm or less and more preferably 50 nm to 600 nm.

The aspect ratio of the cellulose nanofiber is preferably 1 to 250 and more preferably 5 to 230.

The number average fiber diameter (D), the number average fiber length (L), and the aspect ratio of the cellulose nanofiber are obtained based on the following methods.

Water is added to the cellulose nanofiber to prepare a dispersion liquid in which a concentration thereof is 0.0001% by mass. This dispersion liquid is added dropwise onto mica and dried to obtain a specimen, and the fiber height of the cellulose nanofiber in the specimen is measured using an atomic force microscope (ATM, Nanoscope III Tapping mode AFM, manufactured by Digital Instrument; probe: Point Probe (NCH) manufactured by Nanosensors). In this case, from a microscopic image in which the cellulose nanofiber is recognizable, five or more cellulose nanofibers are chosen to calculate an average fiber diameter from their heights. In general, the minimum unit of a cellulose nanofiber prepared from a higher plant consists of cellulose (D) from their heights. Furthermore, an average fiber length (L) is calculated from a distance in the fiber direction. The aspect ratio is calculated as a ratio of the number average fiber length (L) to the number average fiber diameter (D), that is, L/D.

The cellulose nanofiber has a hydroxyl group or a carboxy group generated by oxidizing the hydroxyl group. For the purpose of enhancing compatibility with a resin, it is preferable that these hydroxyl and carboxy groups are chemically modified as described below.

A raw material for the cellulose nanofiber and a preparation method thereof are not particularly limited, and well-known materials and methods can be used. For example, the following method can be exemplified.

As the raw material for the cellulose nanofiber, pulp obtained from natural plant fiber raw materials such as wood, hemp, bamboo, cotton, jute, kenaf, beet, agricultural waste, and cloth, regenerated cellulose fibers such as rayon and cellophane, and the like can be used. Of them, pulp is preferred. As the pulp, chemical pulp such as kraft pulp and sulfite pulp, semi-chemical pulp, chemiground pulp, chemi-mechanical pulp, thermomechanical pulp, chemithermomechanical pulp, refiner mechanical pulp, and ground pulp, which are obtained by chemically or mechanically pulping plant raw materials, and deinked recycled pulp, magazine recycled pulp, and cardboard recycled pulp, which comprise the above plant fibers as main components, and the like can be used. Of them, various kraft pulps derived from softwood with a high fiber strength, for example, softwood unbleached kraft pulp, oxygen-prebleached softwood kraft pulp, and softwood bleached kraft pulp are particularly preferred.

The above-described raw material consists mainly of cellulose, hemicellulose, and lignin. The content of lignin in this raw material is generally 0 to 40% by mass, and particularly 0 to 10% by mass. Regarding these raw materials, as necessary, the amount of lignin can be adjusted by performing removal of lignin or a bleaching treatment. Incidentally, the content of lignin can be measured by the Klason method.

In plant cell walls, a cellulose microfibril (cellulose nanofiber) having crystallizability in which several tens of cellulose molecules are regularly aggregated and assembled instead of cellulose molecules being single molecule is formed, and this is a basic skeleton material of plants. Therefore, in order to produce a cellulose nanofiber from the above-described raw material, it is possible to use a method in which the raw material is subjected to a beating or pulverizing treatment, a high-temperature high-pressure steam treatment, a treatment with a phosphate or the like, a treatment of oxidizing a cellulose fiber with an N-oxyl compound as an oxidation catalyst, or the like, and thereby this fiber is broken apart to a nanosize level.

Of the above-described treatments, the beating or pulverizing treatment is a method of obtaining a cellulose nanofiber by applying a force directly to the raw material such as pulp to be mechanically beaten or pulverized so that fibers are broken apart. More specifically, for example, pulp or the like is mechanically treated by a high-pressure homogenizer or the like so that cellulose fibers broken apart into a fiber diameter of about 0.1 to 10 μm is formed into about 0.1 to 3% by mass of a water suspension, this product is repeatedly ground or crushed by a grinder, and thereby a cellulose nanofiber having a fiber diameter of about 10 to 100 nm can be obtained.

The grinding or crushing treatment can be performed, for example, by using a grinder "Pure Fine Mill" manufactured by KURITA MACHINERY MFG. Co. Ltd., or the like. This grinder is millstone-like pulverizing equipment in which a raw material passes through the gap between two grinders, the upper one and the lower one, and the impact, centrifugal force, and shear force thereby generated pulverize the raw material into ultrafine particles, and with such a grinder, shearing, trituration, atomization, dispersion, emulsification, and fibrillation can be performed at the same time. Furthermore, the grinding or crushing treatment can also be performed by using an ultra-fine friction grinder "Supermasscolloider" manufactured by MASUKO SANGYO CO., LTD. Supermasscolloider is a grinder capable of obtaining ultrafine particles that seem to be molten beyond simple pulverization ranges. Supermasscolloider is a millstone-like ultra-fine friction grinder configured by two upper and lower non-pore grinding stones whose interval can be freely adjusted, the upper grinding stone is fixed, and the lower grinding stone rotates at a high speed. A raw material charged into a hopper is fed into a gap between the upper and lower grinding stones by centrifugal force, and the raw material is gradually crushed by strong compression, shearing, rolling frictional force, or the like generated therefrom, and is formed into ultrafine particles.

Furthermore, the high-temperature high-pressure steam treatment is a method of obtaining a cellulose nanofiber by exposing the raw material such as pulp to high-temperature high-pressure steam so that fibers are broken apart.

Further, the treatment with a phosphate or the like is a treatment method of obtaining a cellulose nanofiber by phosphorylating the surface of the raw material such as pulp to weaken the bonding force between cellulose fibers and then performing a refiner treatment to break apart the fibers. For example, the raw material such as pulp is immersed in a solution containing 50% by mass of urea and 32% by mass of phosphoric acid, the solution is sufficiently impregnated between cellulose fibers at 60° C., and then heating is performed at 180° C. to advance phosphorylation. After this treated product is washed with water, the treated product is hydrolyzed at 60° C. for 2 hours in 3% by mass of an aqueous solution of hydrochloric acid, washed again with water, and then, treated at room temperature for about 20 minutes in 3% by mass of an aqueous solution of sodium carbonate, and thereby phosphorylation is completed. This treated product is defibrated by a refiner, and thereby a cellulose nanofiber can be obtained.

Further, the treatment of oxidizing a cellulose fiber with an N-oxyl compound as an oxidation catalyst is a method of obtaining a cellulose nanofiber by oxidizing the raw material such as pulp described above and then microfabrillating the raw material.

First, a natural cellulose fiber is dispersed in water in an amount about 10 to 1000 times (mass basis) on an absolute dry basis by using a mixer or the like, and thereby an aqueous dispersion is prepared. Examples of the natural cellulose fiber that is a raw material for the cellulose nanofiber include wood pulp such as softwood pulp or hardwood pulp, non-wood pulp such as straw pulp or bagasse pulp, cotton pulp such as cotton lint or cotton linter, and bacterial cellulose. One kind of these components may be used, or two or more kinds thereof may be appropriately combined and used. Furthermore, these natural cellulose fibers may be subjected to a treatment such as beating in advance in order to increase a surface area.

Next, the oxidation treatment of the natural cellulose fiber is performed in the aqueous dispersion by using an N-oxyl compound as an oxidation catalyst. As such an N-oxyl compound, for example, other than TEMPO (2,2,6,6-tetramethylpiperidine-N-oxyl), TEMPO derivatives having various functional groups at the C4 position, such as 4-carboxy-TEMPO, 4-acetamide-TEMPO, 4-amino-TEMPO, 4-dimethylamino-TEMPO, 4-phosphonooxy-TEMPO, 4-hydroxy TEMPO, 4-oxy TEMPO, 4-methoxy TEMPO, 4-(2-bromoacetamide)-TEMPO, and 2-azaadamantane N-oxyl can be used. The amount of this N-oxyl compound added is sufficient to be set to a catalyst amount, and generally, can be set in a range of 0.1 to 10% by mass on an absolute dry basis with respect to the natural cellulose fiber.

In the oxidation treatment of the natural cellulose fiber, an oxidant and a co-oxidant are used in combination. Examples of the oxidant include halous acid, hypohalous acid, perhalic acid, and salts thereof, hydrogen peroxide, and perorganic acid, and of these, alkali metal hypohalites such as sodium hypochlorite and sodium hypobromite are preferred. Furthermore, as the co-oxidant, for example, an alkali metal bromide such as sodium bromide can be used. The amount of the oxidant used is generally in a range of about 1 to 100% by mass based on absolute dry with respect to the natural cellulose fiber, and the amount of the co-oxidant used is generally in a range of about 1 to 30% by mass on an absolute dry basis with respect to the natural cellulose fiber.

At the time of the oxidation treatment of the natural cellulose fiber, the pH of the aqueous dispersion is maintained in a range of 9 to 12, which is preferable from the viewpoint of efficiently advancing oxidation reaction. Furthermore, the temperature of the aqueous dispersion at the time of the oxidation treatment can be arbitrarily set in a range of 1° C. to 50° C., and the reaction can be performed even at room temperature without temperature control. The reaction time can be set in a range of 1 to 240 minutes. Incidentally, a penetrant can also be added to the aqueous dispersion in order to impregnate a chemical agent in the inside of the natural cellulose fiber and introduce a larger number of carboxyl groups into the fiber surface. Examples of the penetrant include anionic surfactants such as a carboxylate, a sulfate ester salt, a sulfonate, a phosphate ester salt and non-ionic surfactants such as a polyethyleneglycol type surfactant and a polyhydric alcohol type surfactant.

After the oxidation treatment of the natural cellulose fiber, it is preferable to perform a refining treatment of removing impurities such as an unreacted oxidant and various by-products contained in the aqueous dispersion before performing microfabrillating. Specifically, for example, a method of repeatedly washing with water and filtering the natural cellulose fiber obtained after the oxidation treatment can be used. The natural cellulose fiber obtained after the refining treatment is usually subjected to a microfabrillating treatment in a state of being impregnated in an appropriate amount of water, but as necessary, may be subjected to a drying treatment to be formed in a fiber or powder.

Next, the microfabrillating of the natural cellulose treatment is performed in a state where natural cellulose fibers subjected to a refining treatment as desired are dispersed in a solvent such as water. A solvent as a dispersion medium that is used in a microfabrillating treatment is usually preferably water, and as desired, organic solvents soluble in water such as alcohols (such as methanol, ethanol, isopropanol, isobutanol, sec-butanol, tert-butanol, methylcellosolve, ethylcellosolve, ethylene glycol, and glycerin), ethers (such as ethylene glycol dimethyl ether, 1,4-dioxane, and tetrahydrofuran), and ketones (such as acetone, methyl ethyl ketone, N,N-dimethylformamide, N,N-dimethylacetamide, and dimethylsulfoxide) may be used, and mixtures thereof can also be used. The solid content concentration of the natural cellulose fibers in these solvent dispersion liquids is suitable 50% by mass. When the solid content concentration of the natural cellulose fibers exceeds 50% by mass, extremely high energy for dispersing is required, which is unfavorable. The microfabrillating of the natural cellulose treatment can be performed by using a dispersing device such as a low-pressure homogenizer, a high-pressure homogenizer, a grinder, a cutter mill, a ball mill, a jet mill, a beater, a defibrator, a single screw extruder, a twin screw extruder, an ultrasonic agitator, or a home juicer-mixer.

The cellulose nanofiber obtained by the microfabrillating treatment can be formed into a suspension having an adjusted solid content concentration or a dried powder according to need. Herein, when the suspension is produced, only water may be used as a dispersion medium, and water mixed with other organic solvents, for example, a mixed solvent of an alcohol such as ethanol, a surfactant, an acid, a base, and the like may be used.

In the above-described oxidation and microfabrillating treatments of the natural cellulose fiber, a hydroxyl group at C6-position of a cellulose molecule-constituting unit is selectively oxidized to a carboxyl group via an aldehyde group, thereby a high crystalline cellulose nanofiber having the above predetermined number average fiber diameter composed of a cellulose molecule having a content of the carboxyl group of 0.1 to 3 mmol/g. This high crystalline cellulose nanofiber has Type I crystal structure of cellulose. This means that the cellulose nanofiber is produced by surface oxidation and microfabrillating of a natural cellulose molecule having Type I crystal structure. That is, the natural cellulose fibers have a higher ordered solid structure through formation of many bundles of fine fibers, called microfibrils, produced in a biosynthesis process of the natural cellulose fibers, and strong cohesion force (hydrogen bonding between surfaces) among microfibrils is reduced by introducing an aldehyde group or a carboxyl group by the oxidation treatment and then cellulose nanofibers are obtained by the microfabrillating treatment. The content of the carboxyl group can be increased or decreased by adjusting conditions of the oxidation treatment, thereby changing polarity of the cellulose fiber, or an average fiber diameter, an average fiber length, an average aspect ratio, and the like of the cellulose nanofibers can be controlled by electrostatic repulsion of the carboxyl group or the microfabrillating treatment.

The natural cellulose fibers having Type I crystal structure can be identified from the fact that the natural cellulose fiber has typical peaks at two positions around 2θ=14° to 17° and around 2θ=22° to 230 in a diffraction profile obtained by measuring a wide angle X-ray diffraction image thereof. Furthermore, introducing of a carboxyl group into the cellulose molecule of the cellulose nanofiber can be confirmed by presence of absorption (around 1608 cm$^{-1}$) caused by the carbonyl group in a sample from which moisture content is completely removed in attenuated total reflection infrared spectroscopic spectra (ATR). In the case of a carboxyl group (COOH), the carboxyl group has absorption at 1730 cm$^{-1}$ in the above-described measurement.

Incidentally, since a halogen atom is attached or bonded to the natural cellulose fiber obtained after the oxidation treatment, a dehalogenation treatment can also be performed for the purpose of removing such a residual halogen atom. The dehalogenation treatment can be performed by immersing the natural cellulose fiber obtained after the oxidation treatment in a hydrogen peroxide solution or an ozone solution.

Specifically, for example, the natural cellulose fiber obtained after the oxidation treatment is immersed in a hydrogen peroxide solution having a concentration of 0.1 to 100 g/L under a condition of a bath ratio of about 1:5 to 1:100, preferably about 1:10 to 1:60 (mass ratio). The concentration of the hydrogen peroxide solution in this case is preferably 1 to 50 g/L and more preferably 5 to 20 g/L. Furthermore, the pH of the hydrogen peroxide solution is preferably 8 to 11 and more preferably 9.5 to 10.7.

The amount [mmol/g] of the carboxyl group in cellulose with respect to the mass of the cellulose nanofiber contained in the aqueous dispersion can be evaluated by the following method. That is, 60 ml of a 0.5 to 1% by mass cellulose nanofiber sample whose dry mass has been precisely weighed in advance is prepared, the pH is adjusted to about 2.5 by an aqueous solution of 0.1 M hydrochloric acid, an aqueous solution of 0.05 M sodium hydroxide is then added dropwise until the pH becomes about 11, and the electrical conductivity is measured. From the amount of sodium hydroxide (V) consumed during a weakly acidic neutralization phase in which a change in the electrical conductivity is gradual, the functional group amount can be determined by using Equation below. This functional group amount indicates the amount of carboxyl groups.

$$\text{Functional group amount [mmol/g]} = V \text{ [ml]} \times 0.05 / \text{Cellulose nanofiber sample [g]}$$

Furthermore, the cellulose nanofiber to be used in the present invention may be chemically modified and/or physically modified to enhance functionality.

The chemical modification can be performed, for example, by methods of adding a functional group by acetalization, acetylation, cyanoethylation, etherification, isocyanation, or the like, compounding an inorganic material such as silicate or titanate by chemical reaction, a sol-gel method, or the like, or coating an inorganic material. As a chemical modification method, for example, a method of immersing a cellulose nanofiber molded into a sheet in acetic anhydride and heating the cellulose nanofiber is exemplified. Furthermore, in the case of a cellulose nanofiber obtained by oxidizing a cellulose fiber using an N-oxyl compound as an oxidation catalyst, a method of modifying a carboxyl in a molecule with an amine compound, a quaternary ammonium compound, or the like by an ionic bond or an amide bond is exemplified.

Examples of the physical modification method include coating methods using a chemical vapor deposition method (CVD method) or a plating method such as non-electrolytic plating or electrolytic plating. These modifications may be performed before or after the treatment.

<Cyanate ester Resin>

The curable composition may contain a cyanate ester resin. A predetermined poly(phenylene ether) is used in combination with a cyanate ester resin, and thereby a cured film which retains low-dielectric characteristics and is excellent in heat resistance, elongation characteristics, and the like can be formed.

The cyanate ester resin is a compound having two or more cyanate ester groups (—OCN) in one molecule.

Any conventionally known cyanate ester resins can be used. Examples of the cyanate ester resin include a phenol novolak type cyanate ester resin, an alkylphenol novolak type cyanate ester resin, a dicyclopentadiene type cyanate ester resin, a bisphenol A type cyanate ester resin, a bisphenol F type cyanate ester resin, a bisphenol M type cyanate ester resin, and a bisphenol S type cyanate ester resin. Furthermore, the cyanate ester resin may be a prepolymer that is partially triazinized.

Such a cyanate ester resin may be any of a monomer, an oligomer, and a polymer.

One kind of the cyanate ester resin may be used, or two or more kinds thereof may be combined and used.

The content of the cyanate ester resin is, for example, the predetermined poly(phenylene ether):the cyanate ester resin=1:99 to 99:1 and preferably 10:90 to 90:10 at a mass ratio.

<Epoxy Resin>

The curable composition may contain an epoxy resin.

The epoxy resin is a compound having one or more (preferably two or more) epoxy groups in one molecule. The epoxy group reacts with the hydroxyl group of the predetermined poly(phenylene ether) or the functional group of the elastomer described below so that these components are bonded to each other. As a result, a cured product excellent in solvent resistance can be obtained.

Examples of the epoxy resin include butyl glycidyl ether, phenyl glycidyl ether, glycidyl (meth)acrylate, a bisphenol A type epoxy resin, a bisphenol S type epoxy resin, a bisphenol F type epoxy resin, a phenol novolak type epoxy resin, a cresol novolak type epoxy resin, a bisphenol A novolak type epoxy resin, a trisphenol methane type epoxy resin, an alicyclic epoxy resin, a heterocyclic epoxy resin, a glycidyl ester-based resin, a glycidyl amine-based resin, trimethylolpropane polyglycidyl ether, phenyl-1,3-diglycidyl ether, biphenyl-4,4'-diglycidyl ether, 1,6-hexanediol diglycidyl ether, diglycidyl ether of ethylene glycol or propylene glycol, sorbitol polyglycidyl ether, tris(2,3-epoxypropyl) isocyanurate, triglycidyl tris(2-hydroxyethyl)isocyanurate.

The blending amount of the epoxy resin may be 10 to 50 parts by mass with respect to 100 parts by mass of the poly(phenylene ether). Alternatively, the blending amount of the epoxy resin may be 3 to 25% by mass based on the total amount of solid content of the composition.

<Phenol Novolak Resin>

The curable composition may contain a phenol novolak resin. Such a phenol novolak resin is preferably used in combination with an epoxy resin and an elastomer having a reactive functional group that reacts with an epoxy group.

The phenol novolak resin is compounds having the following structures or compounds in which these structures are modified.

[Chemical Formula 23]

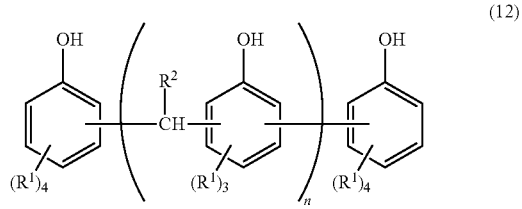

(12)

In General Formula (12), R1's each independently represent a hydrogen atom, a hydroxyl group, an alkyl group having 1 to 10 carbon atoms, a cycloalkyl group, or an aryl group. R2's each independently represent a hydrogen atom, an alkyl group having 1 to 10 carbon atoms, a cycloalkyl group, or an aryl group. An alkyl group, a cycloalkyl group, and an aryl group may mutually have these groups as substituents. n is a number of 1 to 10.

As a method of synthesizing the phenol novolak resin, a method of polycondensing various phenol compounds with an aldehyde compound such as formaldehyde is exemplified.

Examples of the phenol compound include phenol, p-cresol, m-cresol, o-cresol, 2,3-dimethylphenol, 2,4-dimethylphenol, 2,5-dimethylphenol, 2,6-dimethylphenol, 3,4-dimethylphenol, 3,5-dimethylphenol, 2,3,4-trimethylphenol, 2,3,5-trimethylphenol, 3,4,5-trimethylphenol, 2,4,5-trimethylphenol, methylene bisphenol, methylenebis p-cresol, bisphenol A, resorcin, catechol, 2-methylresorcin, 4-methylresorcin, o-chlorophenol, m-chlorophenol, p-chlorophenol, 2,3-dichlorophenol, m-methoxyphenol, p-methoxyphenol, p-butoxyphenol, o-ethylphenol, m-ethylphenol, p-ethylphenol, 2,3-diethylphenol, 2,5-diethylphenol, p-isopropylphenol, a-naphthol, and P-naphthol.

Examples of the aldehyde compound include acetaldehyde, benzaldehyde, hydroxybenzaldehyde, chloroacetaldehyde, paraformaldehyde, and trioxane.

The weight average molecular weight of the phenol novolak resin may be 1,000 to 50,000 or 2,000 to 20,000.

The blending amount of the phenol novolak resin may be 3 to 20 parts by mass with respect to 100 parts by mass of the poly(phenylene ether). Alternatively, the blending amount of the elastomer may be 1 to 10% by mass based on the total amount of solid content of the composition. In a case where the mixing amount is within the above-described range, satisfactory curing property, moldability, and chemical resistance can be realized in a balanced manner.

<Elastomer>

The curable composition may contain an elastomer. The curable composition contains an elastomer, and thereby film formability is improved. The effects of improving tensile strength and adhesion are more excellent than a combination of a conventional poly(phenylene ether) (unbranched poly(phenylene ether)) and an elastomer. The reason for this is considered that the branched poly(phenylene ether) and the elastomer are excellent in compatibility with each other and thereby a homogeneous cured film is obtainable.

It is preferable that the elastomer has sufficient compatibility with the predetermined poly(phenylene ether) or the side-chain epoxidized poly(phenylene ether).

The elastomer is classified roughly into a thermosetting elastomer and a thermoplastic elastomer. Both elastomers can be used since film formability can be improved, but a thermoplastic elastomer is more preferred since the tensile characteristics of a cured product can be improved.

The curable composition preferably contains a thermoplastic elastomer. A thermoplastic elastomer is blended in the composition, and thereby the tensile characteristics of the cured product can be improved. The cured product of the poly(phenylene ether) used in the present invention has a low elongation at breakage and is likely to become brittle in some cases, but by using a thermoplastic elastomer in combination, the elongation at breakage can be improved while maintaining dielectric characteristics. The thermoplastic elastomer is preferably used in combination with silica.

Examples of the thermosetting elastomer include diene-based synthetic rubber such as polyisoprene rubber, polybutadiene rubber, styrene-butadiene rubber, polychloroprene rubber, nitrile rubber, and ethylene-propylene rubber; non-diene-based synthetic rubber such as ethylene-propylene rubber, butyl rubber, acryl rubber, polyurethane rubber, fluororubber, silicone rubber, and epichlorohydrin rubber; and natural rubber.

Examples of the thermoplastic elastomer include a styrene-based elastomer, an olefin-based elastomer, a urethane-based elastomer, a polyester-based elastomer, a polyamide-based elastomer, an acryl-based elastomer, and a silicone-based elastomer. From the viewpoint of having high compatibility with the poly(phenylene ether) and high dielectric characteristics, it is particularly preferable that at least a part of the elastomer is a styrene-based elastomer.

The content ratio of the styrene-based elastomer in 100% by weight of the elastomer may be, for example, 10% by weight or more, 20% by weight or more, 30% by weight or more, 40% by weight or more, 50% by weight or more, 60% by weight or more, 70% by weight or more, 80% by weight or more, 90% by weight or more, 95% by weight or more, or 100% by weight.

Examples of the styrene-based elastomer include styrene-butadiene copolymers such as a styrene-butadiene-styrene block copolymer; styrene-isoprene copolymers such as a styrene-isoprene-styrene block copolymer; a styrene-ethylene-butylene-styrene block copolymer, and a styrene-ethylene-propylene-styrene block copolymer. In addition, hydrogenated products of these copolymers are exemplified. From the viewpoint that the dielectric characteristics of the cured product thus obtained are particularly satisfactory, a styrene-based elastomer not having an unsaturated carbon bond such as a styrene-ethylene-butylene-styrene block copolymer is preferred.

The content ratio of the styrene block in the styrene-based elastomer is preferably 20 to 70 mol %. Alternatively, the content ratio of the styrene block in the styrene-based elastomer is preferably 10 to 70% by mass, 30 to 60% by mass, or 40 to 50% by mass. The content ratio of the styrene block can be obtained from the ratio of integral of spectra measured by 1H-NMR.

Herein, as a raw material monomer of the styrene-based elastomer, not only styrene but also styrene derivatives such as a-methylstyrene, 3-methylstyrene, 4-propylstyrene, and 4-cyclohexylstyrene are included.

The weight average molecular weight of the elastomer may be 1,000 to 300,000 or 2,000 to 150,000. When the weight average molecular weight is equal to or more than the above-described lower limit value, low thermal expansibility is excellent; on the other hand, when the weight average molecular weight is equal to or less than the above-described upper limit value, compatibility with other components is excellent.

Particularly, the weight average molecular weight of the thermoplastic elastomer may be 1,000 to 300,000 or 2,000 to 150,000. When the weight average molecular weight is equal to or more than the above-described lower limit value, low thermal expansibility is excellent; on the other hand, when the weight average molecular weight is equal to or less than the above-described upper limit value, compatibility with other components is excellent.

The weight average molecular weight of the elastomer is measured by GPC and converted based on a calibration curve produced using standard polystyrene.

The blending amount of the elastomer may be 50 to 200 parts by mass with respect to 100 parts by mass of the poly(phenylene ether). In other words, the blending amount of the elastomer may be 30 to 70% by mass based on the total amount of solid content of the composition. In a case where the mixing amount is within the above-described range, satisfactory curing property, moldability, and chemical resistance can be realized in a balanced manner.

Particularly, the blending amount of the thermoplastic elastomer may be 30 to 100 parts by mass with respect to 100 parts by mass of the poly(phenylene ether). In other words, the blending amount of the thermoplastic elastomer may be 3 to 20% by mass based on the total amount of solid content of the composition. In a case where the mixing amount is within the above-described range, satisfactory curing property, moldability, and chemical resistance can be realized in a balanced manner.

The elastomer may have a functional group (including a bond) that reacts with other components.

For example, the elastomer may have an unsaturated carbon bond as a reactive functional group. In this embodiment, the elastomer can be cross-linked to the unsaturated carbon bond of the preferred branched poly(phenylene ether) according to the present invention, and has an effect such as decreasing of the risk of bleeding-out.

In a case where the curable composition of the present invention contains an epoxy resin in addition thereto/separately therefrom, the elastomer may have a reactive functional group that reacts with the epoxy group.

(Elastomer having reactive functional group that reacts with epoxy group) The curable composition may contain an elastomer having a reactive functional group that reacts with an epoxy group (for example, an epoxy group of the epoxy resin). The elastomer having a reactive functional group that reacts with an epoxy group is preferably used in combination with an epoxy resin. Incidentally, in a case where the poly(phenylene ether) is a side-chain epoxidized poly(phenylene ether), the elastomer having a reactive functional group may react with the epoxy group of the side-chain epoxidized poly(phenylene ether).

As described above, by containing an elastomer, the tensile characteristics of the cured product are improved. Furthermore, the elastomer reacts with the epoxy group (for example, the epoxy group of the epoxy resin) to be cross-linked, and thus the solvent resistance of the cured product is improved.

Examples of the reactive functional group that reacts with an epoxy group include a hydroxyl group, a carboxy group, an acid anhydride group, an ester group, an amino group, and a thiol group. The acid anhydride group indicates a bond represented by —CO—O—CO— that is formed by condensation bonding carboxy groups. The ester group indicates a bond represented by —C(=O)O—.

Such an elastomer is obtained, for example, by introducing a reactive functional group reacting with an epoxy group into the elastomer.

As an introducing method of a reactive functional group that reacts with an epoxy group, for example, a method of synthesizing an elastomer by using (meth)acrylic acid, maleic acid, anhydrides or esters thereof, or the like as a constituent monomer is mentioned. Furthermore, a method of modifying an elastomer by using (meth)acrylic acid, maleic acid, anhydrides or esters thereof, or the like is exemplified. Moreover, hydrogenation of an unsaturated bond remaining in a diene-based elastomer is exemplified.

As the elastomer having a reactive functional group that reacts with an epoxy group, particularly, maleated polybutadiene, maleated polybutadiene half ester having a free carboxy group, carboxy-terminated butadiene acrylonitrile, amino group-containing butadiene acrylonitrile, and the like are exemplified. Of these, particularly, carboxy-terminated butadiene acrylonitrile called CTBN is preferred.

The maleated polybutadiene is obtained by reaction of polybutadiene with maleic anhydride. The maleated polybutadiene half ester having a free carboxy group is obtained by reaction of maleated polybutadiene with primary alcohol.

The carboxy-terminated butadiene acrylonitrile is suitably those having a molecular weight of 2,000 to 5,000. Examples of commercialized products include HYCAR CTBN 2000×162, CTBN 1300×31, CTBN 1300×8, CTBN 1300×13, and CTBNX 1300×9 manufactured by Ube Industries, Ltd.

<Dispersant>

The curable composition may contain a dispersant.

The composition contains a dispersant, and thereby dispersibility and flowability of the aforementioned poly(phenylene ether) and elastomer as well as an arbitrary component such as silica in the composition can be improved. Since voids are less likely to occur when the flowability of the poly(phenylene ether) or the elastomer is improved, a stable peeling strength (peeling strength with respect to a low-roughness copper foil) and a stable tensile elongation at breakage can be obtained. Homogeneity of the composition and the dry film is improved, and a cured product to be obtained can exhibit excellent low-dielectric characteristics, adhesion, and flame retardancy (halogen-free) without decreasing heat resistance. Furthermore, the effect of decreasing the viscosity of the composition is also obtained.

The branched poly(phenylene ether) shows excellent affinity/compatibility with various materials as compared to a conventional unbranched poly(phenylene ether). Therefore, affinity/compatibility with the dispersant is also high, and the effect of the dispersant (an improvement effect of dispersibility, flowability, or the like) is significantly exhibited. In the conventional unbranched poly(phenylene ether), such an improvement effect is not obtained even when the dispersant is added.

The dispersant preferably has at least one of an acidic group and a basic group. An amphoteric dispersant (that is, a dispersant having an acidic group and a basic group) is particularly preferred since it does not decrease the radical polymerization property of the composition and the heat resistance of the cured product.

Examples of the acidic group include a carboxyl group, an acid anhydride group, a sulfonic acid group (a sulfo group), a thiol group, a phosphoric acid group, an acidic phosphoric acid ester group, a hydroxy group, and a phosphonic acid group. As the acidic group, of these, a phosphoric acid group, a carboxyl group, a hydroxy group, and a sulfo group are preferred. Moreover, a phosphoric acid group and a carboxyl group are more preferred.

Examples of the basic group include an amino group, an imino group, an ammonium base, an imidazoline group, a pyrrol group, an imidazole group, a benzimidazole group, a pyrazole group, a pyridine group, a pyrimidine group, a pyrazine group, a pyrrolidine group, a piperidine group, a piperazine group, an indole group, an indoline group, a purine group, a quinoline group, an isoquinoline group, a quinuclidine group, and a triazine group. Of them, an amino group, an imidazoline group, an ammonium base, a pyrrol group, an imidazole group, a benzimidazole group, a pyrazole group, a pyridine group, a pyrimidine group, a pyrazine group, a pyrrolidine group, a piperidine group, a piperazine group, an indole group, an indoline group, a purine group, a quinoline group, an isoquinoline group, a quinuclidine group, and a triazine group are preferred. An amino group and an imidazoline group are more preferred. As the ammonium base, for example, an alkylol ammonium base is exemplified.

Examples of the dispersant having an amino group include DISPERBYK-108, DISPERBYK-2013, DISPERBYK-180, and DISPERBYK-106 manufactured by BYK-Chemie GmbH. Examples of the dispersant having a phosphoric acid group and an imidazoline group include BYK-W969 manufactured by BYK-Chemie GmbH. Examples of the dispersant having a carboxyl group and an amino group include BYK-W966 manufactured by BYK-Chemie GmbH.

The content of the dispersant may be 1 to 10 parts by mass or 2 to 5 parts by mass with respect to 100 parts by mass of the poly(phenylene ether). Alternatively, the content of the dispersant may be 1 to 5% by mass or 0.5 to 3% by mass based on the total amount of solid content of the composition.

<Other Components>

The curable composition may contain a peroxide. Furthermore, the curable composition may contain a crosslinking curing agent. Furthermore, the curable composition may contain other components (a thermosetting catalyst, a solvent, and the like) within the range that would not impair the effects of the present invention.

(Peroxide)

The peroxide has an action of opening an unsaturated carbon bond contained in a preferred poly(phenylene ether) and promoting a cross-linking reaction.

Examples of the peroxide include methyl ethyl ketone peroxide, methyl acetoacetate peroxide, acetylaceto peroxide, 1,1-bis(t-butylperoxy)cyclohexane, 2,2-bis(t-butylperoxy)butane, t-butyl hydroperoxide, cumene hydroperoxide, diisopropylbenzene hydroperoxide, 2,5-dimethylhexane-2, 5-dihydroperoxide, 1,1,3,3-tetramethylbutyl hydroperoxide, di-t-butyl hydroperoxide, t-butyl hydroperoxide, dicumyl peroxide, 2,5-dimethyl-2,5-di(t-butylperoxy)hexane, 2,5-dimethyl-2,5-di(t-butylperoxy)hexine, 2,5-dimethyl-2,5-di(t-butylperoxy)-3-butene, acetyl peroxide, octanoyl peroxide, lauroyl peroxide, benzoyl peroxide, m-toluyl peroxide, diisopropyl peroxydicarbonate, t-butylene peroxybenzoate, di-t-butyl peroxide, t-butylperoxy isopropyl monocarbonate, and α,α'-bis(t-butylperoxy-m-isopropyl)benzene. Only one kind of the peroxide may be used, or two or more kinds thereof may be used.

As the peroxide, of these, from the viewpoints of ease of handleability and reactivity, a peroxide having a one-minute half-life temperature in a range of 130° C. to 180° C. is desirable. Such a peroxide has a relatively high reaction initiation temperature, thus not promoting curing when the curing is not required, for example, during drying, and not impairing the storage stability of the poly(phenylene ether) resin composition; volatility of such a peroxide is low, thus preventing vaporization during drying and storage, and thus stability is satisfactory.

The amount of the peroxide added is preferably 0.01 to 20 parts by mass, more preferably 0.05 to 10 parts by mass, and particularly preferably 0.1 to 10 parts by mass in terms of the total amount of the peroxide with respect to 100 parts by mass of the solid content of the curable composition. When the total amount of the peroxide is in this range, a degradation in film quality when a coating film is formed can be prevented while the effect at a low temperature is sufficient.

Furthermore, as necessary, an azo compound such as azobisisobutyronitrile or azobisisovaleronitrile and a radical initiator such as dicumyl or 2,3-diphenylbutan may be contained.

(Crosslinking Curing Agent)

The crosslinking curing agent reacts with the unsaturated carbon bond contained in the preferred poly(phenylene ether) to form a three-dimensional cross-linkage.

As the crosslinking curing agent, those having satisfactory compatibility with the poly(phenylene ether) are used, and polyfunctional vinyl compounds such as divinylbenzene, divinylnaphthalene, and divinylbiphenyl; vinylbenzyl ether-based compounds synthesized from reaction of phenol and vinylbenzyl chloride; allyl ether-based compounds synthesized from reaction of a styrene monomer, phenol, and allyl chloride; trialkenylisocyanurate, and the like are preferred. As the crosslinking curing agent, trialkenylisocyanurate that has particularly satisfactory compatibility with the poly(phenylene ether) is preferred, and of them, specifically, triallyl isocyanurate (hereinafter, referred to as TAIC (registered trademark)) and triallyl cyanurate (hereinafter, referred to as TAC) are preferred. These exhibit low-dielectric characteristics and can enhance heat resistance. Particularly, TAIC (registered trademark) is excellent in compatibility with the poly(phenylene ether), which is preferred.

Furthermore, as the crosslinking curing agent, a (meth)acrylate compound (a methacrylate compound and an acrylate compound) may be used. In particular, a tri- to penta-functional (meth)acrylate compound is preferably used. As the tri- to penta-functional methacrylate compound, trimethylolpropane trimethacrylate or the like can be used, while as the tri- to penta-functional acrylate compound, trimethylolpropane triacrylate or the like can be used. When these cross-linking agents are used, heat resistance can be enhanced. Only one kind of the crosslinking curing agent may be used, or two or more kinds thereof may be used.

The preferred predetermined poly(phenylene ethers) contains a hydrocarbon group having an unsaturated carbon bond, and particularly, is cured with a crosslinking curing agent, and thereby a cured product excellent in dielectric characteristics can be obtained.

The blending ratio of the poly(phenylene ether) and the crosslinking curing agent is preferably 20:80 to 90:10 and more preferably 30:70 to 90:10 in terms of parts by mass. When the content of the poly(phenylene ether) is 20 parts by mass or more, proper toughness strength is obtained, and when the content thereof is 90 parts by mass or less, heat resistance is excellent.

In a case where the curable composition contains a side-chain epoxidized poly(phenylene ether) as the predetermined poly(phenylene ether), the curable composition preferably contains an epoxy group-reactive crosslinking curing agent.

The epoxy group-reactive crosslinking curing agent is to three-dimensionally cross-link the side-chain epoxidized poly(phenylene ether).

The epoxy group-reactive crosslinking curing agent is not limited as long as it is a crosslinking curing agent that is generally used together with an epoxy resin. Examples of such an epoxy group-reactive crosslinking curing agent include compounds having a plurality of reaction groups, such as an amino group, a carboxyl group, an acid anhydride group, a phenolic hydroxyl group, a thiol group, and an ester group, in one molecule. More specific examples thereof include an amide-based curing agent, an amine-based curing agent, a phenol-based curing agent, an imidazole-based curing agent, an acid anhydride-based curing agent, and an ester-based curing agent. Only one kind of the epoxy group-reactive crosslinking curing agent may be used, or two or more kinds thereof may be used.

Examples of the amide-based curing agent include dicyandiamide and aliphatic polyamide.

Examples of the amine-based curing agent include diethylene triamine, triethylenetetramine, tetraethylenepentamine, pentaethylenehexamine, meta-xylenediamine, isophoronediamine, norbornene diamine, 1,3-bisaminomethylcyclohexane, N-aminoethyl piperazine, diaminodiphenylmethane, m-phenylenediamine, p-phenylenediamine, ammonia, triethylamine, diethylamine, 3,3'-diaminodiphenylsulfone, 4,4'-diaminodiphenylsulfone, 4,4'-diaminodiphenylmethane, and 4,4'-diaminodiphenyl ether.

Examples of the phenol-based curing agent include bisphenol A, bisphenol F, a phenol novolak resin, a cresol novolak resin, and a p-xylene novolak resin.

Specific examples of the imidazole-based curing agent include 2-methylimidazole, 2-ethyl-4-methylimidazole, 2-phenylimidazole, and 2-phenyl-4-methyl-5-hydroxymethylimidazole.

Examples of the acid anhydride-based curing agent include phthalic anhydride, trimellitic anhydride, pyromellitic anhydride, tetrahydrophthalic anhydride, methyltetrahydrophthalic anhydride, hexahydrophthalic anhydride, methylhexahydrophthalic anhydride, methylnadic anhydride, dodecyl succinic anhydride, chlorendic anhydride, benzophenone tetracarboxylic anhydride, ethylene glycol bis(anhydrotrimate), and methylcyclohexenetetracarboxylic anhydride.

As the epoxy group-reactive crosslinking curing agent, an ester-based curing agent having two or more ester groups in one molecule is particularly preferred. Lots of curing agents react with an epoxy group to generate a hydroxyl group, and thus there is a concern that negative effects on dielectric characteristics may occur. On the other hand, the ester-based curing agent does not generate a hydroxyl group when reacting with an epoxy group, and thus a cured product can exhibit satisfactory dielectric characteristics. The ester-based curing agent can be obtained by condensation reaction of a carboxylic compound and a hydroxy compound.

Examples of the carboxylic compound include acetic acid, propionic acid, fluoroacetate, benzoic acid, nitrobenzoic acid, chlorobenzoic acid, thiobenzoic acid, adipic acid, sebacic acid, succinic acid, maleic acid, itaconic acid, 1,2,3,4-butanetetracarboxylic acid, phthalic acid, isophthalic acid, terephthalic acid, benzenetricarboxylic acid, and benzenetetracarboxylic acid.

As the hydroxy compound, a phenol compound or a naphthol compound is preferred. Examples of the phenol compound or the naphthol compound include hydroquinone, resorcin, bisphenol A, bisphenol F, bisphenol S, phenolphthalin, methylated bisphenol A, methylated bisphenol F, methylated bisphenol S, phenol, o-cresol, m-cresol, p-cresol, catechol, a-naphthol, 0-naphthol, 1,5-dihydroxynaphthalene, 1,6-dihydroxynaphthalene, 2,6-dihydroxynaphthalene, dihydroxybenzophenone, trihydroxybenzophenone, tetrahydroxybenzophenone, phloroglucin, benzenetriol, dicyclopentadienyl diphenol, and phenol novolak.

As the ester-based curing agent, generally, compounds having two or more ester groups having a high reaction activity, such as phenol esters, thiophenol esters, N-hydroxyamine esters, and esters of heterocycle hydroxy compounds, in one molecule are preferably used. Examples of a commercially available active ester compound include an active ester compound including a dicyclopentadiene type diphenol condensed structure, an active ester compound including a naphthalene structure, an active ester compound containing a phenol novolak acetylated product, and an active ester compound containing a phenol novolak benzoylated product.

Specific examples thereof include EXB9451, EXB9460, and HPC8000-65T (manufactured by DIC Corporation, active group equivalent: about 223) as an active ester compound including a dicyclopentadiene type diphenol condensed structure, DC808 (manufactured by Mitsubishi Chemical Corporation, active group equivalent: about 149) as an active ester compound containing a phenol novolak acetylated product, and YLH1026 (manufactured by Mitsubishi Chemical Corporation, active group equivalent: about 200), YLH1030 (manufactured by Mitsubishi Chemical Corporation, active group equivalent: about 201), YLH1048 (manufactured by Mitsubishi Chemical Corporation, active group equivalent: about 245), and 2,2-bis(4-acetoxyphenyl)propane (active ester equivalent: about 156) as an active ester compound containing a phenol novolak benzoylated product.

The blending amount of the epoxy group-reactive crosslinking curing agent may be 5 to 50 parts by mass with respect to 100 parts by mass of the side-chain epoxidized poly(phenylene ether). From another viewpoint, the blending amount of the epoxy group-reactive crosslinking curing agent may be 1 to 10% by mass based on the total amount of solid content of the composition. In a case where the blending amount is within the above-described range, toughness strength, heat resistance, and the like can be realized in a balanced manner.

(Thermosetting Catalyst)

The composition may contain a thermosetting catalyst.

Examples of the thermosetting catalyst include imidazole derivatives such as imidazole, 2-methylimidazole, 2-ethylimidazole, 2-ethyl-4-methylimidazole, 2-phenylimidazole, 4-phenylimidazole, 1-cyanoethyl-2-phenylimidazole, and 1-(2-cyanoethyl)-2-ethyl-4-methylimidazole;

amine compounds such as dicyandiamide, benzyldimethylamine, 4-(dimethylamino)-N,N-dimethylbenzylamine, 4-methoxy-N,N-dimethylbenzylamine, and 4-methyl-N,N-dimethylbenzylamine, hydrazine compounds such as adipic dihydrazide and sebacic dihydrazide;

S-triazine derivatives such as guanamine, acetoguanamine, benzoguanamine, melamine, 2,4-diamino-6-methacryloyloxyethyl-S-triazine, 2-vinyl-2,4-diamino-S-triazine, 2-vinyl-4,6-diamino-S-triazine/isocyanuric acid adduct, and 2,4-diamino-6-methacryloyloxyethyl-S-triazine/isocyanuric acid adduct; and phosphorus compounds such as triphenylphosphine.

Of these, since yellowing can be prevented even when the cured product is exposed to a temperature of 200° C. or higher, triphenylphosphine is preferred.

(Solvent)

The curable composition is usually provided or used in a state where the poly(phenylene ether) is dissolved in a solvent. Since the poly(phenylene ether) of the present invention has higher solubility with respect to a solvent than a conventional poly(phenylene ether), options of a solvent to be used can be widened depending on use application of the curable composition.

As an example of a solvent that is usable in the curable composition of the present invention, other than solvents that have been conventionally usable such as chloroform, methylene chloride, toluene, solvents having relatively high safeness such as N-methyl-2-pyrrolidone (NMP), tetrahydrofuran (THF), cyclohexanone, propyleneglycol monomethyl ether acetate (PMA), diethylene glycol monoethyl ether acetate (CA), methyl ethyl ketone, ethyl acetate, and the like are exemplified. Incidentally, the solvent may be N,N-dimethylformamide (DMF). Only one kind of the solvent may be used, or two or more kinds thereof may be used.

The content of the solvent in the curable composition is not particularly limited, and can be appropriately adjusted according to use application of the curable composition.

<<<Another Embodiment of Curable Composition>>>

Herein, the curable composition may be the following embodiment. Incidentally, the description of the aforementioned curable composition can be applied to the curable composition according to this embodiment in a range not contradictory. For example, the components exemplified in the above-described description of the curable composition can be arbitrarily blended in the curable composition according to this embodiment. Furthermore, conversely, the description of the curable composition according to this embodiment can also be applied to the aforementioned curable composition in a range not contradictory.

<Poly(phenylene ether)>

The curable composition may contain a side-chain epoxidized poly(phenylene ether) and another poly(phenylene ether) (non-side chain epoxidized poly(phenylene ether)) having a side-chain unsaturated carbon bond) different from the side-chain epoxidized poly(phenylene ether).

In this case, one or both of the side-chain epoxidized poly(phenylene ether) and another poly(phenylene ether) are a predetermined poly(phenylene ether) having a branched structure. More specifically, the curable composition may be any of the following embodiments:

(1) a composition containing a side-chain epoxidized poly(phenylene ether) not having a branched structure and a non-side chain epoxidized poly(phenylene ether) having a side-chain unsaturated carbon bond and having a branched structure;

(2) a composition containing a side-chain epoxidized poly(phenylene ether) having a branched structure and a non-side chain epoxidized poly(phenylene ether) having a side-chain unsaturated carbon bond and not having a branched structure; and (3) a composition containing a side-chain epoxidized poly(phenylene ether) having a branched structure and a non-side chain epoxidized poly(phenylene ether) having a side-chain unsaturated carbon bond and having a branched structure.

With such a combination of the side-chain epoxidized poly(phenylene ether) and another poly(phenylene ether), a cured product excellent in mechanical characteristics such as tensile characteristics is obtainable, and the composition is soluble in a solvent such as cyclohexanone. From the viewpoint of having excellent solvent resistance of the cured product, an embodiment in which both poly(phenylene ethers) have a branched structure is particularly preferred.

As such, the composition of this embodiment contains another poly(phenylene ether) different from the aforementioned side-chain epoxidized poly(phenylene ether). In other words, another poly(phenylene ether) is a poly(phenylene ether) (non-side chain epoxidized poly(phenylene ether)) that does not correspond to the side-chain epoxidized poly (phenylene ether).

A preferred side-chain epoxidized poly(phenylene ether) is one obtained by epoxidizing a poly(phenylene ether) having a branched structure and a side-chain unsaturated carbon bond. The poly(phenylene ether) has the branched structure, and thus the poly(phenylene ether) and the side-chain epoxidized poly(phenylene ether) derived therefrom are soluble in various solvents such as cyclohexanone.

Another preferred poly(phenylene ether) is a poly(phenylene ether) having a branched structure and a side-chain unsaturated carbon bond. The poly(phenylene ether) has the branched structure, and thus is soluble in various solvents such as cyclohexanone.

The poly(phenylene ether) having a branched structure and a side-chain unsaturated carbon bond and the non-side chain epoxidized poly(phenylene ether) having a side-chain unsaturated carbon bond and a branched structure have described above, and thus description thereof is omitted.

The poly(phenylene ether) not having a branched structure and having a side-chain unsaturated carbon bond can be produced similarity to the production of the branched poly (phenylene ether) having a side-chain unsaturated carbon bond, except that raw-material phenols including the phenol (C) and, as necessary, the phenol (D) and not including the phenol (A) and the phenol (B) are used, for example.

Furthermore, the side-chain epoxidized poly(phenylene ether) not having a branched structure can be produced by epoxidizing a side-chain unsaturated carbon bond of the poly(phenylene ether) not having a branched structure and having a side-chain unsaturated carbon bond, for example. Incidentally, the epoxidation of the side-chain unsaturated carbon bond can be performed based on the aforementioned side-chain epoxidation method, for example.

In a case where other poly(phenylene ether) does not have a branched structure, the number average molecular weight thereof is preferably 1,000 to 20,000 or 1,000 to 10,000. Moreover, the polydispersity index (PDI: weight average molecular weight/number average molecular weight) is preferably 1.5 to 20.

In a case where other poly(phenylene ether) has a branched structure, the number average molecular weight thereof is preferably 2,000 to 30,000. Moreover, the polydispersity index (PDI: weight average molecular weight/number average molecular weight) is preferably 1.5 to 20.

The blending amount of the other poly(phenylene ether) may be 200 to 1000 parts by mass with respect to 100 parts by mass of the side-chain epoxidized poly(phenylene ether). In other words, the blending amount of the other poly (phenylene ether) may be 70 to 90% by mass based on the total amount of solid content of the composition. In a case where the mixing amount is within the above-described range, satisfactory curing property, moldability, and chemical resistance can be realized in a balanced manner.

<Other Components>

The curable composition of this embodiment preferably contains a peroxide and/or an epoxy group-reactive crosslinking curing agent. Furthermore, the curable composition may contain other components within the range that would not impair the effects of the present invention. The peroxide, the epoxy group-reactive crosslinking curing agent, and other components are the same as described above, and thus the description thereof is omitted.

The curable composition of this embodiment is usually provided or used in a state where the poly(phenylene ether) is dissolved in a solvent medium (solvent). Since the preferred side-chain epoxidized poly(phenylene ether) and the preferred other poly(phenylene ether) have higher solubility with respect to a solvent than a conventional poly(phenylene ether), options of a solvent to be used can be widened depending on use application of the curable composition.

<<<<Cured Product<<<<

The cured product is obtained by curing the aforementioned curable composition.

The method of obtaining a cured product from the curable composition is not particularly limited, and can be appropriately changed according to the composition of the curable composition. As an example, after performing a step of coating a curable composition on a base material as described above (for example, coating with an applicator or the like), as necessary, a drying step of drying the curable composition may be performed, and a thermal curing step of thermally cross-linking a poly(phenylene ether) by heating (for example, heating with an inert gas oven, a hot plate, a vacuum oven, a vacuum press, or the like) may be performed. Incidentally, operation conditions in each step (for example, coating thickness, drying temperature and time, heating temperature and time, and the like) may be appropriately changed according to the composition, use application, and the like of the curable composition.

<<<<Dry Film and Prepreg<<<<

The dry film or prepreg of the present invention is obtained by applying or impregnating the aforementioned curable composition to a base material.

Herein, examples of the base material include metallic foils such as a copper foil, films such as a polyimide film, a polyester film, and a polyethylene naphthalate (PEN) film, and fibers such as glass cloth and aramid fibers.

The dry film is obtained, for example, by applying the curable composition onto a polyethylene terephthalate film, drying the composition, and as necessary, stacking a polypropylene film.

The prepreg is obtained, for example, by impregnating the curable composition into glass cloth and drying the composition.

<<<<Laminate<<<<

In the present invention, a laminate can be produced by using the aforementioned prepreg.

More specifically, one sheet or a plurality of sheets of the prepreg of the present invention are stacked, a metallic foil such as a copper foil is further stacked on one or both of upper and lower surfaces of the prepreg, this laminated body is subjected to heat pressure molding, and thereby a laminate whose one or both surfaces, which are laminated and integrated, have a metallic foil can be produced.

<<<<Electronic Component<<<<

Such a cured product has excellent dielectric characteristics and heat resistance, and thus can be used for electronic components and the like.

Electronic components including a cured product are not particularly limited, but preferably, millimeter-wave radars and the like for high-capacity and high-speed communication typified by the 5th generation communication system (5G) or advanced driver assistance system (ADAS) of automobiles are exemplified.

<<<<Specific Embodiments of Present Invention<<<<

Herein, the present invention may be the following inventions (I) to (XII).

<<<Invention (I)>>>

The invention (I) is
a method for producing a poly(phenylene ether), the method characterized by including a step of oxidation-polymerizing a raw-material phenol,
in which a phenol (A) satisfying at least both of Requirement 1 below and Requirement 2 below, or a phenol (B) satisfying at least Requirement 1 below but not satisfying Requirement 2 below and a phenol (C) not satisfying Requirement 1 below but satisfying Requirement 2 below are included as the raw-material phenols.

(Requirement 1)

To have hydrogen atoms in the ortho and para positions (Requirement 2)

To have a hydrogen atom in the para position and have a functional group containing an unsaturated carbon bond The invention (I) may be a poly(phenylene ether) obtained by the above-described producing method.

From another viewpoint, the invention (I) is a poly(phenylene ether) being obtained from one or more raw-material phenols, characterized in that the poly(phenylene ether) includes, as the raw-material phenols, a phenol (A) satisfying at least both of Requirement 1 below and Requirement 2 below, or a phenol (B) satisfying at least Requirement 1 below but not satisfying Requirement 2 below and a phenol (C) not satisfying Requirement 1 below but satisfying Requirement 2 below.

(Requirement 1)

To have hydrogen atoms in the ortho and para positions (Requirement 2)

To have a hydrogen atom in the para position and have a functional group containing an unsaturated carbon bond The phenol (A) may be a phenol (a) represented by Formula (1) below.

[Chemical Formula 24]

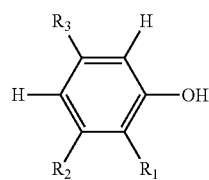

(1)

wherein $R_1$ to $R_3$ are a hydrogen atom or a hydrocarbon group having 1 to 15 carbon atoms; however, at least one of $R_1$ to $R_3$ is a hydrocarbon group having an unsaturated carbon bond.

The phenol (B) may be a poly(phenylene ether) that is a phenol (b) represented by Formula (2) below.

[Chemical Formula 25]

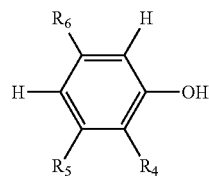

(2)

wherein $R_4$ to $R_6$ are a hydrogen atom or a hydrocarbon group having 1 to 15 carbon atoms; however, $R_4$ to $R_6$ do not have an unsaturated carbon bond.

The phenol (C) may be a poly(phenylene ether) that is a phenol (c) represented by Formula (3) below.

[Chemical Formula 26]

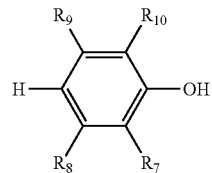

(3)

wherein $R_7$ and $R_{10}$ are a hydrocarbon group having 1 to 15 carbon atoms; $R_8$ and $R_9$ are a hydrogen atom or a hydrocarbon group having 1 to 15 carbon atoms; however, at least one of $R_7$ to $R_{10}$ is a hydrocarbon group having an unsaturated carbon bond.

The proportion of the phenol satisfying Requirement 1 above with respect to the total of the raw-material phenols may be 1 to 50 mol %.

1 g of the poly(phenylene ether) may be soluble in 100 g of cyclohexanone at 25° C.

The invention (I) may be a curable composition containing the poly(phenylene ether).

The curable composition may contain a peroxide.

The curable composition may contain a crosslinking curing agent.

According to the invention (I), it is possible to provide a thermosetting poly(phenylene ether) which retains low-dielectric characteristics and is soluble in various solvents.

<<<Invention (II)>>>

The invention (II) is a terminal-modified poly(phenylene ether) in which a terminal hydroxyl group of a poly(phenylene ether) is modified, characterized in that the poly(phenylene ether) is composed of one or more raw-material phenols including a phenol (A) satisfying at least both Requirement 1 below and Requirement 2 below, or a mixture of a phenol (B) satisfying at least Requirement 1 below but not satisfying Requirement 2 below and a phenol (C) not satisfying Requirement 1 below but satisfying Requirement 2 below.

(Requirement 1)

To have hydrogen atoms in the ortho and para positions (Requirement 2)

To have a hydrogen atom in the para position and have a functional group containing an unsaturated carbon bond The invention (II) may be a curable composition containing the terminal-modified poly(phenylene ether) and a peroxide and/or a crosslinking curing agent.

According to the invention (II), it is possible to provide a terminal-modified poly(phenylene ether) in which low-dielectric characteristics are further decreased while maintaining solubility in various solvents.

<<<Invention (III)>>>

The invention (III) is a curable composition characterized by containing a poly (phenylene ether) composed of one or more raw-material phenols including a raw-material phenol (A) satisfying at least both Requirement 1 below and Requirement 2 below, or a mixture of a phenol (B)

satisfying at least Requirement 1 below but not satisfying Requirement 2 below and a phenol (C) not satisfying Requirement 1 below but satisfying Requirement 2 below, and silica.

(Requirement 1)

To have hydrogen atoms in the ortho and para positions (Requirement 2)

To have a hydrogen atom in the para position and have a functional group containing an unsaturated carbon bond The curable composition may further contain a thermoplastic elastomer.

The curable composition may further contain a phosphorus-containing flame retardant.

According to the invention (III), it is possible to provide a curable composition that is a curable composition containing a poly(phenylene ether) soluble even in various solvents and is suitable for realizing a low dielectric loss tangent and obtaining a cured product having self-extinguishing property.

<<<Invention (IV)>>>

The present invention (IV) is
a curable composition containing a side-chain epoxidized poly(phenylene ether) and another poly(phenylene ether) different from the side-chain epoxidized poly(phenylene ether),
in which the side-chain epoxidized poly(phenylene ether) is a poly(phenylene ether) in which a part or the whole of a side-chain unsaturated carbon bond of the poly(phenylene ether) is epoxidized, the poly(phenylene ether) being composed of one or more raw-material phenols including a phenol (A) satisfying at least both Requirement 1 below and Requirement 2 below, or a mixture of a phenol (B) satisfying at least Requirement 1 below but not satisfying Requirement 2 below and a phenol (C) not satisfying Requirement 1 below but satisfying Requirement 2 below, and/or
the other poly(phenylene ether) is composed of one or more raw-material phenols including a phenol (A) satisfying at least both Requirement 1 below and Requirement 2 below, or a mixture of a phenol (B) satisfying at least Requirement 1 below but not satisfying Requirement 2 below and a phenol (C) not satisfying Requirement 1 below but satisfying Requirement 2 below.

(Requirement 1)

To have hydrogen atoms in the ortho and para positions (Requirement 2)

To have a hydrogen atom in the para position and have a functional group containing an unsaturated carbon bond The present invention (IV) may be
a curable composition further containing an epoxy group-reactive crosslinking curing agent.

According to the invention (IV), it is possible to provide a poly(phenylene ether)-containing curable composition which retains low-dielectric characteristics, is soluble also in various solvents (an organic solvent other than a highly toxic organic solvent, for example, cyclohexanone), is excellent in low-temperature curing property, and enables a film obtained by curing the composition to have excellent tensile characteristics.

<<<Invention (V)>>>

The invention (V) is a side-chain epoxidized poly(phenylene ether) obtained by epoxidizing a part or the whole of a side-chain unsaturated carbon bond of a poly(phenylene ether) having a side-chain unsaturated carbon bond, characterized in that the poly(phenylene ether) having a side-chain unsaturated carbon bond is composed of one or more raw-material phenols including a phenol (A) satisfying at least both Requirement 1 below and Requirement 2 below, or a mixture of a phenol (B) satisfying at least Requirement 1 below but not satisfying Requirement 2 below and a phenol (C) not satisfying Requirement 1 below but satisfying Requirement 2 below.

(Requirement 1)

To have hydrogen atoms in the ortho and para positions (Requirement 2)

To have a hydrogen atom in the para position and have a functional group containing an unsaturated carbon bond The invention (V) may be
a curable composition containing the side-chain epoxidized poly(phenylene ether) and an epoxy group-reactive crosslinking curing agent.

According to the invention (V), it is possible to provide a thermosetting poly(phenylene ether) which retains low-dielectric characteristics, is soluble also in various solvents (an organic solvent other than a highly toxic organic solvent, for example, cyclohexanone), and is excellent in low-temperature curing property.

<<<Invention (VI)>>>

The invention (VI) is
a curable composition characterized by containing
a poly(phenylene ether) composed of one or more raw-material phenols including a phenol satisfying at least Requirement 1, and
a cellulose nanofiber.

(Requirement 1)

To have hydrogen atoms in the ortho and para positions

A part or the whole of the poly(phenylene ether) may be
a poly(phenylene ether) composed of one or more raw-material phenols including a phenol (A) satisfying at least both Requirement 1 below and Requirement 2 below, or a mixture of a phenol (B) satisfying at least Requirement 1 below but not satisfying Requirement 2 below and a phenol (C) not satisfying Requirement 1 below but satisfying Requirement 2 below.

(Requirement 1)

To have hydrogen atoms in the ortho and para positions (Requirement 2)

To have a hydrogen atom in the para position and have a functional group containing an unsaturated carbon bond According to the invention (VI), it is possible to provide a curable composition which retains low-dielectric characteristics, is soluble also in various solvents (an organic solvent other than a highly toxic organic solvent, for example, cyclohexanone), and enables a film obtained by curing the composition to have excellent tensile characteristics and a low thermal expansion rate.

<<<Invention (VII)>>>

The invention (VII) is
a curable composition characterized by containing
a poly(phenylene ether) composed of one or more raw-material phenols including a phenol satisfying at least Requirement 1,
an epoxy resin, and
an elastomer having a reactive functional group that reacts with an epoxy group.

(Requirement 1)

To have hydrogen atoms in the ortho and para positions

A part or the whole of the poly(phenylene ether) may be
a poly(phenylene ether) composed of one or more raw-material phenols including a phenol (A) satisfying at least both Requirement 1 below and Requirement 2 below, or a mixture of a phenol (B) satisfying at least Requirement 1 below but not satisfying Requirement 2 below and a phenol (C) not satisfying Requirement 1 below but satisfying Requirement 2 below.

(Requirement 1)
To have hydrogen atoms in the ortho and para positions
(Requirement 2)
To have a hydrogen atom in the para position and have a functional group containing an unsaturated carbon bond The curable composition may further contain a phenol novolak resin.

The reactive functional group that reacts with an epoxy group may be a hydroxyl group, a carboxy group, an acid anhydride group, an ester group, an amino group, and a thiol group.

According to the invention (VII), it is possible to provide a curable composition which retains low-dielectric characteristics, is soluble also in various solvents (an organic solvent other than a highly toxic organic solvent, for example, cyclohexanone), and enables a film obtained by curing the composition to have excellent tensile characteristics.

<<<Invention (VIII)>>>
The invention (VIII) is
a poly(phenylene ether) characterized by being composed of one or more raw-material phenols including
a phenol satisfying at least Requirement 1, and
a phenol that is a polyhydric phenol having two or more phenolic hydroxyl groups in a molecular structure and does not a hydrogen atom in the ortho position of the phenolic hydroxyl group.
(Requirement 1)
To have hydrogen atoms in the ortho and para positions
The raw-material phenol may include
a phenol (A) satisfying at least both Requirement 1 below and Requirement 2 below, or
a mixture of a phenol (B) satisfying at least Requirement 1 below but not satisfying Requirement 2 below and a phenol (C) not satisfying Requirement 1 below but satisfying Requirement 2 below.
(Requirement 1)
To have hydrogen atoms in the ortho and para positions
(Requirement 2)
To have a hydrogen atom in the para position and have a functional group containing an unsaturated carbon bond According to the invention (VIII), there is provided a curable composition containing the poly(phenylene ether) and a peroxide. The curable composition may contain a crosslinking curing agent.

According to the invention (VIII), it is possible to provide a poly(phenylene ether) which retains low-dielectric characteristics and is soluble in various solvents.

<<<Invention (IX)>>>
The invention (IX) is
a curable composition characterized by containing
a poly(phenylene ether) composed of one or more raw-material phenols including a phenol satisfying at least Requirement 1,
an elastomer, and
a dispersant.
(Requirement 1)
To have hydrogen atoms in the ortho and para positions
A part or the whole of the poly(phenylene ether) may be
a poly(phenylene ether) composed of one or more raw-material phenols including a phenol (A) satisfying at least both Requirement 1 below and Requirement 2 below, or a mixture of a phenol (B) satisfying at least Requirement 1 below but not satisfying Requirement 2 below and a phenol (C) not satisfying Requirement 1 below but satisfying Requirement 2 below.
(Requirement 1)
To have hydrogen atoms in the ortho and para positions
(Requirement 2)
To have a hydrogen atom in the para position and have a functional group containing an unsaturated carbon bond According to the invention (IX), it is possible to provide a curable composition which retains low-dielectric characteristics, is soluble also in various solvents (an organic solvent other than a highly toxic organic solvent, for example, cyclohexanone), and enables a film obtained by curing the composition to have excellent tensile characteristics. Further, the curable composition is also excellent in adhesion and heat resistance.

<<<Invention (X)>>>
The invention (X) is
a curable composition characterized by containing
a poly(phenylene ether) composed of one or more raw-material phenols including a phenol satisfying at least Requirement 1, and
a phosphorus compound incompatible with the poly(phenylene ether).
(Requirement 1)
To have hydrogen atoms in the ortho and para positions
A part or the whole of the poly(phenylene ether) may be
a poly(phenylene ether) composed of one or more raw-material phenols including a phenol (A) satisfying at least both Requirement 1 below and Requirement 2 below, or a mixture of a phenol (B) satisfying at least Requirement 1 below but not satisfying Requirement 2 below and a phenol (C) not satisfying Requirement 1 below but satisfying Requirement 2 below.
(Requirement 1)
To have hydrogen atoms in the ortho and para positions
(Requirement 2)
To have a hydrogen atom in the para position and have a functional group containing an unsaturated carbon bond According to the invention (X), it is possible to provide a curable composition which retains low-dielectric characteristics, is soluble also in various solvents (an organic solvent other than a highly toxic organic solvent, for example, cyclohexanone), and is suitable for obtaining a cured product achieving a low dielectric loss tangent and having flame retardancy.

Further, according to the invention (X), it is also possible to provide a curable composition suitable for obtaining a cured product having low water absorbability. Since water exhibits high dielectric characteristics even in a substance, the dielectric characteristics of the cured product are deteriorated according to the amount of water absorption. When the cured product has low water absorbability, stable dielectric characteristics are exhibited even in a high-humidity environment.

Further, according to the invention (X), it is also possible to provide a curable composition suitable for obtaining a cured product having excellent insulation reliability even in a high-temperature high-humidity environment. Since the curable composition is a material not causing a failure such as an insulation failure due to a change in temperature or humidity, the curable composition is useful when being mounted in automobiles or being used in places in which a change in environment is severe such as outdoor places.

<<<Invention (XI)>>>

The invention (XI) is
a curable composition characterized by containing
a poly(phenylene ether) composed of one or more raw-material phenols including a phenol satisfying at least Requirement 1, and
a cyanate ester resin.
(Requirement 1)
To have hydrogen atoms in the ortho and para positions
A part or the whole of the poly(phenylene ether) may be a poly(phenylene ether) composed of one or more raw-material phenols including a phenol (A) satisfying at least both Requirement 1 below and Requirement 2 below, or a mixture of a phenol (B) satisfying at least Requirement 1 below but not satisfying Requirement 2 below and a phenol (C) not satisfying Requirement 1 below but satisfying Requirement 2 below.
(Requirement 1)
To have hydrogen atoms in the ortho and para positions
(Requirement 2)
To have a hydrogen atom in the para position and have a functional group containing an unsaturated carbon bond According to the invention (XI), it is possible to provide a curable composition which retains low-dielectric characteristics, is soluble also in various solvents (an organic solvent other than a highly toxic organic solvent, for example, cyclohexanone), and enables a film obtained by curing the composition to have excellent heat resistance, elongation characteristics, strength, and the like.

<<<Invention (XII)>>>

The invention (XII) is
a terminal-modified poly(phenylene ether) in which a part or the whole of a terminal hydroxyl group of a poly(phenylene ether) is modified into a functional group having an unsaturated carbon bond,
characterized in that a slope calculated from a conformational plot is less than 0.6, and
the poly(phenylene ether) is a poly(phenylene ether) composed of one or more raw-material phenols including a phenol satisfying at least Requirement 1 and not including a phenol satisfying Requirement Z.
(Requirement 1)
To have hydrogen atoms in the ortho and para positions
(Requirement Z)
To include a functional group having an unsaturated carbon bond According to the invention (XII), it is possible to provide a curable composition which is soluble in various solvents (an organic solvent other than a highly toxic organic solvent, for example, cyclohexanone), and enables a film obtained by curing the composition to have a further lower-dielectric characteristics and excellent characteristics such as crack resistance, light resistance, and environment resistance.

The present invention may be a dry film or prepreg characterized by being obtained by applying and impregnating the curable composition described in the inventions (I) to (XII) to a base material.

The present invention may be a cured product obtained by curing the curable composition described in the inventions (1) to (XII), a laminate including the cured product, or an electronic component including the cured product.

The present invention is an invention made based on the fact that it is firstly found that a predetermined poly(phenylene ether) being obtained from one or more raw-material phenols satisfying at least Requirement 1 and having a slope of a conformational plot of less than 0.6 exhibits excellent effects.

Furthermore, the inventions (I) to (XII) are inventions improved so that the predetermined poly(phenylene ether) and the composition containing the predetermined poly(phenylene ether) exhibit further specific effects.

EXAMPLES

Next, the present invention will be described in detail by means of Examples and Comparative Examples; however, the present invention is not limited thereto at all.

Hereinafter, based on the type of raw-material phenols to be used, presence/absence of modification of the poly(phenylene ether), the type of components contained in the curable composition, and the like, embodiments will be classified into a plurality of embodiments (Examples I to XII) and will be respectively described.

Incidentally, numbers of respective products (evaluation samples and the like of Examples, Comparative Examples, and Reference Examples) described in respective embodiments (Example I to Example XII) are numbers independently per each embodiment. Therefore, even if a product number in a certain embodiment is identical to a product number in another embodiment, it is not indicated that these products are identical. In the case of taking this point into consideration, a product number described in a certain embodiment (Example I to Example XII) can also be read as a number additionally given with a number (I to XII) corresponding to the certain embodiment. For example, products described as "Example 1", "Ex. 1", and "PPE-1" in Example I can be read as "Example I-1", "Ex. I-1", "PPE-I-1", and the like, respectively.

In Examples described below, calculation of the slope of a conformational plot was executed according to an analytical procedure using the aforementioned MALS detector and measurement conditions.

Example I

<<<Synthesis of poly(phenylene ether)>>>

To a 3 L two-necked eggplant flask, 5.3 g of di-p-hydroxobis[(N,N,N',N'-tetramethylethylenediamine)copper(II)] chloride (Cu/TMEDA) and 5.7 mL of tetramethylethylenediamine (TMEDA) were added and sufficiently dissolved, and then oxygen was supplied thereto at 10 ml/min. 7.00 g of o-cresol, 13.7 g of 2-allyl-6-methylphenol, and 93.9 g of 2,6-dimethylphenol were dissolved in 1.5 L of toluene, added dropwise to the flask, and reacted at 40° C. for 6 hours while being stirred at a rotational speed of 600 rpm. After completion of the reaction, the reacted product was reprecipitated with a mixed liquid of 20 L of methanol: 22 mL of concentrated hydrochloric acid, extracted by filtration, and dried at 80° C. for 24 hours, thereby obtaining a synthetic product of Ex. 1.

The types of the phenols and the blending ratio thereof were changed, the total blending amount of the phenols was not changed, and thereby synthetic products of Ex. 2 to Ex. 17 were obtained similarly to Ex. 1. The phenols used in synthesis of Ex. 1 to Ex. 17 and the blending ratio (molar ratio) thereof are shown in Table 1-1.

Furthermore, the number average molecular weight (Mn) and the weight average molecular weight (Mw) were obtained by gel permeation chromatography (GPC) for each synthetic product. Mn and the polydispersity index (PDI: Mw/Mn) obtained as the result thereof are shown in Table 1-1. In GPC, Shodex K-805L was used as a column, the column temperature and the flow rate were set to 40° C. and 1 mL/min, respectively, and chloroform and polystyrene were used as an eluent and a standard substance, respectively.

The slope of the conformational plot of each synthetic product was obtained. The measurement results are shown in Table 1-1.

TABLE 1-1

|  | Branched | | | | | | | | |
|---|---|---|---|---|---|---|---|---|---|
|  | Ex. 1 | Ex. 2 | Ex. 3 | Ex. 4 | Ex. 5 | Ex. 6 | Ex. 7 | Ex. 8 | Ex. 9 |
| o-Cresol | 5 | 10 | 10 | 15 | 20 | 30 | 50 | 1 | 9 |
| 2-Allyl-6-methylphenol | 10 | 10 | 10 | 10 | 10 | 10 | 10 | 99 | 1 |
| 2,6-Dimethylphenol | 85 | 80 |  | 75 | 70 | 60 | 40 |  | 90 |
| 2-Ethyl-6-methylphenol |  |  | 80 |  |  |  |  |  |  |
| 2-Allylphenol |  |  |  |  |  |  |  |  |  |
| 2-Phenylphenol |  |  |  |  |  |  |  |  |  |
| 2-Dodecylphenol |  |  |  |  |  |  |  |  |  |
| Phenol |  |  |  |  |  |  |  |  |  |
| Relative number average molecular weight (in terms of Pst) | 17,500 | 12,700 | 11,000 | 15,300 | 12,800 | 10,000 | 9,800 | 11,200 | 14,000 |
| PDI (Mw/Mn) | 4.4 | 6.1 | 5.5 | 3.9 | 4.0 | 3.0 | 10.5 | 3.3 | 5.9 |
| Relative weight average molecular weight (in terms of Pst) | 77,000 | 77,470 | 60,500 | 59,670 | 51,200 | 30,000 | 102,900 | 36,960 | 82,600 |
| Slope of conformational plot | 0.36 | 0.34 | 0.33 | 0.3 | 0.29 | 0.25 | 0.21 | 0.51 | 0.33 |

|  | Branched | | | | | Unbranched | | |
|---|---|---|---|---|---|---|---|---|
|  | Ex. 10 | Ex. 11 | Ex. 12 | Ex. 13 | Ex. 14 | Ex. 15 | Ex. 16 | Ex. 17 |
| o-Cresol | 9.5 |  |  |  |  |  |  |  |
| 2-Allyl-6-methylphenol | 0.5 |  | 5 | 5 | 5 | 10 | 50 |  |
| 2,6-Dimethylphenol | 90 | 90 | 90 | 90 | 90 | 90 | 50 | 100 |
| 2-Ethyl-6-methylphenol |  |  |  |  |  |  |  |  |
| 2-Allylphenol |  | 10 |  |  |  |  |  |  |
| 2-Phenylphenol |  |  | 5 |  |  |  |  |  |
| 2-Dodecylphenol |  |  |  | 5 |  |  |  |  |
| Phenol |  |  |  |  | 5 |  |  |  |
| Relative number average molecular weight (in terms of Pst) | 13,500 | 13,000 | 21,000 | 17,500 | 13,000 | 19,000 | 11,000 | 20,000 |
| PDI (Mw/Mn) | 7.7 | 6.0 | 4.2 | 4.2 | 4.0 | 2.1 | 3.2 | 2.0 |
| Relative weight average molecular weight (in terms of Pst) | 103,950 | 78,000 | 88,200 | 73,500 | 52,000 | 39,900 | 35,200 | 40,000 |
| Slope of conformational plot | 0.31 | 0.32 | 0.36 | 0.38 | 0.38 | 0.61 | Unmeasurable | 0.64 |

<<Evaluation>>

<Solvent Solubility Test>

Each synthetic product was subjected to a solubility test with respect to chloroform, methylene chloride, toluene, methyl ethyl ketone (MEK), N,N-dimethylformamide (DMF), N-methyl-2-pyrrolidone (NMP), tetrahydrofuran (THF), ethyl acetate, cyclohexanone, propyleneglycol monomethyl ether acetate (PMA), and diethylene glycol monoethyl ether acetate (CA).

To a 200 mL sample bottle, 100 g of various solvents and various synthetic products were input, stirred using a stirring bar for 10 minutes, and then left to stand at 25° C. for 10 minutes, and the state were observed by visual inspection for evaluation.

As for evaluation criteria, a case where 1 g of the synthetic product was dissolved and the state was transparent was regarded as ⊚, a case where 0.01 g of the synthetic product was dissolved and the state was transparent was regarded as ◯, a case where there was turbidity when 0.01 g of the synthetic product was dissolved was regarded as A, and a case where the synthetic product was precipitated was regarded as x. The evaluation results are shown in Table 1-2.

TABLE 1-2

| Solvent solubility | | | | Example | | | | | | | | | | | | | | Comparative Example | | |
|---|---|---|---|---|---|---|---|---|---|---|---|---|---|---|---|---|---|---|---|---|
|  |  |  |  | 1 | 2 | 3 | 4 | 5 | 6 | 7 | 8 | 9 | 10 | 11 | 12 | 13 | 14 | 1 | 2 | 3 |
| Solvent classification | Solvent | SP value | | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 | Ex. 15 | Ex. 16 | Ex. 17 |
| Halogen-based | Chloroform | 9.3 | | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ |
|  | Methylene chloride | 9.7 | | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ |
| Hydrocarbon-based | Toluene | 8.91 | | ⊚ | ⊚ | ⊚ | ⊚ | ⊚ | ⊚ | ⊚ | ⊚ | ⊚ | ⊚ | ⊚ | ⊚ | ⊚ | ⊚ | Δ | Δ | x |
| Ketone-based | Methyl ethyl ketone | 9.27 | | ◯ | ◯ | ◯ | ◯ | ⊚ | ⊚ | ⊚ | ◯ | ◯ | ◯ | ◯ | ◯ | ◯ | ◯ | x | x | x |
|  | Cyclohexanone | 9.88 | | ⊚ | ⊚ | ⊚ | ⊚ | ⊚ | ⊚ | ⊚ | ⊚ | ⊚ | ⊚ | ⊚ | ⊚ | ⊚ | ⊚ | x | x | x |

TABLE 1-2-continued

| Solvent solubility | | | Example | | | | | | | | | | | | | | Comparative Example | | |
|---|---|---|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 | 1 | 2 | 3 |
| Solvent classification | Solvent | SP value | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 | Ex. 15 | Ex. 16 | Ex. 17 |
| Ether-based | THF | 9.52 | ○ | ○ | ○ | ○ | ◎ | ◎ | ◎ | ○ | ○ | ○ | ○ | ○ | ○ | ○ | × | × | × |
| Ester-based | Ethyl acetate | 9.10 | ○ | ○ | ○ | ○ | ◎ | ◎ | ◎ | ○ | ○ | ○ | ○ | ○ | ○ | ○ | × | × | × |
| Specialty solvent-based | NMP | 11.2 | ○ | ○ | ○ | ○ | ○ | ○ | ○ | ○ | ○ | ○ | ○ | ○ | ○ | ○ | × | × | × |
| | DMF | 12.0 | ○ | ○ | ○ | ○ | ◎ | ◎ | ◎ | ○ | ○ | ○ | ○ | ○ | ○ | ○ | × | × | × |
| Glycol ester-based | PMA | 8.7 | ○ | ○ | ○ | ○ | ◎ | ◎ | ◎ | ○ | ○ | ○ | ○ | ○ | ○ | ○ | × | × | × |
| | CA | 9.0 | ○ | ○ | ○ | ○ | ◎ | ◎ | ○ | ○ | ○ | ○ | ○ | ○ | ○ | ○ | × | × | × |

It became clear that all of the samples of Examples (Ex. 1 to Ex. 14) were dissolved widespread with solvents having an SP value of 8.7 to 12.0.

<Measurement of hydroxyl Value>

About 2.0 g of the sample was precisely weighed in a two-necked flask, 10 mL of pyridine was added thereto and completely dissolved, 5 mL of an acetylating agent (a solution obtained by dissolving 25 g of acetic anhydride with pyridine to have a volume of 100 mL) was further accurately added, the mixture was heated at 60° C. for 2 hours, and thereby acetylization of the hydroxyl group was performed. After completion of the reaction, 10 mL of pyridine was added to the reaction mother liquor to perform diluting, purification by reprecipitation was performed in 200 mL of warm water, and thereby unreacted acetic anhydride was decomposed. Further, the two-necked flask was washed using 5 mL of ethanol. Several drops of a phenolphthalein solution were added as an indicator to warm water purified by reprecipitation, the solution was subjected to titration using 0.5 mol/L of a potassium hydroxide ethanol solution, and the titration was terminated at the time at which pale pink of the indicator was continued for 30 second. Furthermore, in a blank test, the same operation was performed without inputting a sample.

As a measurement sample, PPEs (Nos. 1 to 3) each having a number average molecular weight (Mn) of about 10,000 and different cresol contents were used.

The measurement results are shown in Table 1-3.

The hydroxyl value was obtained by the following equation (unit: mgKOH/g).

$$\text{Hydroxyl value (mgKOH/g)} = [\{(b-a) \times F \times 28.05\}/S] + D$$

Provided that,
S: Sample amount (g)
a: Consumed amount (mL) of 0.5 mol/L of the potassium hydroxide ethanol solution
b: Consumed amount (mL) of 0.5 mol/L of the potassium hydroxide ethanol solution in the blank test
F: Factor of 0.5 mol/L of the potassium hydroxide ethanol solution
D: Acid value (mgKOH/g)

TABLE 1-3

| No. | o-Cresol content (mol %) | 2-Allyl-6-methyl-phenol | 2,6-Dimethyl-phenol | Mn | PDI | Hydroxyl value (mgKOH/g) | Hydroxyl group equivalent (g/eq) | Remark |
|---|---|---|---|---|---|---|---|---|
| 1 | 30 | 10 | 80 | 10,000 | 3.0 | 15.4 | 3643.7 | Ex. 6 |
| 2 | 1 | 99 | 0 | 11,200 | 3.3 | 7.0 | 8016.8 | Ex. 8 |
| 3 | 0 | 10 | 90 | 11,000 | 1.9 | 5.6 | 10020.0 | Prepared for hydroxyl value |

<Measurement of Solution Viscosity>

The solution viscosities of a cresol-containing PPE and a non-cresol-containing PPE as a conventional product which have a similar weight average molecular weight (Mw) were measured.

1 g of each of a cresol-containing PPE resin and a non-cresol-containing PPE resin which have similar Mw were precisely weighed, 2.5 mL of chloroform was added thereto, the resultant mixture was stirred using a stirring bar for 10 minutes to be completely dissolved (concentration c=0.4 g/mL). Thereafter, the solution viscosity (η) was measured by using a TV type viscometer. Similarly, the solution viscosity at c=0.45 and 0.5 g/mL was measured.

The measurement results are shown in Table 1-4.

From these, it was shown that, when the PPE contains cresol as a constituent unit, the thickening of the solution is suppressed even when this PPE is dissolved, and a thickening suppression effect is also increased as the content of cresol in the PPE increases.

TABLE 1-4

| No. | o-Cresol content (mol %) | 2-Allyl-6-methyl-phenol | 2,6-Dimethyl-phenol | Mw | PDI | η (P) 0.4 (g/mL) | η (P) 0.45 (g/mL) | η (P) 0.5 (g/mL) |
|---|---|---|---|---|---|---|---|---|
| 1 | 0 | 10 | 90 | 134,000 | 5 | 137 | 224 | 303 |
| 2 | 10 | 10 | 80 | 180,000 | 9.5 | 81 | 115 | 128 |
| 3 | 0 | 10 | 90 | 35,800 | 2.4 | 11 | 17 | 27 |
| 4 | 10 | 10 | 80 | 30,000 | 3 | 0.17 | 0.95 | 1.2 |

<<<Production of Composition>>>

50 g of the synthetic products of Ex. 1 to Ex. 14 were dissolved in 150 g of cyclohexanone to obtain varnishes. These varnishes were used as PPE-1 to PPE-14.

Furthermore, 50 g of the synthetic products of Ex. 15 to Ex. 17 were dissolved in 150 g of chloroform to obtain varnishes. These varnishes were used as PPE-15 to PPE-17.

The respective materials were blended according to Table 1-5 and stirred and dissolved to obtain respective compositions (compositions of Example 15 to Example 32 and Comparative Example 4 to Comparative Example 6). The units of numeric values are the numbers of parts by mass.

Furthermore, as for the environmental responsiveness evaluation, a varnish using cyclohexanone as a solvent was regarded as ○, and a varnish using chloroform as a solvent was regarded as x. The results are shown in Table 1-5.

Incidentally, "PERBUTYL P" in Table 1-5 indicates α,α'-bis(t-butylperoxy-m-isopropyl)benzene.

<<Evaluation>>
<Dielectric Characteristic Measuring Method>

The relative dielectric constant Dk and the dielectric loss tangent Df as dielectric characteristics were measured according to the following method.

The compositions of Examples 15 to Example 32 and Comparative Example 4 to Comparative Example 6 were applied to a shiny surface of an 18 μm-thick copper foil with an applicator so that the thickness of the cured product became 50 μm. Next, the compositions were dried at 90° C. for 30 minutes by a hot air circulation drying furnace. Thereafter, nitrogen was completely filled by using an inert oven, the temperature was increased to 200° C., and the compositions were cured for 60 minutes. Thereafter, the copper foil, which was etched and cut into a size of 80 mm in length, 45 mm in width, and 50 μm in thickness, was used as a test piece, and the test piece was measured by a split post dielectric resonator (SPDR) method. A measuring device used was a vector network analyzer E5071C manufactured by Keysight Technologies, an SPDR resonator was used, and a calculation program manufactured by QWED Company was used. The condition was set at a frequency of 10 GHz and at a measurement temperature of 25° C.

(Evaluation Criteria)

As for the dielectric characteristic evaluation, a case where Df was less than 0.004 was regarded as "⊚", a case where Df was 0.004 or more and less than 0.008 was regarded as "○", and a case where Df was 0.008 or more was regarded as "x". The measurement results are shown in Table 1-5.

<Heat Resistance Test>

A FR-4 copper-clad laminate having a size of 150 mm×95 mm and a thickness of 1.6 mm was buffed, and the compositions of Examples 15 to Example 32 and Comparative Example 4 to Comparative Example 6 were applied thereto with an applicator so that the thickness of the cured product became 50 μm. Next, the composition was dried at 90° C. for 30 minutes by a hot air circulation drying furnace. Thereafter, nitrogen was completely filled by using an inert oven, the temperature was increased to 200° C., and the compositions were cured for 60 minutes, thereby producing a test piece.

A rosin-based flux was applied to each test piece, caused to flow into a solder bath set at 260° C. for 30 seconds, and washed with propylene glycol monomethyl ether acetate, and then swelling or peeling was evaluated by visual inspection. Moreover, this test was repeated two times and the evaluation was performed similarly.

(Evaluation Criteria)

A case where there was no swelling or peeling in the test in three times was regarded as ⊚, a case where there was no swelling or peeling in the test in one time was regarded as ○, and a case where swelling or peeling was observed in the test in one time was regarded as x. The measurement results are shown in Table 1-5.

TABLE 1-5

| | Example | | | | | | | | | | |
|---|---|---|---|---|---|---|---|---|---|---|---|
| | 15 | 16 | 17 | 18 | 19 | 20 | 21 | 22 | 23 | 24 | 25 |
| PPE-1 | 100 | | | | 100 | | | | | | |
| PPE-2 | | 100 | | | | 100 | | | | | |
| PPE-3 | | | 100 | | | | 100 | | | | |
| PPE-4 | | | | 100 | | | | 100 | | | |
| PPE-5 | | | | | | | | | 100 | | |
| PPE-6 | | | | | | | | | | 100 | |
| PPE-7 | | | | | | | | | | | 100 |
| PPE-8 | | | | | | | | | | | |
| PPE-9 | | | | | | | | | | | |
| PPE-10 | | | | | | | | | | | |
| PPE-11 | | | | | | | | | | | |
| PPE-12 | | | | | | | | | | | |
| PPE-13 | | | | | | | | | | | |
| PPE-14 | | | | | | | | | | | |
| PPE-15 | | | | | | | | | | | |
| PPE-16 | | | | | | | | | | | |
| PPE-17 | | | | | | | | | | | |
| TAIC | | | | | 25 | 25 | 25 | 25 | 25 | 25 | 25 |
| PERBUTYL P | 0.5 | 0.5 | 0.5 | 0.5 | 0.5 | 0.5 | 0.5 | 0.5 | 0.5 | 0.5 | 0.5 |
| Environmental responsiveness | ○ | ○ | ○ | ○ | ○ | ○ | ○ | ○ | ○ | ○ | ○ |
| Dk | 2.6 | 2.7 | 2.8 | 2.6 | 2.6 | 2.6 | 2.7 | 2.6 | 2.7 | 2.7 | 2.9 |
| Df | 0.004 | 0.004 | 0.005 | 0.004 | 0.002 | 0.003 | 0.003 | 0.002 | 0.003 | 0.003 | 0.006 |
| Dielectric characteristics | ○ | ○ | ○ | ○ | ◎ | ◎ | ◎ | ◎ | ◎ | ◎ | ○ |
| Heat resistance | ◎ | ◎ | ◎ | ◎ | ◎ | ◎ | ◎ | ◎ | ◎ | ◎ | ◎ |

| | Example | | | | | | | Comparative Example | | |
|---|---|---|---|---|---|---|---|---|---|---|
| | 26 | 27 | 28 | 29 | 30 | 31 | 32 | 4 | 5 | 6 |
| PPE-1 | | | | | | | | | | |
| PPE-2 | | | | | | | | | | |
| PPE-3 | | | | | | | | | | |
| PPE-4 | | | | | | | | | | |
| PPE-5 | | | | | | | | | | |
| PPE-6 | | | | | | | | | | |
| PPE-7 | | | | | | | | | | |
| PPE-8 | 100 | | | | | | | | | |
| PPE-9 | | 100 | | | | | | | | |
| PPE-10 | | | 100 | | | | | | | |
| PPE-11 | | | | 100 | | | | | | |
| PPE-12 | | | | | 100 | | | | | |
| PPE-13 | | | | | | 100 | | | | |
| PPE-14 | | | | | | | 100 | | | |
| PPE-15 | | | | | | | | 100 | | |
| PPE-16 | | | | | | | | | 100 | |
| PPE-17 | | | | | | | | | | 100 |
| TAIC | 25 | 25 | 25 | 25 | 25 | 25 | 25 | 25 | 25 | 25 |
| PERBUTYL P | 0.5 | 0.5 | 0.5 | 0.5 | 0.5 | 0.5 | 0.5 | 0.5 | 0.5 | 0.5 |
| Environmental responsiveness | ○ | ○ | ○ | ○ | ○ | ○ | ○ | × | × | × |
| Dk | 2.6 | 2.6 | 2.6 | 2.6 | 2.5 | 2.5 | 2.6 | 2.6 | 2.6 | 2.6 |
| Df | 0.003 | 0.003 | 0.003 | 0.005 | 0.003 | 0.002 | 0.003 | 0.003 | 0.003 | 0.002 |
| Dielectric characteristics | ◎ | ◎ | ◎ | ○ | ◎ | ◎ | ◎ | ◎ | ◎ | ◎ |
| Heat resistance | ◎ | ◎ | ○ | ◎ | ◎ | ◎ | ◎ | ○ | ○ | × |

Example II

<Measurement of hydroxyl Value>

About 2.0 g of the sample was precisely weighed in a two-necked flask, 10 mL of pyridine was added thereto and completely dissolved, 5 mL of an acetylating agent (a solution obtained by dissolving 25 g of acetic anhydride with pyridine to have a volume of 100 mL) was further accurately added, the mixture was heated at 60° C. for 2 hours, and thereby acetylization of the hydroxyl group was performed. After completion of the reaction, 10 mL of pyridine was added to the reaction mother liquor to perform diluting, purification by reprecipitation was performed in 200 mL of warm water, and thereby unreacted acetic anhydride was decomposed. Further, the two-necked flask was washed using 5 mL of ethanol. Several drops of a phenolphthalein solution were added as an indicator to warm water purified by reprecipitation, the solution was subjected to titration using 0.5 mol/L of a potassium hydroxide ethanol solution, and the titration was terminated at the time at which pale pink of the indicator was continued for 30 second. Furthermore, in a blank test, the same operation was performed without inputting a sample.

The hydroxyl value was obtained by the following equation (unit: mgKOH/g).

$$\text{Hydroxyl value (mgKOH/g)} [\{(b-a) \times F \times 28.05\}/S] + D$$

Provided that,

S: Sample amount (g)

a: Consumed amount (mL) of 0.5 mol/L of the potassium hydroxide ethanol solution b: Consumed amount (mL) of 0.5 mol/L of the potassium hydroxide ethanol solution in the blank test F: Factor of 0.5 mol/L of the potassium hydroxide ethanol solution <<<Synthesis of poly(phenylene ether)>>>

The synthesis procedure of the poly(phenylene ether) and the modification procedure of the poly(phenylene ether) will be described.

<<Synthesis of Unmodified PPE-1>>

To a 3 L two-necked eggplant flask, 5.3 g of di-p-hydroxobis[(N,N,N',N'-tetramethylethylenediamine)copper(II)] chloride (Cu/TMEDA) and 5.7 mL of tetramethylethylenediamine (TMEDA) were added and sufficiently dissolved, and then oxygen was supplied thereto at 10 ml/min. 15.1 g of o-cresol, 13.8 g of 2-allyl-6-methylphenol, and 85.5 g of 2,6-dimethylphenol that are raw-material phenols were dissolved in 1.5 L of toluene, added dropwise to the flask, and reacted at 40° C. for 6 hours while being stirred at a rotational speed of 600 rpm. After completion of the reaction, the reacted product was reprecipitated with a mixed liquid of 20 L of methanol: 22 mL of concentrated hydrochloric acid, extracted by filtration, and dried at 80° C. for 24 hours, thereby obtaining unmodified PPE-1 of Mn=10000 (PDI=4) as a poly(phenylene ether).

The hydroxyl group equivalent of unmodified PPE-1 was 3540 and the hydroxyl value was 2.8. The used raw-material phenols and the blending ratio (molar ratio) thereof are shown in Table 2-1.

<<Synthesis of Unmodified PPE-2>>

Unmodified PPE-2 of Mn=9000 (PDI=3) was obtained by performing synthesis by the same method as in unmodified PPE-1, except that 10.0 g of o-cresol and 124 g of 2-allyl-6-methylphenol as raw-material phenols were used.

The hydroxyl group equivalent of unmodified PPE-2 was 3350 and the number of terminal hydroxyl groups was 2.7.

<<Synthesis of Unmodified PPE-3>>

Unmodified PPE-3 of Mn=13000 (PDI=9) was obtained by performing synthesis by the same method as in unmodified PPE-1, except that 103 g of 2,6-dimethylphenol and 12.5 g of 2-allylphenol as raw-material phenols were used.

The hydroxyl group equivalent of unmodified PPE-3 was 3940 and the number of terminal hydroxyl groups was 3.3.

<<Synthesis of Modified PPE-1 to Modified PPE-3>>

To a 1 L two-necked eggplant flask equipped with a dropping funnel, 50 g of unmodified PPE-1, 2.25 g of 4-chloromethylstyrene as a compound for modification, 3 g of tetrabutylammonium bromide as a phase transfer catalyst, and 500 mL of toluene were added, and then heated and stirred at 75° C. 15 mL of 8 M aqueous NaOH solution was added dropwise to this solution over 20 minutes. Thereafter, the resultant solution was further stirred at 75° C. for 5 hours. Next, the reaction solution was neutralized with hydrochloric acid, then reprecipitated in 5 L of methanol, extracted by filtration, washed three times with a mixed liquid of methanol and water at a mass ratio of 80:20, and then dried at 80° C. for 24 hours, thereby obtaining modified PPE-1.

Furthermore, modified PPE-2 and modified PPE-3 were obtained in the same manner as described above, except that unmodified PPE-1 was changed to unmodified PPE-2 and unmodified PPE-3, respectively.

The solid thus obtained was analyzed by $^1$H NMR (400 MHz, CDCl$_3$, TMS). A peak derived from ethenylbenzyl was observed in 5 to 7 ppm. According to this, it could be confirmed that the solid thus obtained was modified PPE-1 to modified PPE-3 having an ethenylbenzyl group at a molecular chain end.

Based on the measurement of the hydroxyl value, the hydroxyl value was almost 0, and thus it was confirmed that almost the whole terminal hydroxyl group was modified to an ethenylbenzyl group.

<<Synthesis of Terminal-Modified PPE-4>>

To a 1 L two-necked eggplant flask equipped with a dropping funnel, 50 g of unmodified PPE-1, 4.8 g of allyl bromide as a compound for modification, 0.7 g of benzyltributylammonium bromide as a phase transfer catalyst, and 250 mL of tetrahydrofuran were added, and then stirred at 25° C. 40 mL of 1 M aqueous NaOH solution was added dropwise to this solution over 50 minutes. Thereafter, the resultant solution was further stirred at 25° C. for 5 hours. Next, the reaction solution was neutralized with hydrochloric acid, then reprecipitated in 5 L of methanol, extracted by filtration, washed three times with a mixed liquid of methanol and water at a mass ratio of 80:20, and then dried at 80° C. for 24 hours, thereby obtaining modified PPE-4.

The solid thus obtained was analyzed by $^1$H NMR (400 MHz, CDCl$_3$, TMS). A peak derived from an allyl group was observed in 3.5 to 6.5 ppm. According to this, it could be confirmed that the solid thus obtained was modified PPE-4 having an allyl group at a molecular chain end.

Based on the measurement of the hydroxyl value, the hydroxyl value was almost 0, and thus it was confirmed that almost the whole terminal hydroxyl group was modified to an allyl group.

<<Synthesis of Terminal-Modified PPE-5>>

To a 1 L one-necked eggplant flask, 50 g of unmodified PPE-1, 350 mL of toluene, and an acetylating agent (a solution obtained by dissolving 25 g of acetic anhydride with pyridine to have a volume of 100 mL) as a compound for modification were added, and then heated and stirred at 60° C. for 2 hours. The reaction solution was reprecipitated in 5 L of methanol, extracted by filtration, and dried at 80° C. for 24 hours, thereby obtaining modified PPE-5.

Based on the measurement of the hydroxyl value, the hydroxyl value was almost 0, and thus it was confirmed that almost the whole terminal hydroxyl group was modified to an acetyl group.

Furthermore, the number average molecular weight (Mn) and the weight average molecular weight (Mw) of each synthetic product were obtained by gel permeation chromatography (GPC). Mn and the polydispersity index (PDI: Mw/Mn) obtained as the result thereof are shown in Table 2-1. Incidentally, in GPC, Shodex K-805L was used as a column, the column temperature and the flow rate were set to 40° C. and 1 mL/min, respectively, and chloroform and polystyrene were used as an eluent and a standard substance, respectively.

The slope of the conformational plot of each PPE was obtained according to the aforementioned method.

As for the environmental responsiveness evaluation of each PPE, solubility in cyclohexanone was checked. All PPEs were dissolved in cyclohexanone, and thus were conformable to environmental responsiveness. The respective PPEs described above were collectively shown in Table 2-1.

TABLE 2-1

|  | Terminal-modified PPE-1 | Terminal-modified PPE-2 | Terminal-modified PPE-3 | Terminal-modified PPE-4 | Terminal-modified PPE-5 | Unmodified PPE-1 | Unmodified PPE-2 | Unmodified PPE-3 |
|---|---|---|---|---|---|---|---|---|
| 2,6-Dimethylphenol | 75 |  | 90 | 75 | 75 | 75 |  | 90 |
| 2-Ally-6-methylphenol | 10 | 90 |  | 10 | 10 | 10 | 90 |  |
| o-Cresol | 15 | 10 |  | 15 | 15 | 15 | 10 |  |
| 2-Allylphenol |  |  | 10 |  |  |  |  | 10 |
| Terminal functional group | Ethenylbenzyl | Ethenylbenzyl | Ethenylbenzyl | Allyl | Acetyl | OH | OH | OH |
| Mn | 10,000 | 9,000 | 13,000 | 10,000 | 10,000 | 10,000 | 9,000 | 13,000 |
| PDI | 4 | 3 | 9 | 4 | 4 | 4 | 3 | 9 |
| Resin varnish solvent | Cyclohexanone | Cyclohexanone | Cyclohexanone | Cyclohexanone | Cyclohexanone | Cyclohexanone | Cyclohexanone | Cyclohexanone |
| Slope of conformational plot | 0.31 | 0.34 | 0.3 | 0.31 | 0.31 | 0.31 | 0.34 | 0.3 |
| Environmental responsiveness | ○ | ○ | ○ | ○ | ○ | ○ | ○ | ○ |

<<<Production of Composition>>>

After 50 g of each PPE was dissolved in 150 g of cyclohexanone to obtain a varnish, the respective materials were blended according to Table 2-2 and stirred to obtain respective compositions (compositions of Example 1 to Example 5 and Reference Example 1 to Reference Example 3). The units of numeric values are the numbers of parts by mass.

Incidentally, "PERBUTYL P" in Table 2-2 indicates α,α'-bis(t-butylperoxy-m-isopropyl)benzene.

<<Evaluation>>

<Dielectric Characteristics>

The relative dielectric constant Dk and the dielectric loss tangent Df were measured as indices of dielectric characteristics. The relative dielectric constant Dk and the dielectric loss tangent Df were measured according to the following method.

The compositions of Examples 1 to Example 5 and Reference Example 1 to Reference Example 3 were applied to a shiny surface of an 18 μm-thick copper foil with an applicator so that the thickness of the cured product became 50 μm. Next, the compositions were dried at 90° C. for 30 minutes by a hot air circulation drying furnace. Thereafter, nitrogen was completely filled by using an inert oven, the temperature was increased to 200° C., and the compositions were cured for 60 minutes. Thereafter, the copper foil, which was etched and cut into a size of 80 mm in length, 45 mm in width, and 50 μm in thickness, was used as a test piece, and the test piece was measured by a split post dielectric resonator (SPDR) method. A measuring device used was a vector network analyzer E5071C manufactured by Keysight Technologies, an SPDR resonator was used, and a calculation program manufactured by QWED Company was used. The condition was set at a frequency of 10 GHz and at a measurement temperature of 25° C.

<Heat Resistance>

A glass transition temperature (Tg) obtained by TMA measurement was measured as an index of heat resistance. The glass transition temperature (Tg) was measured according to the following method.

"TMA/SS120" manufactured by Hitachi High-Tech Corporation was used as a measurement device, and a test piece (length: 1 cm, width: 0.3 cm, thickness: 50 μm) was measured under conditions of a temperature increasing rate of 5° C./min and a measurement temperature range of 30° C. to 250° C.

(Evaluation Criteria)

A case where Tg was 180° C. or higher was regarded as "⊚", a case where Tg was 160° C. or higher and lower than 180° C. was regarded as "○", and a case where Tg was lower than 160° C. was regarded as "x".

TABLE 2-2

|  |  | Example 1 | Example 2 | Example 3 | Example 4 | Example 5 | Reference Example 1 | Reference Example 2 | Reference Example 3 |
|---|---|---|---|---|---|---|---|---|---|
| Composition | Modified PPE-1 | 100 |  |  |  |  |  |  |  |
|  | Modified PPE-2 |  | 100 |  |  |  |  |  |  |
|  | Modified PPE-3 |  |  | 100 |  |  |  |  |  |
|  | Modified PPE-4 |  |  |  | 100 |  |  |  |  |
|  | Modified PPE-5 |  |  |  |  | 100 |  |  |  |
|  | Unmodified PPE-1 |  |  |  |  |  | 100 |  |  |
|  | Unmodified PPE-2 |  |  |  |  |  |  | 100 |  |
|  | Unmodified PPE-3 |  |  |  |  |  |  |  | 100 |

TABLE 2-2-continued

|  |  | Example 1 | Example 2 | Example 3 | Example 4 | Example 5 | Reference Example 1 | Reference Example 2 | Reference Example 3 |
|---|---|---|---|---|---|---|---|---|---|
|  | TAIC | 25 | 25 | 25 | 25 | 25 | 25 | 25 | 25 |
|  | PERBUTYL P | 0.5 | 0.5 | 0.5 | 0.5 | 0.5 | 0.5 | 0.5 | 0.5 |
|  | Solvent | Cyclo-hexanone | Cyclo-hexanone | Cyclo-hexanone | Cyclo-hexanone | Cyclo-hexanone | Cyclo-hexanone | Cyclo-hexanone | Cyclo-hexanone |
| Dielectric characteristics | Dk | 2.2 | 2.3 | 2.3 | 2.2 | 2.3 | 2.6 | 2.7 | 2.6 |
|  | Df | 0.002 | 0.002 | 0.002 | 0.002 | 0.002 | 0.003 | 0.004 | 0.005 |
| Heat resistance | Tg (° C.) | 182 | 190 | 186 | 194 | 175 | 170 | 177 | 172 |
|  | Evaluation | ◎ | ◎ | ◎ | ◎ | ○ | ○ | ○ | ○ |

Example III

<<<Production of Composition>>>

Production procedures of respective compositions (compositions of Examples 1 to 6, Reference Examples 1 to 3, and Comparative Examples 1 and 2) will be described below.

<Description of Synthesis Example a of poly(phenylene ether) for Examples and Reference Examples>

To a 3 L two-necked eggplant flask, 5.3 g of di-p-hydroxo-bis[(N,N,N',N'-tetramethylethylenediamine)copper(II)] chloride (Cu/TMEDA) and 5.7 mL of tetramethylethylenediamine (TMEDA) were added and sufficiently dissolved, and then oxygen was supplied thereto at 10 ml/min. 10.1 g of o-cresol, 13.8 g of 2-allyl-6-methylphenol, and 91.1 g of 2,6-dimethylphenol that are raw-material phenols were dissolved in 1.5 L of toluene to prepare a raw material solution. This raw material solution was added dropwise to the flask and reacted at 40° C. for 6 hours while being stirred at a rotational speed of 600 rpm. After completion of the reaction, the reacted product was reprecipitated with a mixed liquid of 20 L of methanol. 22 mL of concentrated hydrochloric acid, extracted by filtration, and dried at 80° C. for 24 hours, thereby obtaining a ternary copolymerized PPE resin.

The PPE resin of Synthesis Example A was soluble in various organic solvents such as cyclohexanone, N,N-dimethylformamide (DMF), and propyleneglycol monomethyl ether acetate (PMA). The number average molecular weight of the PPE resin of Synthesis Example A was 12,700 and the weight average molecular weight thereof was 77,470.

The slope of the conformational plot of Synthesis Example A was 0.32.

<Description of Synthesis Example B of poly(phenylene ether) for Comparative Examples>

A binary PPE resin was obtained by the same synthesis method as in the ternary copolymerized PPE resin, except that a raw material solution obtained by dissolving 13.8 g of 2-allyl-6-methylphenol and 103 g of 2,6-dimethylphenol that are raw-material phenols in 0.38 L of toluene was used.

The PPE resin of Synthesis Example B was not soluble in cyclohexanone and was soluble in chloroform. The number average molecular weight of the PPE resin of Synthesis Example B was 19,000 and the weight average molecular weight thereof was 39,900.

Incidentally, the number average molecular weight (Mn) and the weight average molecular weight (Mw) of each PPE resin were obtained by gel permeation chromatography (GPC). In GPC, Shodex K-805L was used as a column, the column temperature and the flow rate were set to 40° C. and 1 mL/min, respectively, and chloroform and polystyrene were used as an eluent and a standard substance, respectively.

The slope of the conformational plot of Synthesis Example B was 0.61.

<Production of Composition of Example 1>

80 parts by mass of cyclohexanone as a solvent was added to 15.9 parts by mass of the PPE resin of Synthesis Example A described above, mixed and stirred at 40° C. for 30 minutes to be completely dissolved. To the PPE resin solution obtained according to this, 15.9 parts by mass of TAIC (manufactured by Mitsubishi Chemical Corporation) as a crosslinking curing agent and 60.2 parts by mass of spherical silica (trade name "SC2500-SVJ" manufactured by Admatechs Company Limited) were added and mixed, and then dispersed by a triple roll mill. Finally, 0.6 parts by mass of α,α'-bis(t-butylperoxy-m-isopropyl)benzene (trade name "PERBUTYL P" manufactured by NOF CORPORATION) as a curing catalyst was blended, then mixed, and dispersed by the triple roll mill. Thereby, a resin composition varnish of Example 1 was obtained.

<Production of Composition of Example 2>

A resin composition varnish of Example 2 was obtained by the same procedure as in Example 1, except that 7.5 parts by mass of a hydrogenated styrene-based thermoplastic elastomer was further blended.

<Production of Compositions of Examples 3 to 5>

Resin composition varnishes of Examples 3 to 5 were obtained by the same procedure as in Example 2, except that TAIC was changed to triallyl phosphite, trisacryloyloxyethyl phosphate, and trismethacryloylethyl phosphate, respectively.

<Production of Composition of Example 6>

A resin composition varnish of Example 6 was obtained by the same procedure as in Example 5, except that silica was changed to silica not surface-treated.

<Production of Compositions of Reference Examples 1 and 2>

Resin composition varnishes of Reference Examples 1 and 2 were obtained by the same procedures as in Examples 1 and 2, respectively, except that silica was not blended.

<Production of Compositions of Reference Example 3>

A resin composition varnish of Reference Example 3 was obtained by the same procedure as in Example 2, except that silica was changed to 20 parts by mass of alumina.

<Production of Compositions of Comparative Examples 1 and 2>

Resin composition varnishes of Comparative Examples 1 and 2 were obtained by the same procedures as in Examples 2 and 3, except that the PPE resin according to the present invention was changed to the PPE resin of Synthesis Example B.

The composition of each composition and the blending amount thereof are presented in Table 3-1. The units of numeric values are the numbers of parts by mass.

The resin composition varnish thus obtained was applied to a shiny surface of an 18 μm-thick copper foil with an applicator so that the thickness of the cured product became 50 μm. Next, the compositions were dried at 90° C. for 30 minutes by a hot air circulation drying furnace. Thereafter, nitrogen was completely filled by using an inert oven, the temperature was increased to 200° C., and the compositions were cured for 60 minutes. Thereafter, the copper foil was etched to obtain a cured product (cured film).

<<Evaluation>>

Regarding items described below, each composition and each cured film obtained therefrom were evaluated by the following evaluation method.

<Film Formability>

A varnish by which a cured film was obtainable was evaluated as "○", and a varnish by which a cured film was not obtainable was evaluated as "x". As a matter of course, the evaluation for a cured film described below could not performed for a varnish by which a cured film was not obtainable.

<Dielectric Characteristics>

The relative dielectric constant Dk and the dielectric loss tangent Df as dielectric characteristics were measured according to the following method.

The cured film, which was cut into a size of 80 mm in length, 45 mm in width, and 50 μm in thickness, was used as a test piece, and the test piece was measured by a split post dielectric resonator (SPDR) method. A measuring device used was a vector network analyzer E5071C manufactured by Keysight Technologies, an SPDR resonator was used, and a calculation program manufactured by QWED Company was used. The condition was set at a frequency of 10 GHz and at a measurement temperature of 25° C.

(Evaluation Criteria)

As for the dielectric characteristic evaluation, the evaluation was performed as follows.

A case where Dk was less than 3.0 was evaluated as "⊚", a case where Dk was less than 3.5 was evaluated as "○", and a case where Dk was 3.5 or more was evaluated as "x"

A case where Df was less than 0.003 was evaluated as "⊚", a case where Df was 0.003 or more and less than 0.01 was evaluated as "○", and a case where Df was 0.01 or more was evaluated as "x".

<Self-Extinguishing Property>

The cured film was cut out into a size of 200 mm in length, 15 mm in width, and 50 μm in thickness, flames from a gas burner were brought into contact with the lower end of this test piece for 5 seconds, and then the combustion duration time was measured. Specifically, five test pieces were tested two times respectively, and an average time of the combustion duration time of the test in ten times in total was calculated.

(Evaluation Criteria)

A case where the average time of the combustion duration time was shorter than 20 seconds was regarded as "⊚", a case where the average time thereof was 20 seconds or longer and shorter than 30 seconds was regarded as "○", and a case where the average time thereof was 30 seconds or longer was regarded as "x".

<Tensile Characteristics>

The cured film was cut out into a size of 8 cm in length, 0.5 cm in width, and 50 μm in thickness, and then the tensile elongation at breakage was measured under the following conditions.

[Measurement Conditions]

Tester: Tensile Tester EZ-SX (manufactured by SHIMADZU CORPORATION)

Inter-chuck distance: 50 mm

Test rate: 1 mm/min

Elongation calculation: (Tensile movement amount/Inter-chuck distance)×100

(Evaluation Criteria)

A case where the tensile elongation at breakage was 1.0% or more and less than 2.0% was evaluated as "○", and a case where the tensile elongation at breakage was 2.0% or more was evaluated as "⊚".

TABLE 3-1

|  | Example 1 | Example 2 | Example 3 | Example 4 | Example 5 | Example 6 |
| --- | --- | --- | --- | --- | --- | --- |
| PPE ran AllylPPE ran cresol (Ternary copolymerized PPE resin) Synthesis Example A | 15.9 | 15.9 | 15.9 | 15.9 | 15.9 | 15.9 |
| PPE-ran-AllylPPE (Binary copolymerized PPE resin) Synthesis Example B | | | | | | |
| TAIC | 15.9 | 15.9 | | | | |
| Triallyl phosphite | | | 15.9 | | | |
| Viscoat #3PA (Trisacryloyloxyethyl phosphate) | | | | 15.9 | | |
| Viscoat #3PMA (Trismethacryloyloxyethyl phosphate) | | | | | 15.9 | 15.9 |
| SC2500-SVJ (Silica treated with vinylsilane type silane coupling agent) | 60.2 | 60.2 | 60.2 | 60.2 | 60.2 | |
| SC2500-SQ (Untreated silica) | | | | | | 60.2 |
| DAW 03 (Untreated alumina) | | | | | | |
| H1051 (Hydrogenated styrene-based thermoplastic elastomer) | | 7.5 | 7.5 | 7.5 | 7.5 | 7.5 |
| PERBUTYL P | 0.6 | 0.6 | 0.6 | 0.6 | 0.6 | 0.6 |
| Cyclohexanone | 80.0 | 80.0 | 80.0 | 80.0 | 80.0 | 80.0 |
| Σ | 172.6 | 180.0 | 180.0 | 180.0 | 180.0 | 180.0 |
| Filler content (wt %) | 65 | 60 | 60 | 60 | 60 | 60 |
| P content (wt %) | 0 | 0 | 2.3 | 1.3 | 1.1 | 1.1 |

TABLE 3-1-continued

| | | | | | | | |
|---|---|---|---|---|---|---|---|
| Film formability | Evaluation | ○ | ○ | ○ | ○ | ○ | ○ |
| Dielectric characteristics | Dk(10 GHz) | 2.8 | 2.8 | 2.8 | 3.0 | 3.0 | 3.0 |
| | Evaluation | ◎ | ◎ | ◎ | ○ | ○ | ○ |
| | Dl(10 GHz) | 0.0015 | 0.0017 | 0.0020 | 0.0080 | 0.0080 | 0.0080 |
| | Evaluation | ◎ | ◎ | ◎ | ○ | ○ | ○ |
| Self-extinguishing property | Average combustion duration time (sec) | 25 | 27 | 14 | 17 | 18 | 18 |
| | Evaluation | ○ | ○ | ◎ | ◎ | ◎ | ◎ |
| Tensile characteristics | Elongation at breakage (%) | 1.1 | 2.2 | 2.1 | 2.1 | 2.1 | 2.0 |
| | Evaluation | ○ | ◎ | ◎ | ◎ | ◎ | ◎ |

| | Reference Example 1 | Reference Example 2 | Reference Example 3 | Comparative Example 1 | Comparative Example 2 |
|---|---|---|---|---|---|
| PPE ran AllylPPE ran cresol (Ternary copolymerized PPE resin) Synthesis Example A | 15.9 | 15.9 | 15.9 | | |
| PPE-ran-AllylPPE (Binary copolymerized PPE resin) Synthesis Example B | | | | 15.9 | 15.9 |
| TAIC | 15.9 | 15.9 | 15.9 | 15.9 | |
| Triallyl phosphite | | | | | |
| Viscoat #3PA (Trisacryloyloxyethyl phosphate) | | | | | 15.9 |
| Viscoat #3PMA (Trismethacryloyloxyethyl phosphate) | | | | | |
| SC2500-SVJ (Silica treated with vinylsilane type silane coupling agent) | | | | 60.2 | 60.2 |
| SC2500-SQ (Untreated silica) | | | | | |
| DAW 03 (Untreated alumina) | | | 20.0 | | |
| H1051 (Hydrogenated styrene-based thermoplastic elastomer) | | 7.5 | 7.5 | 7.5 | 7.5 |
| PERBUTYL P | 0.6 | 0.6 | 0.6 | 0.6 | 0.6 |
| Cyclohexanone | 80.0 | 80.0 | 80.0 | 80.0 | 80.0 |
| Σ | 112.1 | 119.9 | 139.9 | 180.1 | 180.1 |
| Filler content (wt %) | 0 | 0 | 33 | 60 | 60 |
| P content (wt %) | 0 | 0 | 0 | 0 | 2.3 |
| Film formability Evaluation | ○ | ○ | ○ | × | × |
| Dielectric characteristics Dk(10 GHz) | 2.8 | 2.9 | 3.0 | — | — |
| Evaluation | ◎ | ◎ | ○ | — | — |
| Dl(10 GHz) | 0.0020 | 0.0030 | 0.0020 | — | — |
| Evaluation | ◎ | ○ | ◎ | — | — |
| Self-extinguishing property Average combustion duration time (sec) | 36 | 38 | 33 | | |
| Evaluation | × | × | × | — | — |
| Tensile characteristics Elongation at breakage (%) | 1.6 | 2.6 | 2.0 | — | — |
| Evaluation | ○ | ◎ | ◎ | — | — |

Example IV

<<Side-Chain Epoxidized PPE>>

A side-chain epoxidized PPE was prepared as follows.
<Side-Chain Epoxidized PPE-1>
(Synthesis of PPE-1)

To a 3 L two-necked eggplant flask, 5.3 g of di-μ-hydroxo-bis[(N,N,N',N'-tetramethylethylenediamine)copper(II)] chloride (Cu/TMEDA) and 5.7 mL of tetramethylethylenediamine (TMEDA) were added and sufficiently dissolved, and then oxygen was supplied thereto at 10 ml/min. 10.0 g of o-cresol, 13.7 g of 2-allyl-6-methylphenol, and 90.3 g of 2,6-dimethylphenol were dissolved in 1.5 L of toluene, added dropwise to the flask, and reacted at 40° C. for 6 hours while being stirred at a rotational speed of 600 rpm. After completion of the reaction, the reacted product was reprecipitated with a mixed liquid of 20 L of methanol: 22 mL of concentrated hydrochloric acid, extracted by filtration, and dried at 80° C. for 24 hours, thereby obtaining PPE-1.

(Side-Chain Epoxidation)

To a two-necked eggplant flask equipped with a dropping funnel, 50 g of PPE-1 and 400 mL of tetrahydrofuran were added, and then stirred in an ice bath. A solution obtained by dissolving 31 g of meta-chloroperbenzoic acid (mCPBA) in 1.6 L of tetrahydrofuran was added dropwise over 30 minutes and stirred at room temperature for 24 hours. The reaction solution was reprecipitated in methanol, extracted by filtration, and dried at 80° C. for 24 hours, thereby obtaining side-chain epoxidized PPE-1.

The obtained solid (side-chain epoxidized PPE-1) was confirmed by 1H NMR (400 MHz, CDCl3, TMS) that 50% of the allyl group at the side chain was epoxidized, from the expression of a peak derived from an epoxy group near 2 to 3.5 ppm and disappearance of the allyl group near 5 to 6.5 ppm.

As described below, the type of the raw-material phenols and the blending ratio thereof were changed, the total blending amount of the phenols was not changed, and thereby side-chain epoxidized PPE-2 to PPE-4 were obtained similarly to side-chain epoxidized PPE-1. The phenols used in synthesis of PPE-1 to PPE-4 and the blending ratio (molar ratio) thereof are shown in Table 4-1. It was confirmed that, similarly to side-chain epoxidized PPE-1, 50% of the allyl group was epoxidized in all cases.

<Side-Chain Epoxidized PPE-2>

A side-chain epoxidized PPE (PPE-2) was obtained by the same method as the synthesis method of side-chain epoxidized PPE-1, except that the blending ratio of the raw-material phenols was changed and 93 g of mCPBA was used.

<Side-Chain Epoxidized PPE-3>

A side-chain epoxidized PPE (PPE-3) was obtained by the same method as the synthesis method of side-chain epoxidized PPE-1, except that the blending ratio of the raw-material phenols was changed and 155 g of mCPBA was used.

<Side-Chain Epoxidized PPE-4>

A side-chain epoxidized PPE (PPE-4) was obtained by the same method as the synthesis method of side-chain epoxidized PPE-1, except that the type of the raw-material phenols and the blending ratio thereof were changed and chloroform was used instead of tetrahydrofuran.

The slope of the conformational plot of each PPE was obtained according to the aforementioned method.

<<Non-Side Chain Epoxidized PPE>>

A PPE (non-side chain epoxidized PPE) different from the side-chain epoxidized PPE was prepared as follows. The outline is shown as in Table 4-2.

<PPE-5>

To a 3 L two-necked eggplant flask, 5.3 g of di-p-hydroxo-bis[(N,N,N',N'-tetramethylethylenediamine)copper(II)] chloride (Cu/TMEDA) and 5.7 mL of tetramethylethylenediamine (TMEDA) were added and sufficiently dissolved, and then oxygen was supplied thereto at 10 ml/min. 7.00 g of o-cresol, 13.7 g of 2-allyl-6-methylphenol, and 93.9 g of 2,6-dimethylphenol were dissolved in 1.5 L of toluene, added dropwise to the flask, and reacted at 40° C. for 6 hours while being stirred at a rotational speed of 600 rpm. After completion of the reaction, the reacted product was reprecipitated with a mixed liquid of 20 L of methanol. 22 mL of concentrated hydrochloric acid, extracted by filtration, and dried at 80° C. for 24 hours, thereby obtaining PPE-5.

<PPE-6>

To a 3 L two-necked eggplant flask, 5.3 g of di-p-hydroxo-bis[(N,N,N',N'-tetramethylethylenediamine)copper(II)] chloride (Cu/TMEDA) and 70 mL of tetramethylethylenediamine (TMEDA) were added and sufficiently dissolved, and then oxygen was supplied thereto at 10 ml/min. 13.7 g of 2-allyl-6-methylphenol, and 93.9 g of 2,6-dimethylphenol were dissolved in 0.5 L of toluene, added dropwise to the flask, and reacted at 40° C. for 6 hours while being stirred at a rotational speed of 600 rpm. After completion of the reaction, the reacted product was reprecipitated with a mixed liquid of 20 L of methanol. 22 mL of concentrated hydrochloric acid, extracted by filtration, and dried at 80° C. for 24 hours, thereby obtaining PPE-6.

The slope of the conformational plot of each PPE was obtained according to the aforementioned method.

TABLE 4-1

| | Side-chain epoxidized poly(phenylene ether) | | | |
|---|---|---|---|---|
| | PPE-1 | PPE-2 | PPE-3 | PPE-4 |
| o-Cresol | 10 | 10 | 10 | — |
| 2-Allyl-6-methylphenol | 10 | 30 | 50 | 10 |
| 2,6-Dimethylphenol | 80 | 60 | 40 | 90 |
| Mn | 12700 | 11000 | 9900 | 13000 |
| PDI (Mw/Mn) | 6.1 | 8.0 | 9.5 | 6.0 |
| Slope of conformational plot | 0.34 | 0.33 | 0.32 | 0.60 |

| | ↓ Epoxidation | | | |
|---|---|---|---|---|
| | Side-chain epoxidized PPE-1 (Branched type) | Side-chain epoxidized PPE-2 (Branched type) | Side-chain epoxidized PPE-3 (Branched type) | Side-chain epoxidized PPE-4 (Linear type) |
| mCPBA (Equivalent with respect to allyl group) | 5.2 | 5.2 | 5.2 | 5.2 |
| Epoxidation rate of side-chain allyl group (%) | 50 | 50 | 50 | 50 |
| Mn | 6400 | 5500 | 5000 | 6500 |
| PDI (Mw/Mn) | 6.3 | 8.3 | 9.9 | 6.2 |

TABLE 4-2

| | Non-side chain epoxidized poly(phenylene ether) | |
|---|---|---|
| | PPE-5 (Branched type) | PPE-6 (Linear type) |
| o-Cresol | 7 | — |
| 2-Allyl-6-methylphenol | 10 | 10 |
| 2,6-Dimethylphenol | 83 | 90 |
| Mn | 17500 | 5000 |
| PDI (Mw/Mn) | 4.4 | 2.2 |
| Slope of conformational plot | 0.34 | Unmeasurable |

<<Production of Composition Varnishes>>

Cyclohexanone was added to the respective components at a mass blending ratio described in the following table so that the solid content concentration became 50% by mass, and mixed to produce varnishes. Since Comparative Examples were not soluble in cyclohexanone, chloroform was used instead.

TABLE 4-3

|  |  | Example | | | | | Comparative Example |
|---|---|---|---|---|---|---|---|
|  |  | 1 | 2 | 3 | 4 | 5 | 1 |
| Epoxidized PPE resin | Side-chain epoxidized PPE-1 (Branched) | 100 | | | | 100 | |
|  | Side-chain epoxidized PPE-2 (Branched) | | 100 | | | | |
|  | Side-chain epoxidized PPE-3 (Branched) | | | 100 | | | |
|  | Side-chain epoxidized PPE-4 (Linear) | | | | | 100 | 100 |
| Non-epoxidized PPE resin | PPE-5 (Branched) | 500 | 500 | 500 | | 500 | |
|  | PPE-6 (Linear) | | | | 500 | | 500 |
| Curing agent | 2,2-Bis(4-acetoxyphenyl)propane | 7.2 | 22 | 36 | 7.2 | 7.2 | 7.2 |
| Catalyst | 4-Dimethylamino-pyridine | 0.5 | 0.6 | 0.7 | 0.5 | 0.5 | 0.5 |
| Low-temperature curing property | Evaluation | ⊚ | ⊚ | ⊚ | ⊚ | ⊚ | ○ |
| Environmental responsiveness | Solvent | Cyclohexanone | Cyclohexanone | Cyclohexanone | Cyclohexanone | Cyclohexanone | Chloroform |
|  | Evaluation | ○ | ○ | ○ | ○ | ○ | × |
| Dielectric characteristics | Dk (10 GHz) | 2.62 | 2.62 | 2.63 | 2.80 | 2.63 | 2.80 |
|  | Df (10 GHz) | 0.0040 | 0.0041 | 0.0041 | 0.0060 | 0.0041 | 0.0060 |
|  | Evaluation | ⊚ | ⊚ | ⊚ | ○ | ⊚ | ○ |
| Tensile characteristics | Elongation at breakage (%) | 1.9 | 1.8 | 1.7 | 1.1 | 1.4 | 0.6 |
|  | Evaluation | ⊚ | ⊚ | ⊚ | ○ | ○ | × |

<Low-Temperature Curing Property>

Each composition was applied to a shiny surface of an 18 μm-thick copper foil with an applicator so that the thickness of the cured product became 50 μm. Next, the compositions were dried at 90° C. for 30 minutes by a hot air circulation drying furnace. Thereafter, the composition was dried at 180° C. for 60 minutes by the hot air circulation drying furnace to obtain a cured film.

Each cured film was subjected to a rubbing test with a waste rag impregnated with toluene, and a case where the cured film was not dissolved was determined that the film was cured.

Specifically, a case where the cured film was not dissolved after performing the rubbing test ten times was evaluated as "⊚", a case where the cured film was not dissolved after performing the rubbing test five times was evaluated as "○", and a case where the cured film was dissolved after performing the rubbing test five times was evaluated as "x".

<Environmental Responsiveness>

As for the environmental responsiveness evaluation, a composition using cyclohexanone as a solvent was evaluated as "○", and a composition using chloroform as a solvent was evaluated as <Production of Cured Product (Cured Film)>

Each composition was applied to a shiny surface of an 18 μm-thick copper foil with an applicator so that the thickness of the cured product became 50 μm. Next, the compositions were dried at 90° C. for 30 minutes by a hot air circulation drying furnace. Thereafter, the composition was heated at 180° C. for 60 minutes by the hot air circulation drying furnace. After the composition was cured, the copper foil was removed by etching to obtain a cured film.

<Dielectric Characteristics>

The relative dielectric constant Dk and the dielectric loss tangent Df as dielectric characteristics were measured according to the following method.

The cured film was cut into a size of 80 mm in length, 45 mm in width, and 50 man in thickness, this cut film was used as a test piece, and the test piece was measured by a split post dielectric resonator (SPDR) method. A measuring device used was a vector network analyzer E5071C manufactured by Keysight Technologies, an SPDR resonator was used, and a calculation program manufactured by QWED Company was used. The condition was set at a frequency of 10 GHz and at a measurement temperature of 25° C.

As for the dielectric characteristic evaluation, a case where Dk was less than 2.8 and Df was less than 0.005 was evaluated as "○", a case where Dk was less than 3.0 and Df was less than 0.01 was evaluated as "○", and a case not corresponding thereto was evaluated as "x".

<Tensile Characteristics>

The cured film was cut out into a size of 8 cm in length, 0.5 cm in width, and 50 μm in thickness, and then the tensile elongation at breakage was measured under the following conditions.

[Measurement conditions]
Tester: Tensile Tester EZ-SX (manufactured by SHIMADZU CORPORATION)
Inter-chuck distance: 50 mm
Test rate: 1 mm/min
Elongation calculation: (Tensile movement amount/Inter-chuck distance)×100

(Evaluation Criteria)

A case where the tensile elongation at breakage was 1.5% or more was evaluated as "⊚", a case where the tensile elongation at breakage was 1.0% or more and less than 1.5% was evaluated as "○", and a case where the tensile elongation at breakage was less than 1.0% was evaluated as "x".

Example V

<<Preparation of poly(phenylene ether)>>

A non-side chain epoxidized PPE and a side-chain epoxidized PPE were prepared as follows. The phenols used in synthesis of PPE-1 to PPE-4, the blending ratio (molar ratio) thereof, and information on epoxidation are shown in Table 5-1.

<PPE-1>
(Synthesis of Synthetic Product of PPE-1)

To a 3 L two-necked eggplant flask, 5.3 g of di-μ-hydroxo-bis[(N,N,N',N'-tetramethylethylenediamine)copper(II)] chloride (Cu/TMEDA) and 5.7 mL of tetramethylethylenediamine (TMEDA) were added and sufficiently dissolved, and then oxygen was supplied thereto at 10 ml/min. 10.0 g of o-cresol, 13.7 g of 2-allyl-6-methylphenol, and 90.3 g of 2,6-dimethylphenol were dissolved in 1.5 L of toluene, added dropwise to the flask, and reacted at 40° C. for 6 hours while being stirred at a rotational speed of 600 rpm. After completion of the reaction, the reacted product was reprecipitated with a mixed liquid of 20 L of methanol. 22 mL of concentrated hydrochloric acid, extracted by filtration, and dried at 80° C. for 24 hours, thereby obtaining a synthetic product of PPE-1.

(Side-Chain Epoxidation)

To a two-necked eggplant flask equipped with a dropping funnel, 50 g of the synthetic product of PPE-1 and 400 mL of tetrahydrofuran were added, and then stirred in an ice bath. A solution obtained by dissolving 31 g of meta-chloroperbenzoic acid (mCPBA) in 1.6 L of tetrahydrofuran was added dropwise over 30 minutes and stirred at room temperature for 24 hours. The reaction solution was reprecipitated in methanol, extracted by filtration, and dried at 80° C. for 24 hours, thereby obtaining PPE-1.

The obtained solid (PPE-1) was confirmed by 1H NMR (400 MHz, CDCl3, TMS) that 50% of the allyl group at the side chain was epoxidized, from the expression of a peak derived from an epoxy group near 2 to 3.5 ppm and disappearance of the allyl group near 5 to 6.5 ppm.

As described below, the type of the raw-material phenols and the blending ratio thereof were changed, the total blending amount of the phenols was not changed, and thereby PPE-2 and PPE-3 were obtained similarly to PPE-1. It was confirmed that, similarly to PPE-1, 50% of the allyl group was epoxidized in all cases.

<PPE-2>

A side-chain epoxidized PPE (PPE-2) was obtained by the same method as the synthesis method of side-chain epoxidized PPE-1, except that the blending ratio of the raw-material phenols was changed and 93 g of mCPBA was used.

<PPE-3>

A side-chain epoxidized PPE (PPE-3) was obtained by the same method as the synthesis method of side-chain epoxidized PPE-1, except that the blending ratio of the raw-material phenols was changed and 155 g of mCPBA was used.

<PPE-4>

A synthetic product of PPE-1 (poly(phenylene ether) which is not epoxidized) was used as PPE-4.

TABLE 5-1

| | PPE-1 | PPE-2 | PPE-3 | PPE-4 |
|---|---|---|---|---|
| o-Cresol | 10 | 10 | 10 | 10 |
| 2-Allyl-6-methylphenol | 10 | 30 | 50 | 10 |
| 2,6-Dimethylphenol | 80 | 60 | 40 | 80 |
| Mn | 12700 | 11000 | 9900 | 12700 |
| PDI (Mw/Mn) | 6.1 | 8.0 | 9.5 | 6.1 |
| Slope of conformational plot | 0.34 | 0.33 | 0.32 | 0.34 |
| ↓ Epoxidation | | | | |
| mCPBA (Equivalent with respect to allyl group) | 5.2 | 5.2 | 5.2 | — |
| Epoxidation rate of side-chain allyl group (%) | 50 | 50 | 50 | — |
| Mn | 6400 | 5500 | 5000 | 12700 |
| PDI (Mw/Mn) | 6.3 | 8.3 | 9.9 | 6.1 |

<<Production of Composition Varnishes>>

Cyclohexanone was added to the respective components at a mass blending ratio described in the following table so that the solid content concentration became 50% by mass, and mixed to produce varnishes.

TABLE 5-2

| | | Example | | | Reference Example |
|---|---|---|---|---|---|
| Curable composition | | 1 | 2 | 3 | 1 |
| Poly(phenylene ether) | PPE-1 (Side-chain epoxidized) | 100 | | | |
| | PPE-2 (Side-chain epoxidized) | | 100 | | |
| | PPE-3 (Side-chain epoxidized) | | | 100 | |
| | PPE-4 (Non-epoxidized) | | | | 100 |
| Curing agent | 2,2-Bis(4-acetoxyphenyl)propane | 7.2 | 22 | 36 | |
| Catalyst | DMAP | 0.5 | 0.6 | 0.7 | |
| | PERBUTYL P | | | | 0.5 |
| Low-temperature curing property | Temperature (° C.) | 180 | 180 | 180 | 200 |
| | Evaluation | ⊚ | ⊚ | ⊚ | ○ |
| Dielectric characteristics | Dk (10 GHz) | 2.72 | 2.74 | 2.76 | 2.60 |
| | Df (10 GHz) | 0.0041 | 0.0042 | 0.0043 | 0.0040 |
| | Evaluation | ○ | ○ | ○ | ○ |

In the table, "DMAP" indicates 4-dimethylaminopyridine and "PERBUTYL P" indicates α,α'-bis(t-butylperoxy-m-isopropyl)benzene.

<Low-Temperature Curing Property>

Each composition was applied to a shiny surface of an 18 μm-thick copper foil with an applicator so that the thickness of the cured product became 50 μm. Next, the compositions were dried at 90° C. for 30 minutes by a hot air circulation drying furnace. Thereafter, the composition was dried at a predetermined temperature for 60 minutes by the hot air circulation drying furnace to obtain a cured film.

Each cured film was subjected to a rubbing test ten times with a waste rag impregnated with toluene, and a case where the cured film was not dissolved was determined that the film was cured.

Specifically, a case where the cured film obtained by heating at 180° C. was not dissolved was evaluated as "⊚", a case where the cured film obtained by heating at 200° C. was not dissolved was evaluated as "○", and a case where the cured film obtained by heating at 200° C. was dissolved was evaluated as "x".

<Dielectric Characteristics>

The relative dielectric constant Dk and the dielectric loss tangent Df as dielectric characteristics were measured according to the following method.

Each composition was applied to a shiny surface of an 18 μm-thick copper foil with an applicator so that the thickness of the cured product became 50 μm. Next, the compositions were dried at 90° C. for 30 minutes by a hot air circulation drying furnace. Thereafter, the composition was heated at 180° C. for 60 minutes by the hot air circulation drying furnace. After the composition was cured, the copper foil was removed by etching to obtain a cured film.

The cured film was cut into a size of 80 mm in length, 45 mm in width, and 50 μm in thickness, this cut film was used as a test piece, and the test piece was measured by a split post dielectric resonator (SPDR) method. A measuring device used was a vector network analyzer E5071C manufactured by Keysight Technologies, an SPDR resonator was used, and a calculation program manufactured by QWED Company was used. The condition was set at a frequency of 10 GHz and at a measurement temperature of 25° C.

As for the dielectric characteristic evaluation, a case where Dk was less than 2.8 and Df was less than 0.005 was evaluated as "○", and a case not corresponding thereto was evaluated as "x".

Example VI

<<Preparation of Cellulose Nanofiber Organic Solvent Dispersion Liquid>>

Dispersion liquids for Examples and Comparative Examples were prepared as follows.

<Preparation of Oxidized Pulp>

(Oxidized Pulp 1)

Bleached softwood kraft pulp (manufactured by Fletcher Challenge Canada Ltd., trade name "Machenzie", CSF 650 ml) was used as a natural cellulose fiber. A commercialized product (manufactured by ALDRICH, Free radical, 98% by mass) was used as TEMPO. A commercialized product (manufactured by Wako Pure Chemical Industries, Ltd.) was used as sodium hypochlorite. A commercialized product (manufactured by Wako Pure Chemical Industries, Ltd.) was used as sodium bromide.

(Oxidized Pulp 2)

Oxidized pulp having a solid content of 30.4% was obtained by using the same method as in the oxidized pulp 1, except that a raw material to be used was changed to bleached hardwood kraft pulp derived from *Eucalyptus* (manufactured by CENIBRA).

<Preparation of Cellulose Nanofiber Aqueous Dispersion>

Preparation Example 1

1.18 g of the oxidized pulp 1 and 34.8 g of ion-exchange water were subjected to a microfabrillating treatment ten times at 150 MPa by using a high-pressure homogenizer, and thereby a carboxyl group-containing cellulose nanofiber aqueous dispersion (solid content concentration: 5.0% by mass) was obtained. This cellulose nanofiber had an average fiber diameter 2.7 nm, an average fiber length of 578 nm, an average aspect ratio of 214, and a carboxyl group content of 1.4 mmol/g.

Preparation Example 2

105.3 g of the oxidized pulp 1 was diluted with 1000 g of ion-exchange water, 346 g of concentrated hydrochloric acid was added thereto to prepare a dispersion liquid having an oxidized pulp solid content concentration of 2.34 wt % and a hydrochloric acid concentration of 2.5 M, and the dispersion liquid was refluxed for 3 minutes. The oxidized pulp thus obtained was sufficiently washed to obtain acid hydrolysis TEMPO oxidized pulp having a solid content of 41%. Thereafter, 0.88 g of the oxidized pulp and 35.12 g of ion-exchange water were subjected to a microfabrillating treatment ten times at 150 MPa by using a high-pressure homogenizer, and thereby a carboxyl group-containing cellulose nanofiber aqueous dispersion (solid content concentration: 5.0% by mass) was obtained.

This cellulose nanofiber had an average fiber diameter 2.9 nm, an average fiber length of 491 nm, an average aspect ratio of 169, and a carboxyl group content of 1.4 mmol/g.

Preparation Example 3

A carboxyl group-containing cellulose nanofiber aqueous dispersion (solid content concentration: 5.0% by mass) was obtained by the same method as in Preparation Example 2, except that the oxidized pulp 2 was used and the reflux time was changed to 10 minutes.

This cellulose nanofiber had an average fiber diameter 4.6 nm, an average fiber length of 331 nm, an average aspect ratio of 72, and a carboxyl group content of 1.4 mmol/g.

<Preparation of Cellulose Nanofiber Organic Solvent Dispersion Liquid>

(CNF-1)

To a beaker equipped with a magnetic stirrer and a stirring bar, 40 g (solid content concentration: 5.0% by mass) of the cellulose nanofiber aqueous dispersion obtained in Preparation Example 2 was charged. Subsequently, an amount, which corresponds to 1.2 mol of an amino group with respect to 1 mol of a carboxyl group of the cellulose nanofiber, of aniline, 0.34 g of 4-methylmorpholine, and 1.98 g of DMT-MM as a condensing agent were charged and dissolved in 300 g of cyclohexanone. The reaction liquid was reacted at room temperature (25° C.) for 14 hours. After completion of the reaction, the reaction liquid was filtered and washed with ethanol to remove DMT-MM salt, washing with cyclohexanone and solvent replacement were performed, and thereby a cellulose nanofiber cyclohexanone dispersion liquid in which an aromatic hydrocarbon group is linked to the cellulose nanofiber via an amide bond was obtained. The solid content concentration of the cellulose nanofiber cyclohexanone dispersion liquid thus obtained was 5.0% by mass.

(CNF-2)

To a beaker equipped with a magnetic stirrer and a stirring bar, 35 g (solid content concentration: 5% by mass) of the cellulose nanofiber aqueous dispersion obtained in Preparation Example 2 was charged. Subsequently, an amount, which corresponds to 1 mol of an amino group with respect to 1 mol of a carboxyl group of the cellulose nanofiber, of tetrabutylammonium hydroxide was charged and dissolved in 300 g of cyclohexanone. The reaction liquid was reacted at room temperature (25° C.) for 1 hour. After completion of the reaction, the reaction liquid was washed with cyclohexanone, and thereby a cellulose nanofiber in which an amine salt is bonded to the cellulose nanofiber was obtained. This cellulose nanofiber was dispersed again in cyclohexanone. The solid content concentration of the cellulose nanofiber cyclohexanone dispersion liquid thus obtained was 4.0% by mass.

(CNF-3)

A cellulose nanofiber cyclohexanone dispersion liquid (solid content: 2.2% by mass) was obtained in the same manner as in CNF-1, except that the cellulose nanofiber obtained in Preparation Example 2 was changed to the cellulose nanofiber obtained in Preparation Example 1 as the cellulose nanofiber.

(CNF-4)

A cellulose nanofiber cyclohexanone dispersion liquid (solid content: 12.0% by mass) was obtained in the same manner as in CNF-1, except that the cellulose nanofiber obtained in Preparation Example 2 was changed to the cellulose nanofiber obtained in Preparation Example 3 as the cellulose nanofiber.

(CNF-5)

A cellulose nanofiber chloroform dispersion liquid (solid content: 4.0% by mass) was obtained in the same manner as in CNF-1, except that cyclohexanone was changed to chloroform.

<<reparation of PPE>>

PPE resins for Examples, Reference Examples, and Comparative Examples were prepared as follows.

<PPE-1>

To a 3 L two-necked eggplant flask, 5.3 g of di-μ-hydroxo-bis[(N,N,N',N'-tetramethylethylenediamine)copper(II)] chloride (Cu/TMEDA) and 5.7 mL of tetramethylethylenediamine (TMEDA) were added and sufficiently dissolved, and then oxygen was supplied thereto at 10 ml/min. 10.1 g of o-cresol, 13.8 g of 2-allyl-6-methylphenol, and 91.1 g of 2,6-dimethylphenol that are raw-material phenols were dissolved in 1.5 L of toluene to prepare a raw material solution. This raw material solution was added dropwise to the flask and reacted at 40° C. for 6 hours while being stirred at a rotational speed of 600 rpm. After completion of the reaction, the reacted product was reprecipitated with a mixed liquid of 20 L of methanol: 22 mL of concentrated hydrochloric acid, extracted by filtration, and dried at 80° C. for 24 hours, thereby obtaining PPE-1. PPE-1 was soluble in various organic solvents such as cyclohexanone, N,N-dimethylformamide (DMF), and propyleneglycol monomethyl ether acetate (PMA). The number average molecular weight of PPE-1 was 12,700 and the weight average molecular weight thereof was 77,470. PPE-1 is a branched PPE.

The slope of the conformational plot of PPE-1 was 0.32.

<PPE-2>

PPE-2 was obtained by the same synthesis method as in PPE-1, except that a raw material solution obtained by dissolving 21.6 g of o-cresol and 97.7 g of 2,6-dimethylphenol that are raw-material phenols in 1.5 L of toluene was used. PPE-2 was soluble in various organic solvents such as cyclohexanone, N,N-dimethylformamide (DMF), and propyleneglycol monomethyl ether acetate (PMA). The number average molecular weight of PPE-2 was 13,100 and the weight average molecular weight thereof was 70,300. PPE-2 is a branched PPE.

The slope of the conformational plot of PPE-2 was 0.33.

<PPE-3>

PPE-3 was obtained by the same synthesis method as in PPE-1, except that a raw material solution obtained by dissolving 13.8 g of 2-allyl-6-methylphenol and 103 g of 2,6-dimethylphenol that are raw-material phenols in 0.38 L of toluene was used. PPE-3 was not soluble in cyclohexanone and was soluble in chloroform. The number average molecular weight of PPE-3 was 19,000 and the weight average molecular weight thereof was 39,900. PPE-3 is an unbranched PPE.

The slope of the conformational plot of PPE-3 was 0.61.

<<Preparation of Production of Resin Composition Varnishes>>

Resin composition varnishes of Examples, Reference Examples, and Comparative Examples were prepared as follows.

<Production of Resin Composition Varnish of Example 1>

100 parts by mass of cyclohexanone as a solvent was added to 14.2 parts by mass of PPE-1 described above, 6.6 parts by mass of an elastomer (trade name "H1051" manufactured by Asahi Kasei Corporation), and 10.7 parts by mass of CNF-1, mixed and stirred at 40° C. for 30 minutes to be completely dissolved. To the PPE resin solution obtained according to this, 14.2 parts by mass of TAIC (manufactured by Mitsubishi Chemical Corporation) as a crosslinking curing agent and 53.7 parts by mass of spherical silica (trade name "SC2500-SVJ" manufactured by Admatechs Company Limited) were added and mixed, and then dispersed by a triple roll mill. Finally, 0.6 parts by mass of α,α'-bis(t-butylperoxy-m-isopropyl)benzene (trade name "PERBUTYL P" manufactured by NOF CORPORATION) as a curing catalyst was blended, then mixed, and dispersed by the triple roll mill. Thereby, a resin composition varnish of Example 1 was obtained.

<Production of Resin Composition Varnish of Example 2>

A resin composition varnish of Example 2 was obtained by performing the same operation as in Example 1, except that 10.7 parts by mass of CNF-1 was changed to 13.4 parts by mass of CNF-2 and the amount of cyclohexanone was changed to 97 parts by mass.

<Production of Resin Composition Varnish of Example 3>

A resin composition varnish of Example 3 was obtained by performing the same operation as in Example 1, except that 10.7 parts by mass of CNF-1 was changed to 24.3 parts by mass of CNF-3 and the amount of cyclohexanone was changed to 86 parts by mass.

<Production of Resin Composition Varnish of Example 4>

A resin composition varnish of Example 4 was obtained by performing the same operation as in Example 1, except that PPE-1 was changed to PPE-2, 10.7 parts by mass of CNF-1 was changed to 4.4 parts by mass of CNF-4, and the amount of cyclohexanone was changed to 106 parts by mass.

<Production of Resin Composition Varnish of Reference Example 1>

A resin composition varnish of Reference Example 1 was obtained by performing the same operation as in Example 1, except that CNF was not blended and the amount of cyclohexanone was changed to 90 parts by mass.

<Production of Resin Composition Varnish of Comparative Example 1>

A resin composition varnish of Comparative Example 1 was obtained by performing the same operation as in Example 2, except that PPE-1 (branched PPE) was changed to PPE-3 (unbranched PPE), CNF-2 (cyclohexanone dispersion liquid) was changed to CNF-5 (chloroform dispersion liquid), and chloroform was used as a solvent.

Compositions of Examples, Reference Example, and Comparative Example are shown in Table 6-1. Furthermore, each composition varnish and each cured film obtained therefrom were evaluated by the following evaluation method. The results thereof are also shown in Table 6-1.

TABLE 6-1

|  |  | Example 1 | Example 2 | Example 3 | Example 4 | Reference Example 1 | Comparative Example 1 |
|---|---|---|---|---|---|---|---|
| Resin component | PPE-1: Branched PPE (PPE-ran-AllylPPE-ran-o-cresol) | 14.2 | 14.2 | 14.2 |  | 14.2 |  |
|  | PPE-2: Branched PPE (PPE-ran-o-cresol) |  |  |  | 14.2 |  |  |
|  | PPE-3: Unbranched PPE(PPE-ran-AllylPPE) |  |  |  |  |  | 14.2 |
|  | TAIC | 14.2 | 14.2 | 14.2 | 14.2 | 14.2 | 14.2 |
|  | H1 051 (Hydrogenated styrene-based thermoplastic elastomer) | 6.6 | 6.6 | 6.6 | 6.6 | 6.6 | 6.6 |
| CNF | Covalent bond CNF1 (CNF complex having solid content concentration of 5 wt %) | 10.7 |  |  |  |  |  |
|  | Ionic bond CNF2 (CNF complex having solid content concentration of 4 wt %) |  | 13.4 |  |  |  |  |
|  | Covalent bond CNF3 Large aspect ratio (CNF complex having solid content concentration of 2.2 wt %) |  |  | 24.3 |  |  |  |
|  | Covalent bond CNF4 Short diameter (CNF complex having solid content concentration of 12 wt %) |  |  |  | 4.4 |  |  |
|  | Covalent bond CNF5 Chloroform (CNF complex having solid content concentration of 4 wt %) |  |  |  |  |  | 13.4 |
| Inorganic filler | SiO2 (Silica treated with vinylsilane coupling agent) | 53.7 | 53.7 | 53.7 | 53.7 | 53.7 | 53.7 |
| Initiator | PERBUTYL P | 0.6 | 0.6 | 0.6 | 0.6 | 0.6 | 0.6 |
| Solvent | Cyclohexanone | 100 | 97 | 86 | 106 | 90 |  |
|  | Chloroform |  |  |  |  |  | 97 |
| CNF amount (wt %) with respect to resin component |  | 1 | 1 | 1 | 1 | 0 | 1 |
| Compatibility between CNF organic solvent dispersion liquid and PPE resin | Evaluation | ○ | ○ | ○ | ○ | — | × |
| Storage stability | Evaluation | ◎ | ◎ | ◎ | ◎ | ○ | × |
| Thermal expansion rate | CTE (ppm) | 29 | 30 | 30 | 29 | 40 | 38 |
| Dielectric characteristics | Dk | 2.8 | 2.8 | 2.8 | 2.8 | 2.8 | 2.8 |
|  | Df | 0.002 | 0.002 | 0.002 | 0.002 | 0.002 | 0.003 |
| Tensile characteristics | Elongation at breakage (%) | 2.2 | 2.2 | 2.1 | 2.2 | 2.0 | 0.5 |

<<Evaluation>>

When a cured film obtained from each composition varnish was evaluated, the cured film was produced by the following procedure.

(Production of Cured Film)

The resin composition varnish thus obtained was applied to a shiny surface of an 18 μm-thick copper foil with an applicator so that the thickness of the cured product became 50 μm. Next, the compositions were dried at 90° C. for 30 minutes by a hot air circulation drying furnace. Thereafter, nitrogen was completely filled by using an inert oven, the temperature was increased to 200° C., and the compositions were cured for 60 minutes. Thereafter, the copper foil was etched to obtain a cured product (cured film).

<Compatibility>

When the resin varnish was applied to the copper foil, a case where there is no unevenness (color unevenness caused by unevenness of the varnish) was evaluated as "○", and a case where there is unevenness was evaluated as "×".

<Storage Stability>

After the viscosity of 5 g of the resin varnish was measured by using a V type viscometer, the resin varnish was input to a sample bottle equipped with a stirring bar and stirred at room temperature for a week, and the viscosity measurement was performed again. The viscosity increase percentage by stirring was calculated.

A case where the increase percentage was less than 3% was evaluated as "◎", a case where the increase percentage was 3% or more and 10% or less was evaluated as "○", and a case where the increase percentage was more than 10% was evaluated as "×"

<Thermal Expansion Rate>

The cured film thus produced was cut out into a size of 3 cm in length, 0.3 cm in width, and 50 μm in thickness, and measured by using TMA (Thermomechanical Analysis) Q400 manufactured by TA Instruments in a tensile mode at an inter-chuck distance of 16 mm and a load of 30 mN under a nitrogen atmosphere while increasing the temperature to 20° C. to 250° C. at 5° C./min and then decreasing the temperature to 250° C. to 20° C. at 5° C./min. An average thermal expansion rate from 100° C. to 50° C. during temperature decreasing was obtained.

<Dielectric Characteristics>

The relative dielectric constant Dk and the dielectric loss tangent Df as dielectric characteristics were measured according to the following method.

The cured film, which was cut into a size of 80 mm in length, 45 mm in width, and 50 μm in thickness, was used as a test piece, and the test piece was measured by a split post dielectric resonator (SPDR) method. A measuring device used was a vector network analyzer E5071C manufactured by Keysight Technologies, an SPDR resonator was used, and a calculation program manufactured by QWED Company was used. The condition was set at a frequency of 10 GHz and at a measurement temperature of 25° C.

<Tensile Characteristics>

The cured film was cut out into a size of 8 cm in length, 0.5 cm in width, and 50 μm in thickness, and then the tensile elongation at breakage was measured under the following conditions.

[Measurement Conditions]

Tester: Tensile Tester EZ-SX (manufactured by SHIMADZU CORPORATION)
Inter-chuck distance: 50 mm
Test rate: 1 mm/min
Elongation calculation: (Tensile movement amount/Inter-chuck distance)×100

Example VII

<Synthesis of Branched PPE>

To a 3 L two-necked eggplant flask, 5.3 g of di-μ-hydroxo-bis[(N,N,N',N'-tetramethylethylenediamine)copper(II)] chloride (Cu/TMEDA) and 5.7 mL of tetramethylethylenediamine (TMEDA) were added and sufficiently dissolved, and then oxygen was supplied thereto at 10 ml/min. 10.1 g of o-cresol, 13.8 g of 2-allyl-6-methylphenol, and 91.1 g of 2,6-dimethylphenol that are raw-material phenols were dissolved in 1.5 L of toluene to prepare a raw material solution. This raw material solution was added dropwise to the flask and reacted at 40° C. for 6 hours while being stirred at a rotational speed of 600 rpm. After completion of the reaction, the reacted product was reprecipitated with a mixed liquid of 20 L of methanol: 22 mL of concentrated hydrochloric acid, extracted by filtration, and dried at 80° C. for 24 hours, thereby obtaining a branched PPE. The branched PPE was soluble in various organic solvents such as cyclohexanone, N,N-dimethylformamide (DMF), and propyleneglycol monomethyl ether acetate (PMA). The number average molecular weight of the branched PPE was 11,500 and the weight average molecular weight thereof was 55,000.

The slope of the conformational plot of the branched PPE was 0.34.

<Synthesis of Unbranched PPE>

An unbranched PPE was obtained by the same synthesis method as in the branched PPE, except that a raw material solution obtained by dissolving 13.8 g of 2-allyl-6-methylphenol and 103 g of 2,6-dimethylphenol that are raw-material phenols in 0.38 L of toluene was used. The unbranched PPE was not soluble in cyclohexanone and was soluble in chloroform. The number average molecular weight of the unbranched PPE was 19,000 and the weight average molecular weight thereof was 39,900.

The slope of the conformational plot of the unbranched PPE was 0.61.

<Production of Resin Composition Varnish of Example 1>

290 parts by mass of cyclohexanone as a solvent was added to 13.7 parts by mass of a carboxy group-containing elastomer (trade name "Nippol 721" manufactured by Zeon Corporation) and 36.6 parts by mass of the branched PPE resin, mixed and stirred at 40° C. for 30 minutes to be completely dissolved. To the PPE resin solution obtained according to this, 9.1 parts by mass of a bisphenol A type epoxy resin (trade name "jER828" manufactured by Mitsubishi Chemical Corporation), 2.7 parts by mass of a phenol novolak resin (trade name "KAYAHARD GPH-65" manufactured by Nippon Kayaku Co., Ltd.), and 27.4 parts by mass of spherical silica (trade name "SC2500-SVJ" manufactured by Admatechs Company Limited) were added and mixed, and then dispersed by a triple roll mill. Finally, 0.5 parts by mass of triphenylphosphine (manufactured by Wako Pure Chemical Industries, Ltd.) and 0.7 parts by mass of α,α'-bis(t-butylperoxy-m-isopropyl)benzene (trade name "PERBUTYL P" manufactured by NOF CORPORATION) as curing catalysts were blended, then mixed, and dispersed by the triple roll mill. Thereby, a resin composition varnish of Example 1 was obtained.

<Production of Resin Composition Varnish of Example 2>

A resin composition varnish of Example 2 was obtained by performing the same operation as in Example 1, except that the phenol novolak resin was not blended.

<Production of Resin Composition Varnish of Example 3>

A resin composition varnish of Example 3 was obtained by performing the same operation as in Example 1, except that α,α'-bis(t-butylperoxy-m-isopropyl)benzene was not blended.

<Production of Resin Composition Varnish of Example 4>

A resin composition varnish of Example 4 was obtained by performing the same operation as in Example 1, except that the epoxy resin was changed to a phenol novolak type resin (trade name "N-740" manufactured by DIC Corporation).

<Production of Resin Composition Varnish of Example 5>

A resin composition varnish of Example 5 was obtained by performing the same operation as in Example 1, except that the elastomer was changed to an amino group-containing elastomer (trade name "Tuftec MP10" manufactured by Asahi Kasei Corporation).

<Production of Resin Composition Varnish of Comparative Example 1>

A resin composition varnish of Comparative Example 1 was obtained by performing the same operation as in Example 1, except that the branched PPE was changed to a linear PPE (conventional PPE) and chloroform was used as a solvent.

Compositions of Examples and Comparative Example are shown in Table 7-1. Furthermore, each composition varnish and each cured film obtained therefrom were evaluated by the following evaluation method. The results thereof are also shown in Table 7-1.

TABLE 7-1

|  | Example 1 | Example 2 | Example 3 | Example 4 | Example 5 | Comparative Example 1 |
|---|---|---|---|---|---|---|
| Branched PPE (PPE-ran-AllylPPE-ran-o-cresol) | 36.6 | 36.6 | 36.6 | 36.6 | 36.6 |  |
| Unbranched PPE (PPE-ran-AllylPPE) |  |  |  |  |  | 36.6 |
| jER-828 (Epoxy resin) | 9.1 | 9.1 | 9.1 |  | 9.1 | 9.1 |
| N-740 (Epoxy resin) |  |  |  | 9.1 |  |  |
| Nippol721 | 13.7 | 13.7 | 13.7 | 13.7 |  | 13.7 |

TABLE 7-1-continued

|  | | Example 1 | Example 2 | Example 3 | Example 4 | Example 5 | Comparative Example 1 |
|---|---|---|---|---|---|---|---|
| (Elastomer having carboxy group) | | | | | | | |
| Tuftec MP10 | | | | | | 13.7 | |
| (Elastomer having amino group) | | | | | | | |
| GPH-65 | | 2.7 | | 2.7 | 2.7 | 2.7 | 2.7 |
| (Phenol novolak resin) | | | | | | | |
| SC2500-SVJ (Silica treated with vinylsilane coupling agent) | | 27.4 | 27.4 | 27.4 | 27.4 | 27.4 | 27.4 |
| Triphenylphosphine | | 0.5 | 0.5 | 0.5 | 0.5 | 0.5 | 0.5 |
| PERBUTYL P | | 0.7 | 0.7 | | 0.7 | 0.7 | 0.7 |
| Solvent | Cyclohexanone | 290 | 290 | 290 | 290 | 290 | |
| | Chloroform | | | | | | 290 |
| Environmental responsiveness | Evaluation | ○ | ○ | ○ | ○ | ○ | × |
| Tensile characteristics | Elongation at breakage (%) | 25 | 23 | 23 | 25 | 18 | 4 |
| | Evaluation | ⊚ | ⊚ | ⊚ | ⊚ | ⊚ | × |
| Adhesion | Peeling strength (Cu) (N/cm) | 11 | 10 | 10 | 10 | 10 | 4 |
| | Evaluation | ⊚ | ⊚ | ⊚ | ⊚ | ⊚ | × |
| Dielectric characteristics | Dk (10 GHz) | 2.2 | 2.2 | 2.2 | 2.2 | 2.2 | 2.2 |
| | Df (10 GHz) | 0.008 | 0.007 | 0.009 | 0.009 | 0.007 | 0.007 |
| Solvent resistance | Evaluation | ⊚ | ○ | ○ | ⊚ | ⊚ | × |

<Environmental Responsiveness>

A varnish using cyclohexanone as a solvent was regarded as "○", and a varnish using chloroform as a solvent was regarded as "x~". As described above, the conventional PPE resin was not dissolved in cyclohexanone, and the PPE resin according to the present invention was soluble in cyclohexanone.

<Adhesion>

The resin composition varnish thus obtained was applied to a shiny surface of an 18 μm-thick copper foil with an applicator so that the thickness of the cured product became 50 tam. After drying, a polyimide film (trade name "Kapton 200H" manufactured by DU PONT-TORAY CO., LTD.) was placed thereon and laminated by a vacuum laminator under conditions of 120° C., 3 minutes, and 1 MPa. Thereafter, the composition was cured at 200° C. for 1 hour by the hot air circulation drying furnace. Thereafter, the copper foil and the copper-clad laminate as a support were laminated and cut into a size of 9 mm in width, the polyimide film was cut out into a width of 5 mm, the polyimide film was peeled off, and then 900 peeling strength measurement was performed. The stroke and the stroke speed were set to 35 mm and 50 mm/min, respectively, and the measurement was performed at N=5.

A case where the peeling strength was 10 N/cm or more was evaluated as "⊚", a case where the peeling strength was 5 N/cm or more and less than 10 N/cm was evaluated as "○", and a case where the peeling strength was less than 5 N/cm was evaluated as "x".

(Production of Cured Film)

The resin composition varnish thus obtained was applied to a shiny surface of an 18 μm-thick copper foil with an applicator so that the thickness of the cured product became 50 μm. Next, the composition was dried at 90° C. for 30 minutes by a hot air circulation drying furnace, the temperature was increased to 200° C., and then the compositions were cured for 60 minutes. Thereafter, the copper foil was etched to obtain a cured product (cured film). This cured film was used and the following evaluation was performed.

<Tensile Characteristics>

The cured film was cut out into a size of 8 cm in length, 0.5 cm in width, and 50 km in thickness, and then the tensile elongation at breakage was measured under the following conditions.

[Measurement Conditions]

Tester: Tensile Tester EZ-SX (manufactured by SHIMADZU CORPORATION)
Inter-chuck distance: 50 mm
Test rate: 1 mm/min
Elongation calculation: (Tensile movement amount/Inter-chuck distance)×100

A case where the tensile elongation at breakage was 15% or more was evaluated as "⊚", a case where the tensile elongation at breakage was 10% or more and less than 15% was evaluated as "○", and a case where the tensile elongation at breakage was less than 10% was evaluated as "x".

<Dielectric Characteristics>

The relative dielectric constant Dk and the dielectric loss tangent Df as dielectric characteristics were measured according to the following method.

The cured film, which was cut into a size of 80 mm in length, 45 mm in width, and 50 μm in thickness, was used as a test piece, and the test piece was measured by a split post dielectric resonator (SPDR) method. A measuring device used was a vector network analyzer E5071C manufactured by Keysight Technologies, an SPDR resonator was used, and a calculation program manufactured by QWED Company was used. The condition was set at a frequency of 10 GHz and at a measurement temperature of 25° C.

<Solvent Resistance>

Each cured film was subjected to a rubbing test ten times with a waste rag impregnated with N-methylpyrrolidone, and solvent resistance was checked.

After the rubbing test, a case where the cured film was not dissolved and shrinkage was not recognized was evaluated as "⊚", a case where the cured film was not dissolved and shrinkage was recognized was evaluated as "○", and a case where the cured film was dissolved was evaluated as "x".

Example VIII

<<<Synthesis of poly(phenylene ether)>>>
<<Synthesis of PPE-1 to PPE-6>>

To a 100 mL two-necked eggplant flask, 0.5 g of di-μ-hydroxo-bis[(N,N,N',N'-tetramethylethylenediamine)copper(II)] chloride (Cu/TMEDA) and 1 mL of tetramethylethylenediamine (TMEDA) were added and sufficiently dissolved, and then oxygen was supplied thereto at 10 ml/min. 0.71 g (2.5 mmol) of 4,4'-dihydroxy-2,2',3,3'5,5'-hexamethylbiphenyl, 1.08 g (10 mmol) of o-cresol, 1.48 g (10 mmol) of 2-allyl-6-methylphenol, and 9.76 g (80 mmol) of 2,6-dimethylphenol were dissolved in 50 mL of toluene, added dropwise to the flask, and reacted at 40° C. for 6 hours while being stirred at a rotational speed of 600 rpm. After completion of the reaction, the reacted product was reprecipitated with a mixed liquid of 200 mL of methanol. 2 mL of concentrated hydrochloric acid, extracted by filtration, and dried at 80° C. for 24 hours, thereby obtaining PPE-1. Synthesis of PPE-2 to PPE-6 was performed by the same procedure as in PPE-1, except that monomers of Table 8-1 were charged at each molar ratio for reaction.

<Measurement of Average Molecular Weight>

The number average molecular weight (Mn), the weight average molecular weight (Mw), and the polydispersity index (PDI: Mw/Mn) of each PPE were obtained by gel permeation chromatography (GPC). In GPC, Shodex K-805L was used as a column, the column temperature and the flow rate were set to 40° C. and 1 mL/min, respectively, and chloroform and polystyrene were used as an eluent and a standard substance, respectively.

The hydroxyl value, the hydroxyl group equivalent, and the number of hydroxyl groups per one molecule were obtained by the following equations.

$$\text{Hydroxyl value (mgKOH/g)} = [\{(b-a) \times F \times 28.05\}/S] + D$$

S: Sample amount (g)

a: Consumed amount (mL) of 0.5 mol/L of the potassium hydroxide ethanol solution b: Consumed amount (mL) of 0.5 mol/L of the potassium hydroxide ethanol solution in the blank test F: Factor of 0.5 mol/L of the potassium hydroxide ethanol solution D: Acid value (mgKOH/g)

Hydroxyl group equivalent (g/eq.)=56.1/Hydroxyl value×1000

Number of hydroxyl groups per one molecule (number)=Mn/Hydroxyl group equivalent <Slope of Conformational Plot>

In order to understand the branched structure (degree of branching) of each PPE, the slope of the conformational plot was obtained. The analysis method is as described above.

TABLE 8-1

| | | PPE-1 | PPE-2 | PPE-3 | PPE-4 | PPE-5 | PPE-6 |
|---|---|---|---|---|---|---|---|
| Dihydric phenol | 2,2-Bis(4-hydroxy-3,5-dimethylphenyl)propane | | | 2.5 | 1 | | |
| | 4,4'-Dihydroxy-2,2',3,3'5,5'-hexamethylbiphenyl | 2.5 | 1 | | | 2.5 | 50 |
| Monohydric phenol | 2,6-Dimethylphenol | 80 | 80 | 80 | 80 | 90 | 90 |
| | 2-Allyl-6-methylphenol | 10 | 10 | 10 | 10 | 10 | 10 |
| | o-Cresol | 10 | 10 | 10 | 10 | | |
| | Mn | 10,300 | 18,000 | 10,000 | 17,000 | 11,000 | 800 |
| | PDI | 5.0 | 5.1 | 4 | 3.8 | 2.1 | 1.7 |
| Number of terminal hydroxyl groups per one molecule | | 5.2 | 6.3 | 5 | 6.1 | 2 | 2 |
| Slope of conformational plot (MALS) | | 0.3 | 0.28 | 0.31 | 0.29 | Unmeasurable | Unmeasurable |

<Measurement of Hydroxyl Value>

The hydroxyl value of each PPE was measured by the following procedure. About 2.0 g of the sample (PPE) was precisely weighed in a two-necked flask, 10 mL of pyridine was added thereto and completely dissolved, 5 mL of an acetylating agent (a solution obtained by dissolving 25 g of acetic anhydride with pyridine to have a volume of 100 mL) was further accurately added, the mixture was heated at 60° C. for 2 hours, and thereby acetylization of the hydroxyl group was performed. After completion of the reaction, 10 mL of pyridine was added to the reaction mother liquor to perform diluting, purification by reprecipitation was performed in 200 mL of warm water, and thereby unreacted acetic anhydride was decomposed. Further, the two-necked flask was washed using 5 mL of ethanol. Several drops of a phenolphthalein solution were added as an indicator to warm water purified by reprecipitation, the solution was subjected to titration using 0.5 mol/L of a potassium hydroxide ethanol solution, and the titration was terminated at the time at which pale pink of the indicator was continued for 30 second. Furthermore, in a blank test, the same operation was performed without inputting a sample.

<Solvent Solubility of Each PPE>

Each PPE was subjected to a solubility test with respect to chloroform, methylene chloride, toluene, methyl ethyl ketone (MEK), cyclohexanone, tetrahydrofuran (THF), ethyl acetate, N-methyl-2-pyrrolidone (NMP), N,N-dimethylformamide (DMF), propyleneglycol monomethyl ether acetate (PMA), and diethylene glycol monoethyl ether acetate (CA). To a 200 mL sample bottle, 100 g of various solvents and each PPE were input, stirred using a stirring bar for 10 minutes, and then left to stand at 25° C. for 10 minutes, and the state were observed by visual inspection for evaluation.

A case where 1 g of the PPE was dissolved and the solution was transparent was regarded as "⊚", a case where 0.01 g of the PPE was dissolved and the solution was transparent was regarded as "○", a case where there is turbidity in the solution when 0.01 g of the PPE was dissolved was regarded as "∆", and a case where the PPE was precipitated even when 0.01 g of the PPE was mixed was regarded as "x".

TABLE 8-2

| Solvent solubility | | | Example | | | | Comparative Example | |
|---|---|---|---|---|---|---|---|---|
| | Solvent | SP value | PPE-1 | PPE-2 | PPE-3 | PPE-4 | PPE-5 | PPE-6 |
| Halogen-based | Chloroform | 9.3 | ◎ | ◎ | ◎ | ◎ | ◎ | ◎ |
| | Methylene chloride | 9.7 | ◎ | ◎ | ◎ | ◎ | ◎ | ◎ |
| Hydrocarbon-based | Toluene | 8.91 | ◎ | ◎ | ◎ | ◎ | Δ | Δ |
| Ketone-based | Methyl ethyl ketone | 9.27 | ○ | ○ | ○ | ○ | × | × |
| | Cyclohexanone | 9.88 | ◎ | ◎ | ◎ | ◎ | × | × |
| Ether-based | THF | 9.52 | ◎ | ○ | ○ | ○ | × | × |
| Ester-based | Ethyl acetate | 9.1 | ◎ | ◎ | ◎ | ◎ | × | × |
| Specialty solvent-based | NMP | 11.2 | ○ | ○ | ○ | ○ | × | × |
| | DMF | 12 | ○ | ○ | ○ | ○ | × | × |
| Glycol ester-based | PMA | 8.7 | ○ | ○ | ○ | ○ | × | × |
| | CA | 9 | ◎ | ○ | ◎ | ○ | × | × |

<<Preparation of Composition>>>

The respective materials were mixed according to the compositions described in Table 8-3 to prepare PPE compositions (varnishes). The units of numeric values in the table are the numbers of parts by mass. In the table, "PERBUTYL P" indicates α,α'-bis(t-butylperoxy-m-isopropyl)benzene.

<Evaluation>>

Items described below were evaluated for each PPE composition and each cured product obtained therefrom.

<Environmental Responsiveness>

A varnish using cyclohexanone as a solvent was evaluated as "○", and a varnish using chloroform as a solvent was evaluated as "x".

<Film Formability>

The PPE composition was applied to a shiny surface of an 18 μm-thick copper foil with an applicator so that the thickness of the cured product became 50 μm. Next, the compositions were dried at 90° C. for 30 minutes by a hot air circulation drying furnace. Thereafter, nitrogen was completely filled by using an inert oven, the temperature was increased to 200° C., and the compositions were cured for 60 minutes. Thereafter, the copper foil was removed by etching to obtain a cured film.

A case where a self-supported film was obtainable after curing was evaluated as "○", a case where a self-supported film was not obtainable after curing was evaluated as "x". A case where a self-supported film was not obtainable was not subjected to the following evaluations.

<Dielectric Characteristics>

The relative dielectric constant Dk and the dielectric loss tangent Df as dielectric characteristics were measured according to the following method.

A cured film was obtained by the aforementioned procedure. The cured film thus obtained was cut into a size of 80 mm in length, 45 mm in width, and 50 μm in thickness, this cut film was used as a test piece, and the test piece was measured by a split post dielectric resonator (SPDR) method. A measuring device used was a vector network analyzer E5071C manufactured by Keysight Technologies, an SPDR resonator was used, and a calculation program manufactured by QWED Company was used. The condition was set at a frequency of 10 GHz and at a measurement temperature of 25° C.

<Adhesion>

The adhesion was evaluated according to the standard for test methods of copper-clad laminates JIS-C-6481. The PPE composition was applied to a roughened surface of a low-roughness copper foil (FV-WS (manufactured by Furukawa Electric Co., Ltd.): Rz=1.5 μm) so that the thickness of the cured product became 50 μm. Next, the compositions were dried at 90° C. for 30 minutes by a hot air circulation drying furnace. Thereafter, nitrogen was completely filled by using an inert oven, the temperature was increased to 200° C., and the composition was cured for 60 minutes. An epoxy adhesive (Araldite) was applied to the side of the cured film thus obtained, a copper-clad laminate (length: 150 mm, width: 100 mm, thickness: 1.6 mm) was placed thereon, and the resultant product was cured at 60° C. for 1 hour by the hot air circulation drying furnace. Next, a cut having a width of 10 mm and a length of 100 mm was formed in the low-roughness copper foil, this one end was peeled off and gripped by a gripper, and then 900 peeling strength measurement was performed.

(Measurement Conditions)

Tester: Tensile Tester EZ-SX (manufactured by SHIMADZU CORPORATION)
Measurement temperature: 25° C.
Stroke: 35 mm
Stroke speed: 50 mm/min
Number of times of measurement: Calculating an average value of five times A case where the 90° peeling strength was 5.0 N/cm or more was evaluated as "◎", a case where the 90° peeling strength was 4.0 N/cm or more and less than 5.0 N/cm was evaluated as "○", and a case where the 90° peeling strength was less than 4.0 N/cm was evaluated as "x".

TABLE 8-3

| | | Example 1 | Example 2 | Example 3 | Example 4 | Comparative Example 1 | Comparative Example 2 |
|---|---|---|---|---|---|---|---|
| Resin component | PPE-1 | 50 | | | | | |
| | PPE-2 | | 50 | | | | |
| | PPE-3 | | | 50 | | | |
| | PPE-4 | | | | 50 | | |
| | PPE-5 | | | | | 50 | |
| | PPE-6 | | | | | | 50 |
| | TAIC | 50 | 50 | 50 | 50 | 50 | 50 |

TABLE 8-3-continued

|  |  | Example 1 | Example 2 | Example 3 | Example 4 | Comparative Example 1 | Comparative Example 2 |
|---|---|---|---|---|---|---|---|
| Initiator | PERBUTYL P | 0.2 | 0.2 | 0.2 | 0.2 | 0.2 | 0.2 |
| Solvent | Cyclohexanone | 100 | 100 | 100 | 100 |  |  |
|  | Chloroform |  |  |  |  | 100 | 100 |
| Environmental responsiveness |  | ○ | ○ | ○ | ○ | × | × |
| Film formability |  | ○ | ○ | ○ | ○ | ○ | × |
| Dielectric characteristics | Dk | 2.5 | 2.4 | 2.5 | 2.4 | 2.6 | — |
|  | Df | 0.003 | 0.002 | 0.003 | 0.002 | 0.004 | — |
| Peeling strength with respect to low-roughness copper foil | Peeling strength (N/cm) | 5.5 | 6.2 | 5.8 | 6.1 | 3.5 | — |
|  | Evaluation | ◎ | ◎ | ◎ | ◎ | × | — |

<<Synthesis of Modified PPE-1 to Modified PPE-6>>

To a 200 mL two-necked eggplant flask equipped with a dropping funnel, 10 g of PPE-1, 1.5 g of allyl bromide as a compound for modification, 0.22 g of benzyltributylammonium bromide as a phase transfer catalyst, and 50 mL of tetrahydrofuran were added, and then stirred at 25° C. 8 mL of 1 M aqueous NaOH solution was added dropwise to this solution over 10 minutes. Thereafter, the resultant solution was further stirred at 25° C. for 5 hours. Next, the reaction solution was neutralized with hydrochloric acid, then reprecipitated in 1 L of methanol, extracted by filtration, washed three times with a mixed liquid of methanol and water at a mass ratio of 80:20, and then dried at 80° C. for 24 hours, thereby obtaining modified PPE-1. Modified PPE-2 to modified PPE-6 were synthesized by the same procedure as in modified PPE-1.

<Measurement of Average Molecular Weight>

The number average molecular weight (Mn), the weight average molecular weight (Mw), and the polydispersity index (PDI: Mw/Mn) of each modified PPE were obtained by the aforementioned methods.

<Film Formability>

The PPE composition was applied to a shiny surface of an 18 μm-thick copper foil with an applicator so that the thickness of the cured product became 50 μm. Next, the compositions were dried at 90° C. for 30 minutes by a hot air circulation drying furnace. Thereafter, nitrogen was completely filled by using an inert oven, the temperature was increased to 200° C., and the compositions were cured for 60 minutes. Thereafter, the copper foil was removed by etching to obtain a cured film.

A case where a self-supported film was obtainable after curing was evaluated as "○", a case where a self-supported film was not obtainable after curing was evaluated as "×". A case where a self-supported film was not obtainable was not subjected to the following evaluations.

<Dielectric Characteristics>

The relative dielectric constant Dk and the dielectric loss tangent Df as dielectric characteristics were measured according to the following method.

A cured film was obtained by the aforementioned procedure. The cured film thus obtained was cut into a size of 80 mm in length, 45 mm in width, and 50 μm in thickness, this

TABLE 8-4

|  |  | Modified PPE-1 | Modified PPE-2 | Modified PPE-3 | Modified PPE-4 | Modified PPE-5 | Modified PPE-6 |
|---|---|---|---|---|---|---|---|
| Dihydric phenol | 2,2-Bis(4-hydroxy-3,5-dimethylphenyl)propane |  |  | 2.5 | 1 |  |  |
|  | 4,4'-Dihydroxy-2,2',3,3'5,5'-hexamethylbiphenyl | 2.5 | 1 |  |  | 2.5 | 50 |
| Monohydric phenol | 2,6-Dimethylphenol | 80 | 80 | 80 | 80 | 90 | 90 |
|  | 2-Allyl-6-methylphenol | 10 | 10 | 10 | 10 | 10 | 10 |
|  | o-Cresol | 10 | 10 | 10 | 10 |  |  |
|  | Mn | 10,300 | 18,000 | 10,000 | 17,000 | 11,000 | 800 |
|  | PDI | 5.0 | 5.1 | 4 | 3.8 | 2.1 | 1.7 |
|  | Terminal structure | Allyl | Allyl | Allyl | Allyl | Allyl | Allyl |

<<<Preparation of Composition>>>

The respective materials were mixed according to the compositions described in Table 8-5 to prepare PPE compositions (varnishes). The units of numeric values in the table are the numbers of parts by mass. In the table, "PERBUTYL P" indicates α,α'-bis(t-butylperoxy-m-isopropyl)benzene.

<<<Evaluation>>>

Items described below were evaluated for each PPE composition and each cured product obtained therefrom.

<Environmental Responsiveness>

A varnish using cyclohexanone as a solvent was evaluated as "○", and a varnish using chloroform as a solvent was evaluated as cut film was used as a test piece, and the test piece was measured by a split post dielectric resonator (SPDR) method. A measuring device used was a vector network analyzer E5071C manufactured by Keysight Technologies, an SPDR resonator was used, and a calculation program manufactured by QWED Company was used. The condition was set at a frequency of 10 GHz and at a measurement temperature of 25° C.

<Heat Resistance>

A cured film was obtained by the aforementioned procedure. The cured film thus obtained was cut out into a size of 30 mm in length, 5 mm in width, and 50 μm in thickness, and then glass transition temperature (Tg) was measured by DMA7100 (manufactured by Hitachi High-Tech Corporation). The measurement was performed in a temperature range of 30° C. to 280° C. and at a temperature increasing rate of 5° C./min, a frequency of 1 Hz, a distortion amplitude of 7 μm, a minimum tension of 50 mN, and an inter-gripper distance of 10 mm. The glass transition temperature (Tg) was regarded as a temperature at which tan δ reaches a maximum.

A case where the glass transition temperature (Tg) was 210° C. or higher was evaluated as "⊚", a case where the glass transition temperature (Tg) was 190° C. or higher and lower than 210° C. was evaluated as "○", and a case where the glass transition temperature (Tg) was lower than 190° C. was evaluated as "x".

<Tensile Characteristics>

A cured film was obtained by the aforementioned procedure. The cured film thus obtained was cut out into a size of 8 cm in length, 0.5 cm in width, and 50 μm in thickness, and then the tensile elongation at breakage was measured under the following conditions.

[Measurement Conditions]
Tester: Tensile Tester EZ-SX (manufactured by SHIMADZU CORPORATION)
Inter-chuck distance: 50 mm
Test rate: 1 mm/min
Elongation calculation: (Tensile movement amount/Inter-chuck distance)×100

A case where the tensile elongation at breakage was 4.0% or more was evaluated as "⊚", a case where the tensile elongation at breakage was 1.0% or more and less than 4.0% was evaluated as "○", and a case where the tensile elongation at breakage was less than 1.0% was evaluated as "x".

TABLE 8-5

|  |  | Example 5 | Example 6 | Example 7 | Example 8 | Example 9 | Example 10 |
|---|---|---|---|---|---|---|---|
| Resin component | Modified PPE-1 | 100 | 30 |  |  |  |  |
|  | Modified PPE-2 |  |  | 100 | 30 |  |  |
|  | Modified PPE-3 |  |  |  |  | 100 | 30 |
|  | Modified PPE-4 |  |  |  |  |  |  |
|  | Modified PPE-5 |  |  |  |  |  |  |
|  | Modified PPE-6 |  |  |  |  |  |  |
|  | TAIC |  | 70 |  | 70 |  | 70 |
| Initiator | PERBUTYL P | 0.5 | 0.5 | 0.5 | 0.5 | 0.5 | 0.5 |
| Solvent | Cyclohexanone | 100 | 100 | 100 | 100 | 100 | 100 |
|  | Chloroform |  |  |  |  |  |  |
| Environmental responsiveness | Evaluation | ○ | ○ | ○ | ○ | ○ | ○ |
| Film formability | Evaluation | ○ | ○ | ○ | ○ | ○ | ○ |
| Dielectric characteristics | Dk | 2.5 | 2.5 | 2.5 | 2.4 | 2.5 | 2.5 |
|  | Df | 0.0020 | 0.0023 | 0.0019 | 0.0022 | 0.0020 | 0.0023 |
| Heat resistance | Tg | 220 | 200 | 218 | 201 | 222 | 200 |
|  | Evaluation | ⊚ | ○ | ⊚ | ○ | ⊚ | ○ |
| Tensile characteristics | Elongation at breakage (%) | 4.1 | 3 | 4.5 | 2.8 | 4.4 | 2.8 |
|  | Evaluation | ⊚ | ○ | ⊚ | ○ | ⊚ | ○ |

|  |  | Example 11 | Example 12 | Comparative Example 3 | Comparative Example 4 | Comparative Example 5 | Comparative Example 6 |
|---|---|---|---|---|---|---|---|
| Resin component | Modified PPE-1 |  |  |  |  |  |  |
|  | Modified PPE-2 |  |  |  |  |  |  |
|  | Modified PPE-3 |  |  |  |  |  |  |
|  | Modified PPE-4 | 100 | 30 |  |  |  |  |
|  | Modified PPE-5 |  |  | 100 | 30 |  |  |
|  | Modified PPE-6 |  |  |  |  | 100 | 30 |
|  | TAIC |  | 70 |  | 70 |  | 70 |
| Initiator | PERBUTYL P | 0.5 | 0.5 | 0.5 | 0.5 | 0.5 | 0.5 |
| Solvent | Cyclohexanone | 100 | 100 |  |  |  |  |
|  | Chloroform |  |  | 100 | 100 | 100 | 100 |
| Environmental responsiveness | Evaluation | ○ | ○ | x | x | x | x |
| Film formability | Evaluation | ○ | ○ | ○ | ○ | ○ | ○ |
| Dielectric characteristics | Dk | 2.5 | 2.4 | 2.6 | 2.6 | 2.6 | 2.6 |
|  | Df | 0.0020 | 0.0022 | 0.0032 | 0.0030 | 0.0031 | 0.0030 |
| Heat resistance | Tg | 220 | 202 | 176 | 170 | 182 | 180 |
|  | Evaluation | ⊚ | ○ | x | x | x | x |
| Tensile characteristics | Elongation at breakage (%) | 4.2 | 2.9 | 3.1 | 2.8 | 0.8 | 0.5 |
|  | Evaluation | ⊚ | ○ | ○ | ○ | x | x |

Example IX

<Synthesis of Branched PPE>

To a 3 L two-necked eggplant flask, 5.3 g of di-μ-hydroxo-bis[(N,N,N',N'-tetramethylethylenediamine)copper(II)] chloride (Cu/TMEDA) and 5.7 mL of tetramethylethylenediamine (TMEDA) were added and sufficiently dissolved, and then oxygen was supplied thereto at 10 ml/min. 10.1 g of o-cresol, 13.8 g of 2-allyl-6-methylphenol, and 91.1 g of 2,6-dimethylphenol that are raw-material phenols were dissolved in 1.5 L of toluene to prepare a raw material solution. This raw material solution was added dropwise to the flask and reacted at 40° C. for 6 hours while being stirred at a rotational speed of 600 rpm. After completion of the reaction, the reacted product was reprecipitated with a mixed liquid of 20 L of methanol. 22 mL of concentrated hydrochloric acid, extracted by filtration, and dried at 80° C. for 24 hours, thereby obtaining a branched PPE. The branched PPE was soluble in various organic solvents such as cyclohexanone, N,N-dimethylformamide (DMF), and propyleneglycol monomethyl ether acetate (PMA). The number average molecular weight of the branched PPE was 11,500 and the weight average molecular weight thereof was 55,000. Furthermore, the slope of the conformational plot was 0.34.

<Synthesis of Unbranched PPE>

An unbranched PPE was obtained by the same synthesis method as in the branched PPE, except that a raw material solution obtained by dissolving 13.8 g of 2-allyl-6-methylphenol and 103 g of 2,6-dimethylphenol that are raw-material phenols in 0.38 L of toluene was used. The unbranched PPE was not soluble in cyclohexanone and was soluble in chloroform. The number average molecular weight of the unbranched PPE was 12,700 and the weight average molecular weight thereof was 77,400. Furthermore, the slope of the conformational plot of the unbranched PPE was 0.62.

Each PPE was blended at a ratio (parts by mass) shown in Table 9-1 along with various components shown in Examples and Comparative Examples, preliminarily mixed by stirring for 15 minutes with a stirrer, and then kneaded by the triple roll mill, thereby preparing a thermosetting resin composition. Each outline will be described below.

<Production of Resin Composition Varnish of Example 1>

80 parts by mass of cyclohexanone was added to 15.9 parts by mass of the branched PPE and 7.5 parts by mass of an elastomer (trade name "H1051" manufactured by Asahi Kasei Chemicals Corp.; a styrene-ethylene-butylene-styrene block copolymer, styrene content: 42% by mass, number average molecular weight: about 75,000), and mixed and stirred at 40° C. for 30 minutes to be completely dissolved. To the PPE solution obtained according to this, 0.6 parts by mass of BYK-180 was added and stirred at 25° C. for 10 minutes. Thereafter, 60.2 parts by mass of spherical silica (trade name "SC2500-SVJ" manufactured by Admatechs Company Limited) and 15.9 parts by mass of triallyl isocyanurate (trade name "TAIC" manufactured by Mitsubishi Chemical Corporation) were added and mixed, and then dispersed by a triple roll mill. Finally, 0.7 parts by mass of α,α'-bis(t-butylperoxy-m-isopropyl)benzene (trade name "PERBUTYL P" manufactured by NOF CORPORATION) was blended and stirred until the peroxide was dissolved. Thereby, a resin composition varnish of Example 1 was obtained.

<Production of Resin Composition Varnish of Example 2>

A resin composition varnish of Example 2 was obtained by performing the same operation as in Example 1, except that the amount of the elastomer was changed to 11.3 parts by mass.

<Production of Resin Composition Varnish of Example 3>

A resin composition varnish of Example 3 was obtained by performing the same operation as in Example 1, except that the amount of the elastomer was changed to 3.0 parts by mass.

<Production of Resin Composition Varnish of Example 4>

A resin composition varnish of Example 4 was obtained by performing the same operation as in Example 1, except that the amount of the elastomer was changed to 30.0 parts by mass.

<Production of Resin Composition Varnish of Example 5>

A resin composition varnish of Example 4 was obtained by performing the same operation as in Example 1, except that the elastomer was changed to trade name "H1517" manufactured by Asahi Kasei Chemicals Corp. (a styrene-ethylene-butylene-styrene block copolymer, styrene content: 43% by mass, number average molecular weight: about 90,000).

<Production of Resin Composition Varnish of Example 6>

A resin composition varnish of Example 6 was obtained by performing the same operation as in Example 1, except that the elastomer was changed to trade name "P5051" manufactured by Asahi Kasei Chemicals Corp. (a styrene-ethylene-butylene-styrene block copolymer, styrene content: 47% by mass, number average molecular weight: about 70,000).

<Production of Resin Composition Varnish of Example 7>

A resin composition varnish of Example 7 was obtained by performing the same operation as in Example 1, except that the elastomer was changed to a combination of 3.8 parts by mass of "H1051" and 3.8 parts by mass of trade name "B-3000" manufactured by Nippon Soda Co., Ltd. (1,2-butadiene polymer, number average molecular weight: 3,200).

<Production of Resin Composition Varnish of Example 8>

A resin composition varnish of Example 8 was obtained by performing the same operation as in Example 1, except that the elastomer was changed to a combination of 3.8 parts by mass of "H1051" and 3.8 parts by mass of trade name "SIS5002" manufactured by JSR Corporation (a styrene-isoprene-styrene block copolymer, styrene content: 22% by mass, number average molecular weight: about 160,000).

<Production of Resin Composition Varnishes of Examples 9 to 16>

Resin composition varnishes of Example 9 to 16 were obtained by performing the same operation as in Examples 1 to 8, except that BYK-180 was changed to BYK-W966.

<Production of Resin Composition Varnishes of Comparative Examples 1 and 2>

Resin composition varnishes of Comparative Examples 1 and 2 were obtained by performing the same operation as in Examples 1 and 9, except that an unbranched poly(phenylene ether) was used instead of a branched poly(phenylene ether) and chloroform was used as a solvent.

Each composition varnish and each cured film obtained therefrom were evaluated by the following evaluation method. The results thereof are also shown in Table 9-1.

<Environmental Responsiveness>

As for the environmental responsiveness evaluation, a composition using cyclohexanone as a solvent was evaluated as "○", and a composition using chloroform as a solvent was evaluated as "x".

<Adhesion>

The adhesion (peeling strength with respect to a low-roughness copper foil) was measured according to the standard for test methods of copper-clad laminates JIS-C-6481. The resin composition was applied to a roughened surface of a low-roughness copper foil (FV-WS (manufactured by Furukawa Electric Co., Ltd.): Rz=1.5 μm) so that the thickness of the cured product became 50 μm, and the resin composition was dried at 90° C. for 30 minutes by a hot air circulation drying furnace. Thereafter, nitrogen was completely filled by using an inert oven, the temperature was increased to 200° C., and the composition was cured for 60 minutes. An epoxy adhesive (Araldite) was applied to the side of the cured film thus obtained, a copper-clad laminate (length: 150 mm, width: 100 mm, thickness: 1.6 mm) was placed thereon, and the resultant product was cured at 60° C. for 1 hour by the hot air circulation drying furnace. Next, a cut having a width of 10 mm and a length of 100 mm was formed in the low-roughness copper foil, this one end was peeled off and gripped by a gripper, and then 900 peeling strength measurement was performed.

[Measurement Conditions]
  Tester: Tensile Tester EZ-SX (manufactured by SHIMADZU CORPORATION)
  Measurement temperature: 25° C.
  Stroke: 35 mm
  Stroke speed: 50 mm/min
  Number of times of measurement: Calculating an average value of five times A case where the 90° peeling strength was 5.0 N/cm or more was evaluated as "○", and a case where the 90° peeling strength was less than 5.0 N/cm was evaluated as "x".

(Production of Cured Film)

The resin composition varnish thus obtained was applied to a shiny surface of an 18 μm-thick copper foil with an applicator so that the thickness of the cured product became 50 μm. Next, the compositions were dried at 90° C. for 30 minutes by a hot air circulation drying furnace. Thereafter, nitrogen was completely filled by using an inert oven, the temperature was increased to 200° C., and the compositions were cured for 60 minutes. Thereafter, the copper foil was removed by etching to obtain a cured film. This cured film was used and the following evaluation was performed.

<Dielectric Characteristics>

The relative dielectric constant Dk and the dielectric loss tangent Df as dielectric characteristics were measured according to the following method.

The cured film was cut into a size of 80 mm in length, 45 mm in width, and 50 μm in thickness, this cut film was used as a test piece, and the test piece was measured by a split post dielectric resonator (SPDR) method. A measuring device used was a vector network analyzer E5071C manufactured by Keysight Technologies, an SPDR resonator was used, and a calculation program manufactured by QWED Company was used. The condition was set at a frequency of 10 GHz and at a measurement temperature of 25° C.

As for the dielectric characteristic evaluation, a case where Dk was less than 2.9 and Df was less than 0.003 was evaluated as "○", and a case not corresponding thereto was evaluated as "x".

<Heat Resistance>

Heat resistance was evaluated by a glass transition temperature. The cured film was cut out into a size of 30 mm in length, 5 mm in width, and 50 μm in thickness, and then glass transition temperature (Tg) was measured by DMA7100 (manufactured by Hitachi High-Tech Corporation). The measurement was performed in a temperature range of 30° C. to 280° C. and at a temperature increasing rate of 5° C./min, a frequency of 1 Hz, a distortion amplitude of 7 μm, a minimum tension of 50 mN, and an inter-gripper distance of 10 mm. The glass transition temperature (Tg) was regarded as a temperature at which tan δ reaches a maximum.

A case where the glass transition temperature (Tg) was 200° C. or higher was evaluated as "⊚", a case where the glass transition temperature (Tg) was 180° C. or higher and lower than 200° C. was evaluated as "○", and a case where the glass transition temperature (Tg) was lower than 180° C. was evaluated as <Tensile Characteristics>

The cured film was cut out into a size of 8 cm in length, 0.5 cm in width, and 50 μm in thickness, and then the tensile elongation at breakage was measured under the following conditions.

[Measurement Conditions]
  Tester: Tensile Tester EZ-SX (manufactured by SHIMADZU CORPORATION)
  Inter-chuck distance: 50 mm
  Test rate: 1 mm/min
  Elongation calculation: (Tensile movement amount/Inter-chuck distance)×100

A case where the tensile elongation at breakage was 2.0% or more was evaluated as "⊚", a case where the tensile elongation at breakage was 1.0% or more and less than 2.0% was evaluated as "○", and a case where the tensile elongation at breakage was less than 1.0% was evaluated as "x".

TABLE 9-1

| Raw material | | Example 1 | Example 2 | Example 3 | Example 4 | Example 5 | Example 6 |
|---|---|---|---|---|---|---|---|
| PPE | PPE-ran-AllylPPE-ran-cresol (Ternary copolymerized PPE resin) | 15.9 | 15.9 | 15.9 | 15.9 | 15.9 | 15.9 |
| | PPE-ran-AllylPPE (Binary copolymerized PPE resin) | | | | | | |
| Crosslinking aid | TAIC | 15.9 | 15.9 | 15.9 | 15.9 | 15.9 | 15.9 |
| Elastomer | H1051 (Hydrogenated styrene-based elastomer manufactured by Asahi Kasei Corporation) | 7.5 | 11.3 | 3.0 | 30.0 | | |

TABLE 9-1-continued

|  | Raw material |  |  |  |  |  |  |
|---|---|---|---|---|---|---|---|
|  | H1517 (Hydrogenated styrene-based elastomer manufactured by Asahi Kasei Corporation) |  |  |  |  | 7.5 |  |
|  | P5051 (Partially hydrogenated styrene-based elastomer manufactured by Asahi Kasei Corporation) |  |  |  |  |  | 7.5 |
|  | B-3000 (1,2-Butadiene manufactured by Nippon Soda Co., Ltd.) |  |  |  |  |  |  |
|  | SIS5002 (Styrene-isoprene block copolymer manufactured by JSR Corporation) |  |  |  |  |  |  |
| Dispersant | BYK-180 | 0.6 | 0.6 | 0.6 | 0.6 | 0.6 | 0.6 |
|  | BYK-W966 |  |  |  |  |  |  |
| Silica filler | SC2500-SV J(SiO$_2$) | 60.2 | 60.2 | 60.2 | 60.2 | 60.2 | 60.2 |
| Peroxide | PERBUTYL P | 0.6 | 0.6 | 0.6 | 0.6 | 0.6 | 0.6 |
| Solvent | Cyclohexanone | 80.0 | 80.0 | 80.0 | 80.0 | 80.0 | 80.0 |
|  | Chloroform |  |  |  |  |  |  |
| Environmental responsiveness | Evaluation | ○ | ○ | ○ | ○ | ○ | ○ |
| Dielectric characteristics | Dk(10 GHz) | 2.80 | 2.80 | 2.75 | 2.85 | 2.80 | 2.85 |
|  | Df(10 GHz) | 0.0017 | 0.0018 | 0.0015 | 0.0021 | 0.0017 | 0.0022 |
|  | Evaluation | ○ | ○ | ○ | ○ | ○ | ○ |
| Glass transition temperature (° C.) | T$_g$(° C.)DMA | 205 | 200 | 209 | 185 | 204 | 204 |
|  | Evaluation | ⊚ | ⊚ | ⊚ | ○ | ⊚ | ⊚ |
| Tensile characteristics | Elongation at breakage (%) | 2.2 | 2.5 | 1.5 | 3.0 | 2.0 | 2.0 |
|  | Evaluation | ⊚ | ⊚ | ○ | ⊚ | ⊚ | ⊚ |
| Peeling strength with respect to low-roughness copper foil | 90° C. peeling strength (N/cm) | 5.5 | 6.0 | 5.0 | 6.5 | 5.5 | 5.5 |
|  | Evaluation | ○ | ○ | ○ | ○ | ○ | ○ |

|  | Raw material | Example 7 | Example 8 | Example 9 | Example 10 | Example 11 | Example 12 |
|---|---|---|---|---|---|---|---|
| PPE | PPE-ran-AllylPPE-ran-cresol (Ternary copolymerized PPE resin) | 15.9 | 15.9 | 15.9 | 15.9 | 15.9 | 15.9 |
|  | PPE-ran-AllylPPE (Binary copolymerized PPE resin) |  |  |  |  |  |  |
| Crosslinking aid | TAIC | 15.9 | 15.9 | 15.9 | 15.9 | 15.9 | 15.9 |
| Elastomer | H1051 (Hydrogenated styrene-based elastomer manufactured by Asahi Kasei Corporation) | 3.8 | 3.8 | 7.5 | 11.3 | 3.0 | 30.0 |
|  | H1517 (Hydrogenated styrene-based elastomer manufactured by Asahi Kasei Corporation) |  |  |  |  |  |  |
|  | P5051 (Partially hydrogenated styrene-based elastomer manufactured by Asahi Kasei Corporation) |  |  |  |  |  |  |
|  | B-3000 (1,2-Butadiene manufactured by Nippon Soda Co., Ltd.) | 3.8 |  |  |  |  |  |
|  | SIS5002 (Styrene-isoprene block copolymer manufactured by JSR Corporation) |  | 3.8 |  |  |  |  |
| Dispersant | BYK-180 | 0.6 | 0.6 |  |  |  |  |
|  | BYK-W966 |  |  | 0.6 | 0.6 | 0.6 | 0.6 |
| Silica filler | SC2500-SV J(SiO$_2$) | 60.2 | 60.2 | 60.2 | 60.2 | 60.2 | 60.2 |
| Peroxide | PERBUTYL P | 0.6 | 0.6 | 0.6 | 0.6 | 0.6 | 0.6 |

TABLE 9-1-continued

|  |  |  |  |  |  |  |  |
|---|---|---|---|---|---|---|---|
| Solvent | Cyclohexanone | 80.0 | 80.0 | 80.0 | 80.0 | 80.0 | 80.0 |
|  | Chloroform |  |  |  |  |  |  |
| Environmental responsiveness | Evaluation | ○ | ○ | ○ | ○ | ○ | ○ |
| Dielectric characteristics | Dk(10 GHz) | 2.87 | 2.85 | 2.80 | 2.80 | 2.75 | 2.85 |
|  | Df(10 GHz) | 0.0028 | 0.0023 | 0.0017 | 0.0018 | 0.0015 | 0.0021 |
|  | Evaluation | ○ | ○ | ○ | ○ | ○ | ○ |
| Glass transition temperature (° C.) | $T_g$(° C.)DMA | 206 | 207 | 205 | 200 | 209 | 185 |
|  | Evaluation | ◎ | ◎ | ◎ | ◎ | ◎ | ○ |
| Tensile characteristics | Elongation at breakage (%) | 1.6 | 1.7 | 2.2 | 2.5 | 1.5 | 3.0 |
|  | Evaluation | ○ | ○ | ◎ | ◎ | ○ | ◎ |
| Peeling strength with respect to low-roughness copper foil | 90° C. peeling strength (N/cm) | 5.1 | 5.2 | 5.5 | 6.0 | 5.0 | 6.5 |
|  | Evaluation | ○ | ○ | ○ | ○ | ○ | ○ |

| Raw material |  | Example 13 | Example 14 | Example 15 | Example 16 | Comparative Example 1 | Comparative Example 2 |
|---|---|---|---|---|---|---|---|
| PPE | PPE-ran-AllyIPPE-ran-cresol (Ternary copolymerized PPE resin) | 15.9 | 15.9 | 15.9 | 15.9 |  |  |
|  | PPE-ran-AllylPPE (Binary copolymerized PPE resin) |  |  |  |  | 15.9 | 15.9 |
| Crosslinking aid | TAIC | 15.9 | 15.9 | 15.9 | 15.9 | 15.9 | 15.9 |
| Elastomer | H1051 (Hydrogenated styrene-based elastomer manufactured by Asahi Kasei Corporation) |  |  | 3.8 | 3.8 | 7.5 | 7.5 |
|  | H1517 (Hydrogenated styrene-based elastomer manufactured by Asahi Kasei Corporation) | 7.5 |  |  |  |  |  |
|  | P5051 (Partially hydrogenated styrene-based elastomer manufactured by Asahi Kasei Corporation) |  | 7.5 |  |  |  |  |
|  | B-3000 (1,2-Butadiene manufactured by Nippon Soda Co., Ltd.) |  |  |  | 3.8 |  |  |
|  | SIS5002 (Styrene-isoprene block copolymer manufactured by JSR Corporation) |  |  |  | 3.8 |  |  |
| Dispersant | BYK-180 |  |  |  |  | 0.6 |  |
|  | BYK-W966 | 0.6 | 0.6 | 0.6 | 0.6 |  | 0.6 |
| Silica filler | SC2500-SV J(SiO$_2$) | 60.2 | 60.2 | 60.2 | 60.2 | 60.2 | 60.2 |
| Peroxide | PERBUTYL P | 0.6 | 0.6 | 0.6 | 0.6 | 0.6 | 0.6 |
| Solvent | Cyclohexanone | 80.0 | 80.0 | 80.0 | 80.0 |  |  |
|  | Chloroform |  |  |  |  | 80.0 | 80.0 |
| Environmental responsiveness | Evaluation | ○ | ○ | ○ | ○ | × | × |
| Dielectric characteristics | Dk(10 GHz) | 2.80 | 2.85 | 2.87 | 2.85 | 2.93 | 2.93 |
|  | Df(10 GHz) | 0.0017 | 0.0022 | 0.0028 | 0.0023 | 0.0030 | 0.0030 |
|  | Evaluation | ○ | ○ | ○ | ○ | × | × |
| Glass transition temperature (° C.) | $T_g$(° C.)DMA | 204 | 204 | 206 | 207 | 190 | 1.90 |
|  | Evaluation | ◎ | ◎ | ◎ | ◎ | ○ | ○ |
| Tensile characteristics | Elongation at breakage (%) | 2.0 | 2.0 | 1.6 | 1.7 | 0.8 | 0.8 |
|  | Evaluation | ◎ | ◎ | ○ | ○ | × | × |
| Peeling strength with respect to low-roughness copper foil | 90° C. peeling strength (N/cm) | 5.5 | 5.5 | 5.1 | 5.2 | 3.5 | 3.5 |
|  | Evaluation | ○ | ○ | ○ | ○ | × | × |

Example X

Synthesis Example A: Branched PPE

<Description of Synthesis Example A of branched poly(phenylene ether) for Examples>

To a 3 L two-necked eggplant flask, 5.3 g of di-μ-hydroxo-bis[(N,N,N',N'-tetramethylethylenediamine)copper(II)] chloride (Cu/TMEDA) and 5.7 mL of tetramethylethylenediamine (TMEDA) were added and sufficiently dissolved, and then oxygen was supplied thereto at 10 ml/min. 10.1 g of o-cresol, 13.8 g of 2-allyl-6-methylphenol, and 91.1 g of 2,6-dimethylphenol that are raw-material phenols were dissolved in 1.5 L of toluene to prepare a raw material solution. This raw material solution was added dropwise to the flask and reacted at 40° C. for 6 hours while being stirred at a rotational speed of 600 rpm. After completion of the reaction, the reacted product was reprecipitated with a mixed liquid of 20 L of methanol: 22 mL of concentrated hydrochloric acid, extracted by filtration, and dried at 80° C. for 24 hours, thereby obtaining a branched PPE resin. Furthermore, the slope of the conformational plot was 0.34.

The PPE resin of Synthesis Example A was soluble in various organic solvents such as cyclohexanone, N,N-dimethylformamide (DMF), and propyleneglycol monomethyl ether acetate (PMA). The number average molecular weight of the PPE resin of Synthesis Example A was 12,700 and the weight average molecular weight thereof was 77,470.

Synthesis Example B: Unbranched PPE

<Description of Synthesis Example B of poly(phenylene ether) for Comparative Examples>

An unbranched PPE resin was obtained by the same synthesis method as in the ternary copolymerized PPE resin, except that a raw material solution obtained by dissolving 13.8 g of 2-allyl-6-methylphenol and 103 g of 2,6-dimethylphenol that are raw-material phenols in 0.38 L of toluene was used. Furthermore, the slope of the conformational plot was 0.61.

The PPE resin of Synthesis Example B was not soluble in cyclohexanone and was soluble in chloroform. The number average molecular weight of the PPE resin of Synthesis Example B was 19,000 and the weight average molecular weight thereof was 39,900.

<Phosphinate Compound>

As a phosphinate compound, "EXOLIT OP935" manufactured by Clariant Chemicals Co., Ltd. was used. The used OP935 was powder having an average particle diameter of 2.5 μm.

(Preparation of Vinyl Group-Modified Phosphinate Compound (OP935))

Cyclohexanone (solid content in cyclohexanone: 70% by mass) was added to OP935, 4 wt % of vinylsilane with respect to OP935 was added, and the resultant product was treated by a bead mill for 10 minutes to obtain a vinyl group-modified OP935 solution (solid content: 70% by mass). Incidentally, as the vinylsilane, KBM-1003 manufactured by Shin-Etsu Silicone.

(Preparation of Amino Group-Modified Phosphinate Compound (OP935))

Cyclohexanone (solid content in cyclohexanone: 70% by mass) was added to OP935, 4 wt % of aminosilane with respect to OP935 was added, and the resultant product was treated by a bead mill for 10 minutes to obtain an amino group-modified OP935 solution (solid content: 70% by mass). Incidentally, as the aminosilane, KBM-573 manufactured by Shin-Etsu Silicone.

Each PPE was blended at a ratio (parts by mass) shown in Table 10-1 along with various components shown in Examples and Comparative Examples, preliminarily mixed by stirring for 15 minutes with a stirrer, and then kneaded by the triple roll mill, thereby preparing a thermosetting resin composition varnish. It was found that, since all of the phosphorus compounds used have a small degree of solubility with respect to cyclohexanone, all of the phosphorus compounds used are incompatible with the branched PPE of Synthesis Example A.

TABLE 10-1

| | Raw material | | Example 1 | Example 2 | Example 3 | Example 4 | Example 5 | Example 6 | Comparative Example 1 |
|---|---|---|---|---|---|---|---|---|---|
| PPE | PPE-ran-AllylPPF-ran-cresol (Branched PPE) | | 17.4 | 14.5 | 14.5 | 14.5 | 14.5 | 14.5 | |
| | PPE-ran-AllylPPE (Unbranched PPE) | | | | | | | | 14.5 |
| Crosslinking aid | TAIC | | 11.6 | 14.5 | 14.5 | 14.5 | 14.5 | 14.5 | 14.5 |
| Silica | SC2500-SVJ | | 94.4 | 94.4 | 94.4 | 94.4 | 94.4 | 94.4 | 94.4 |
| Elastomer | H1051 | | 11.4 | 11.4 | 11.4 | 11.4 | 11.4 | 11.4 | 11.4 |
| Phosphorus compound | OP935 (Phosphinate compound) | Untreated product | 11.1 | 11.1 | | | | | 11.1 |
| | | Surface-treated product: vinyl group-modified OP935 (solid content: 70%) | | | | 15.9 | | | |
| | | Surface-treated product: amino group-modified OP935 (solid content: 70%) | | | | | 15.9 | | |

TABLE 10-1-continued

| Raw material | | Example 1 | Example 2 | Example 3 | Example 4 | Example 5 | Example 6 | Comparative Example 1 |
|---|---|---|---|---|---|---|---|---|
| | PX-202 (Phosphoric acid ester compound) | | | | | 11.1 | | |
| | FCX-210 (Organic phosphorus-based compound) | | | | | | 11.1 | |
| Peroxide | PERBUTYL P | 0.58 | 0.58 | 0.58 | 0.58 | 0.58 | 0.58 | 0.58 |
| Solvent | Cyclohexanone | 100.0 | 100.0 | 100.0 | 100.0 | 100.0 | 100.0 | |
| | Chloroform | | | | | | | 100.0 |
| Environmental responsiveness | Evaluation | ○ | ○ | ○ | ○ | ○ | ○ | × |
| Dielectric characteristics | Dk(10 GHz) | 2.95 | 2.96 | 2.96 | 2.97 | 2.90 | 2.97 | 3.01 |
| | Df(10 GHz) | 0.0015 | 0.0016 | 0.0016 | 0.0017 | 0.0012 | 0.0017 | 0.0020 |
| | Evaluation | ○ | ○ | ○ | ○ | ○ | ○ | × |
| Glass transition temperature (° C.) | $T_g$(° C.)DMA | 202 | 201 | 200 | 200 | 175 | 190 | 194 |
| | Evaluation | ◎ | ◎ | ◎ | ◎ | ○ | ○ | ○ |
| Water absorbability (%) | Water absorbability (%) | 0.06 | 0.06 | 0.05 | 0.05 | 0.05 | 0.05 | 0.09 |
| | Evaluation | ○ | ○ | ○ | ○ | ○ | ○ | × |
| Flame retardancy | V test | Corresponding to V-0 | Corresponding to V-0 | Corresponding to V-0 | Corresponding to V-0 | Corresponding to V-1 | Corresponding to V-0 | Corresponding to V-1 |
| | Evaluation | ◎ | ◎ | ◎ | ◎ | ○ | ◎ | ○ |
| BHAST resistance | Evaluation | ○ | ○ | ○ | ○ | ○ | ○ | × |

<Production of Resin Composition Varnish of Example 1>

100 parts by mass of cyclohexanone as a solvent was added to 17.4 parts by mass of the branched PPE resin and 11.4 parts by mass of an elastomer (trade name "H1051" manufactured by Asahi Kasei Corporation), mixed and stirred at 40° C. for 30 minutes to be completely dissolved. To the PPE resin solution obtained according to this, 11.6 parts by mass of TAIC (manufactured by Mitsubishi Chemical Corporation) as a crosslinking curing agent, 94.4 parts by mass of spherical silica (trade name "SC2500-SVJ" manufactured by Admatechs Company Limited), and 11.1 g of OP935 (manufactured by Clariant Chemicals Co., Ltd.) as a flame retardant were added and mixed, and then dispersed by a triple roll mill. Finally, 0.58 parts by mass of α,α'-bis(t-butylperoxy-m-isopropyl)benzene (trade name "PERBUTYL P" manufactured by NOF CORPORATION) as a curing catalyst was blended and stirred with a magnetic stirrer. Thereby, a resin composition varnish of Example 1 was obtained.

<Production of Resin Composition Varnish of Example 2>

A resin composition varnish of Example 2 was obtained by performing the same operation as in Example 1, except that the amount of PPE and the amount of TAIC were changed to 14.5 parts by mass.

<Production of Resin Composition Varnish of Example 3>

A resin composition varnish of Example 3 was obtained by performing the same operation as in Example 2, except that the phosphinate compound was changed to 15.9 parts by mass of a vinyl group-modified phosphinate compound solution (solid content: 70%).

<Production of Resin Composition Varnish of Example 4>

A resin composition varnish of Example 4 was obtained by performing the same operation as in Example 2, except that the phosphinate compound was changed to 15.9 parts by mass of an amino group-modified phosphinate compound solution (solid content: 70%).

<Production of Resin Composition Varnish of Example 5>

A resin composition varnish of Example 5 was obtained by performing the same operation as in Example 2, except that the phosphorus compound was changed to "PX-202" manufactured by DAIHACHI CHEMICAL INDUSTRY CO., LTD.

<Production of Resin Composition Varnish of Example 6>

A resin composition varnish of Example 6 was obtained by performing the same operation as in Example 2, except that the phosphorus compound was changed to "FCX-210" manufactured by TEIJIN LIMITED.

<Production of Resin Composition Varnish of Comparative Example 1>

A resin composition varnish of Comparative Example 1 was obtained by performing the same operation as in Example 2, except that the branched PPE was changed to a conventional PPE (unbranched PPE).

Each composition varnish and each cured film obtained therefrom were evaluated by the following evaluation method. The results thereof are also shown in Table 10-1.

<Environmental Responsiveness>

A composition using cyclohexanone as a solvent was evaluated as "○", and a composition using chloroform as a solvent was evaluated as "×". As described above, the conventional PPE resin (unbranched PPE resin) was not dissolved in cyclohexanone, and the PPE resin (branched PPE resin) according to the present invention was soluble in cyclohexanone.

(Production of Cured Film)

The resin composition varnish thus obtained was applied to a shiny surface of an 18 μm-thick copper foil with an applicator so that the thickness of the cured product became a desired thickness. Next, the compositions were dried at 90° C. for 30 minutes by a hot air circulation drying furnace. Thereafter, nitrogen was completely filled by using an inert oven, the temperature was increased to 200° C., and the compositions were cured for 60 minutes. Thereafter, the copper foil was removed by etching to obtain a cured film.

<Dielectric Characteristics>

The relative dielectric constant Dk and the dielectric loss tangent Df as dielectric characteristics were measured according to the following method.

A cured film was produced according to the aforementioned method to have a thickness of 50 μm. The cured film was cut into a size of 80 mm in length, 45 mm in width, and 50 μm in thickness, this cut film was used as a test piece, and the test piece was measured by a split post dielectric resonator (SPDR) method. A measuring device used was a vector network analyzer E5071C manufactured by Keysight Technologies, an SPDR resonator was used, and a calculation program manufactured by QWED Company was used. The condition was set at a frequency of 10 GHz and at a measurement temperature of 25° C.

As for the dielectric characteristic evaluation, a case where Dk was less than 3.0 and Df was less than 0.002 was evaluated as "◎", and a case not corresponding thereto was evaluated as <Heat Resistance>

A cured film was produced according to the aforementioned method to have a thickness of 50 μm. The cured film was cut out into a size of 30 mm in length, 5 mm in width, and 50 μm in thickness, and then glass transition temperature (Tg) was measured by DMA7100 (manufactured by Hitachi High-Tech Corporation). The measurement was performed in a temperature range of 30° C. to 280° C. and at a temperature increasing rate of 5° C./min, a frequency of 1 Hz, a distortion amplitude of 7 μm, a minimum tension of 50 mN, and an inter-gripper distance of 10 mm. The glass transition temperature (Tg) was regarded as a temperature at which tan δ reaches a maximum.

A case where the glass transition temperature (Tg) was 200° C. or higher was evaluated as "◎", a case where the glass transition temperature (Tg) was 170° C. or higher and lower than 200° C. was evaluated as "○", and a case where the glass transition temperature (Tg) was lower than 170° C. was evaluated as <Water Absorbability>

Evaluation of water absorbability was performed according to IPC-TM-650 2.6.2.1. A cured film was produced according to the aforementioned method to have a thickness of 200 μm, and the cured film was cut into a size of 50 mm in length, 50 mm in width, and 200 μm in thickness to prepare three test pieces. The test piece was immersed in a water bath set at 23.5° C. for 24 hours, and water absorbability (%) was calculated from a change in weight of the coating film before and after water absorption.

A case where water absorbability was less than 0.07% was evaluated as "○", and a case where water absorbability was 0.07% or more was evaluated as <Flame Retardancy>

Evaluation of flame retardancy was performed according to Test for Flammability of Plastic Materials-UL94 of Underwriters Laboratories. A cured film was produced according to the aforementioned method to have a thickness of 200 μm, and the cured film was cut into a size of 125 mm in length, 12.5 mm in width, and 200 μm in thickness to prepare ten test pieces. Each of the five test pieces was subjected to a burning test two times (ten times in total) and then evaluated.

A case where flammability classification was V-0 was evaluated as "◎", a case where flammability classification was V-1 was evaluated as "○", and a case not corresponding thereto was evaluated as "x".

<BHAST Resistance>

ABT substrate having a comb-shaped electrode (line/space=20 μm/15 μm) formed thereon was chemically polished, and the resin varnish was applied thereto by using a lip coater so that the thickness of the cured product became 40 μm. Next, the compositions were dried at 90° C. for 30 minutes by a hot air circulation drying furnace. Thereafter, nitrogen was completely filled by using an inert oven, the temperature was increased to 200° C., and the composition was cured for 60 minutes to produce an evaluation substrate. The evaluation substrate was placed in a high-temperature high-humidity chamber under an atmosphere having a temperature of 130° C. and a humidity of 85% and charged with a voltage of 5.5 V to perform an in-chamber HAST test. The in-chamber insulation resistance value of the cured film of the resin layer after elapse of 300 hours was evaluated based on the following criteria.

A case where the in-chamber insulation resistance value after elapse of 300 hours was $10^7 \Omega$ or more was evaluated as "○", and a case where the in-chamber insulation resistance value after elapse of 300 hours was less than $10^7 \Omega$.

Example XI

<Synthesis of Branched PPE>

To a 3 L two-necked eggplant flask, 2.6 g of di-μ-hydroxo-bis[(N,N,N',N'-tetramethylethylenediamine)copper(II)] chloride (Cu/TMEDA) and 3.18 mL of tetramethylethylenediamine (TMEDA) were added and sufficiently dissolved, and then oxygen was supplied thereto at 10 ml/min. 105 g of 2,6-dimethylphenol and 13 g of 2-allylphenol that are raw-material phenols were dissolved in 1.5 L of toluene to prepare a raw material solution. This raw material solution was added dropwise to the flask and reacted at 40° C. for 6 hours while being stirred at a rotational speed of 600 rpm. After completion of the reaction, the reacted product was reprecipitated with a mixed liquid of 20 L of methanol. 22 mL of concentrated hydrochloric acid, extracted by filtration, and dried at 80° C. for 24 hours, thereby obtaining a branched PPE. The branched PPE was soluble in various organic solvents such as cyclohexanone, N-methylpyrrolidone (NMP), and tetrahydrofuran (THF). The number average molecular weight of the branched PPE was 20,000 and the weight average molecular weight thereof was 60,000. Furthermore, the slope of the conformational plot was 0.31.

<Synthesis of Unbranched PPE>

An unbranched PPE was obtained based on the same synthesis method as in the branched PPE, except that a raw material solution obtained by dissolving 7.6 g of 2-allyl-6-methylphenol and 34 g of 2,6-dimethylphenol that are raw-material phenols in 0.23 L of toluene was added to 34 mL of water. The unbranched PPE was not soluble in cyclohexanone and was soluble in chloroform. The number average molecular weight of the unbranched PPE was 1,000 and the weight average molecular weight thereof was 2,000.

Each PPE was blended at a ratio (parts by mass) shown in Table 11-1 along with various components shown in Examples, Comparative Example, and Reference Example preliminarily mixed by stirring for 15 minutes with a stirrer, and then kneaded by the triple roll mill, thereby preparing a thermosetting resin composition.

Each composition varnish and each cured film obtained therefrom were evaluated by the following evaluation method. The results thereof are also shown in Table 11-1.

<Environmental Responsiveness>

As for the environmental responsiveness evaluation, a composition using cyclohexanone as a solvent was evaluated as "○", and a composition using chloroform as a solvent was evaluated as "x".

<Adhesion (Peeling Strength)>

The adhesion (peeling strength with respect to a low-roughness copper foil) was measured according to the standard for test methods of copper-clad laminates JIS-C-6481. The resin composition was applied to a roughened surface of a low-roughness copper foil (FV-WS (manufactured by Furukawa Electric Co., Ltd.): Rz=1.5 μm) so that the thickness of the cured product became 50 μm, and the resin composition was dried at 90° C. for 30 minutes by a hot air circulation drying furnace. Thereafter, nitrogen was completely filled by using an inert oven, the temperature was increased to 200° C., and the composition was cured for 60 minutes. An epoxy adhesive (Araldite) was applied to the side of the cured film thus obtained, a copper-clad laminate (length: 150 mm, width: 100 mm, thickness: 1.6 mm) was placed thereon, and the resultant product was cured at 60° C. for 1 hour by the hot air circulation drying furnace. Next, a cut having a width of 10 mm and a length of 100 mm was formed in the low-roughness copper foil, this one end was peeled off and gripped by a gripper, and then 900 peeling strength measurement was performed.

[Measurement Conditions]

Tester: Tensile Tester EZ-SX (manufactured by SHIMADZU CORPORATION)
Measurement temperature: 25° C.
Stroke: 35 mm
Stroke speed: 50 mm/min
Number of times of measurement: Calculating an average value of five times A case where the 90° peeling strength was 7.0 N/cm or more was evaluated as "⊚", a case where the 90° peeling strength was 6.0 N/cm or more was evaluated as "○", a case where the 90° peeling strength was 2 or more and less than 6.0 N/cm was evaluated as "Δ", and a case where the 90° peeling strength was less than 2 was evaluated as "x".

(Production of Cured Film)

The resin composition varnish thus obtained was applied to a shiny surface of an 18 μm-thick copper foil with an applicator so that the thickness of the cured product became 50 μm. Next, the compositions were dried at 90° C. for 30 minutes by a hot air circulation drying furnace. Thereafter, nitrogen was completely filled by using an inert oven, the temperature was increased to 200° C., and the compositions were cured for 60 minutes. Thereafter, the copper foil was removed by etching to obtain a cured film. This cured film was used and the following evaluation was performed.

<Compatibility>

As for compatibility in the coating film thus obtained, a case where unevenness was observed in the coating film by visual inspection was evaluated as "○", and a case where unevenness was not observed in the coating film by visual inspection was evaluated as "x".

<Elongation at Breakage and Tensile Strength>

The cured film was cut out into a size of 8 cm in length, 0.5 cm in width, and 50 μm in thickness, and then the tensile elongation at breakage and the tensile strength (tensile strength at breakage) were measured under the following conditions.

[Measurement Conditions]

Tester: Tensile Tester EZ-SX (manufactured by SHIMADZU CORPORATION)
Inter-chuck distance: 50 mm
Test rate: 1 mm/min
Elongation calculation: (Tensile movement amount/Inter-chuck distance)×100

A case where the tensile elongation at breakage was 4.0% or more was evaluated as "⊚", a case where the tensile elongation at breakage was 3.5% or more was evaluated as "○", a case where the tensile elongation at breakage was 1.0% or more and less than 3.5% was evaluated as "Δ", and a case where the tensile elongation at breakage was less than 1.0% was evaluated as "x".

A case where the tensile strength was 70 MPa or more was evaluated as "⊚", a case where the tensile strength was 60 MPa or more was evaluated as "○", a case where the tensile strength was 20 MPa or more and less than 60 MPa was evaluated as "Δ", and a case where the tensile strength was less than 20 MPa was evaluated as "x".

<Dielectric Characteristics>

The dielectric loss tangent Df as dielectric characteristics was measured according to the following method.

The cured film was cut into a size of 80 mm in length, 45 mm in width, and 50 μm in thickness, this cut film was used as a test piece, and the test piece was measured by a split post dielectric resonator (SPDR) method. A measuring device used was a vector network analyzer E5071C manufactured by Keysight Technologies, an SPDR resonator was used, and a calculation program manufactured by QWED Company was used. The condition was set at a frequency of 10 GHz and at a measurement temperature of 25° C.

As for the dielectric characteristic evaluation, a case where Df was less than 0.01 was evaluated as "○", and a case where Df was 0.01 or more was evaluated as "x".

<Heat Resistance>

Heat resistance was evaluated by a glass transition temperature. The cured film was cut out into a size of 30 mm in length, 5 mm in width, and 50 μm in thickness, and then glass transition temperature (Tg) was measured by DMA7100 (manufactured by Hitachi High-Tech Corporation). The measurement was performed in a temperature range of 30° C. to 280° C. and at a temperature increasing rate of 5° C./min, a frequency of 1 Hz, a distortion amplitude of 7 μm, a minimum tension of 50 mN, and an inter-gripper distance of 10 mm. The glass transition temperature (Tg) was regarded as a temperature at which tan δ reaches a maximum.

A case where the glass transition temperature (g) was 2200C or higher was evaluated as "⊚", a case where the glass transition temperature (Tg) was 200C or higher was evaluated as "○", a case where the glass transition temperature (Tg) was 170° C. or higher and lower than 200° C. was evaluated as "Δ", and a case where the glass transition temperature (Tg) was lower than 170° C. was evaluated as "x".

TABLE 11-1

| | Composition | Example 1 | Example 2 | Example 3 | Comparative Example 1 | Reference Example 1 |
|---|---|---|---|---|---|---|
| Thermosetting PPE resin | Branched PPE Mn = 20,000 (2,6-DMP: 2-AP = 90:10) | 50 | 50 | 50 | | 100 |
| | Unbranched PPE Mn = 1,000 (2,6-DMP: 2-AMP = 90:10) | | | | 50 | |
| Crosslinking aid | Cyanate ester resin 1 (manufacture by MITSUBISHI GAS CHEMICAL COMPANY, INC.: TA) | 50 | | | | |
| | Cyanate ester resin 2 (manufacture by MITSUBISHI GAS CHEMICAL COMPANY, INC.: NCN) | | 50 | | 50 | |

TABLE 11-1-continued

| Composition | | Example 1 | Example 2 | Example 3 | Comparative Example 1 | Reference Example 1 |
|---|---|---|---|---|---|---|
| | Cyanate ester resin 3 (manufacture by MITSUBISHI GAS CHEMICAL COMPANY, INC.: A-211) | | | 50 | | |
| Curing catalyst | Zinc octylate | 0.05 | 0.05 | 0.05 | 0.05 | |
| | PERBUTYL P | | | | | 2 |
| Solvent | Cyclohexanone | 100 | 100 | 100 | | 100 |
| | Chloroform | | | | 100 | |
| Environmental responsiveness | Evaluation | ○ | ○ | ○ | × | ○ |
| Compatibility | Evaluation | ○ | ○ | ○ | × | ○ |
| Elongation at breakage | % | 4.9 | 4.3 | 4.2 | 0.3 | 3.4 |
| | Evaluation | ◎ | ◎ | ◎ | × | ○ |
| Tensile strength | Mpa | 84 | 71 | 75 | 5 | 60 |
| | Evaluation | ◎ | ◎ | ◎ | × | ○ |
| Dielectric characteristics | Dk (10 GHz) | 2.7 | 2.8 | 2.8 | 2.9 | 2.5 |
| | Df (10 GHz) | 0.006 | 0.005 | 0.008 | 0.01 | 0.003 |
| | Evaluation | ○ | ○ | ○ | × | ○ |
| Heat resistance | Tg | 240 | 240 | 240 | 168 | 200 |
| | Evaluation | ◎ | ◎ | ◎ | × | ○ |
| Peeling strength | N/cm | 8.1 | 7.6 | 7.7 | 1.9 | 6.3 |
| | Evaluation | ◎ | ◎ | ◎ | × | ○ |

Example XII

<<<Production of poly(phenylene ether)>>>
<<Synthesis of PPE-1>>

To a 3 L two-necked eggplant flask, 2.6 g of di-ja-hydroxo-bis[(N,N,N',N'-tetramethylethylenediamine)copper(II)] chloride (Cu/TMEDA) and 3.18 mL of tetramethylethylenediamine (TMEDA) were added and sufficiently dissolved, and then oxygen was supplied thereto at 10 ml/min. 105 g of 2,6-dimethylphenol and 4.89 g of ortho-cresol that are raw-material phenols were dissolved in 1.5 L of toluene to prepare a raw material solution. This raw material solution was added dropwise to the flask and reacted at 40° C. for 6 hours while being stirred at a rotational speed of 600 rpm. After completion of the reaction, the reacted product was reprecipitated with a mixed liquid of 20 L of methanol: 22 mL of concentrated hydrochloric acid, extracted by filtration, and dried at 80° C. for 24 hours, thereby obtaining PPE-1.

<<Synthesis of PPE-2>>

To a 1 L two-necked eggplant flask equipped with a dropping funnel, 50 g of PPE-1, 4.8 g of allyl bromide as a compound for modification, and 300 mL of NMP were added, and then stirred at 60° C. 5 mL of 5 M aqueous NaOH solution was added dropwise to this solution. Thereafter, the resultant solution was further stirred at 60° C. for 5 hours. Next, the reaction solution was neutralized with hydrochloric acid, then reprecipitated in 5 L of methanol, extracted by filtration, washed three times with a mixed liquid of methanol and water at a mass ratio of 80:20, and then dried at 80° C. for 24 hours, thereby obtaining PPE-2.

<<Synthesis of PPE-3>>

PPE-3 was obtained based on the same synthesis method as in PPE-1, except that a raw material solution obtained by dissolving 42 g of 2,6-dimethylphenol that is a raw-material phenol in 0.23 L of toluene was used. PPE-3 was insoluble in cyclohexanone and was soluble only in chloroform.

<<Synthesis of PPE-4>>

PPE-3 was modified based on the same synthesis method as in PPE-2 to obtain PPE-4, except that 2.4 g of allyl bromide, 0.7 g of benzyltributylammonium bromide as a phase transfer catalyst, 250 mL of toluene as a solvent, and 40 mL of a 1 M aqueous NaOH solution were used.

<<<Properties of poly(phenylene ether)>>>

The terminal hydroxyl value, the molecular weights (Mn and PDI), the slope of the conformational plot, and the like of each poly(phenylene ether) are shown in Table 12-1. Incidentally, the terminal hydroxyl value was measured according to the following method.

<<Measurement of Number of Terminal Hydroxyl Groups>>

About 2.0 g of the sample was precisely weighed in a two-necked flask, 10 mL of pyridine was added thereto and completely dissolved, 5 mL of an acetylating agent (a solution obtained by dissolving 25 g of acetic anhydride with pyridine to have a volume of 100 mL) was further accurately added, the mixture was heated at 60° C. for 2 hours, and thereby acetylization of the hydroxyl group was performed. After completion of the reaction, 10 mL of pyridine was added to the reaction mother liquor to perform diluting, purification by reprecipitation was performed in 200 mL of warm water, and thereby unreacted acetic anhydride was decomposed. Further, the two-necked flask was washed using 5 mL of ethanol. Several drops of a phenolphthalein solution were added as an indicator to warm water purified by reprecipitation, the solution was subjected to titration using 0.5 mol/L of a potassium hydroxide ethanol solution, and the titration was terminated at the time at which pale pink of the indicator was continued for 30 second. Furthermore, in a blank test, the same operation was performed without inputting a sample. The hydroxyl value, the hydroxyl group equivalent, and the number of hydroxyl groups per one molecule were obtained by the following equations (unit: mgKOH/g).

$$\text{Hydroxyl value (mgKOH/g)} = [\{(b-a) \times F \times 28.05\}/S] + D$$

Provided that,
S: Sample amount (g)
a: Consumed amount (mL) of 0.5 mol/L of the potassium hydroxide ethanol solution
b: Consumed amount (mL) of 0.5 mol/L of the potassium hydroxide ethanol solution in the blank test
F: Factor of 0.5 mol/L of the potassium hydroxide ethanol solution D: Acid value (mgKOH/g)

Hydroxyl group equivalent (g/eq.)=56.1/Hydroxyl value×1000

Number of hydroxyl groups per one molecule (number)=Mn/Hydroxyl group equivalent compositions were cured for 60 minutes. Thereafter, the copper foil was peeled off to obtain a cured film.

<Tensile Strength>>

The cured film was cut out into a size of 8 cm in length, 0.5 cm in width, and 50 μm in thickness and then measured

TABLE 12-1

|  |  | PPE-1 | PPE-2 | PPE-3 | PPE-4 |
|---|---|---|---|---|---|
| Phenol monomer (mol %) | 2,6-DMP | 95 | 95 | 100 | 100 |
|  | o-cresol | 5 | 5 |  |  |
| Terminal | Functional group | OH | Allyl | OH | Allyl |
|  | Hydroxyl value (mgKOH/g) | 13 | 0 | 2.8 | 0 |
|  | Number of functional groups per one molecule (OH) | 4.5 | 0 | 1 | 0 |
|  | Number of functional groups per one molecule (Allyl) | 0 | 4.5 | 0 | 1 |
|  | Mn | 19,000 | 19,000 | 20,000 | 20,000 |
|  | PDI | 3.5 | 3.5 | 2.1 | 2.1 |
| Solubility | Chloroform | ◎ | ◎ | ◎ | ◎ |
|  | Toluene | ◎ | ◎ | ○ | ○ |
|  | Cyclohexanone | ◎ | ◎ | X | X |
|  | NMP | ○ | ○ | X | X |
|  | THF | ◎ | ◎ | X | X |
|  | PMA | ○ | ○ | X | X |
|  | CA | ○ | ○ | X | X |
|  | Methyl ethyl ketone | ○ | ○ | X | X |
|  | Ethyl acetate | ○ | ○ | X | X |
|  | Slope of conformational plot | 0.33 | 0.33 | 0.63 | 0.63 |
|  | Shape of polymer | Branched | Branched | Unbranched | Unbranched |

<<Evaluation Test>>>

Each poly(phenylene ether) was subjected to the following evaluation test. The evaluation results are shown in Table 12-1 or Table 12-2.

<Solubility>>

Each synthetic product was subjected to a solubility test with respect to chloroform, toluene, cyclohexanone, N-methyl-2-pyrrolidone (NMP), tetrahydrofuran (THF), propyleneglycol monomethyl ether acetate (PMA), diethylene glycol monoethyl ether acetate (CA), methyl ethyl ketone, and ethyl acetate.

To a 200 mL sample bottle, 100 g of various solvents and various synthetic products were input, stirred using a stirring bar for 10 minutes, and then left to stand at 25° C. for 10 minutes. The solution was observed by visual inspection and solubility was evaluated.

<Evaluation Criteria>

◎: The solution obtained by dissolving 1 g of the synthetic product is transparent.

○: The solution obtained by dissolving 0.01 g of the synthetic product is transparent.

Δ: There is turbidity in the solution obtained by dissolving 0.01 g of the synthetic product is transparent.

x: There is a precipitate in the solution obtained by dissolving 1 g of the synthetic product.

<<<Production of Cured Product (Cured Film)>>

Various components shown in Examples, Comparative Example, and Reference Example were blended at a ratio (parts by mass) shown in Table 12-2, preliminarily mixed by stirring for 15 minutes with a stirrer, and then kneaded by the triple roll mill, thereby preparing a thermosetting resin composition. The resin composition varnish thus obtained was applied to a shiny surface of an 18 μm-thick copper foil with an applicator so that the thickness of the cured product became 50 μm. Next, the compositions were dried at 90° C. for 30 minutes by a hot air circulation drying furnace. Thereafter, nitrogen was completely filled by using an inert oven, the temperature was increased to 200° C., and the by using EZ-SX manufactured by SHIMADZU CORPORATION at an inter-chuck distance of 50 mm and a test rate of 1 mm/min.

<Tensile Strength>

The tensile strength was evaluated based on the following evaluation criteria.

(Evaluation Criteria)

◎: The tensile strength was 40 MPa or more.

○: The tensile strength was 20 MPa or more and less than 40 MPa.

x: The tensile strength was less than 20 MPa.

<Dielectric Characteristics>

The relative dielectric constant Dk and the dielectric loss tangent Df as dielectric characteristics were measured according to the following method. The cured film, which was cut into a size of 80 mm in length, 45 mm in width, and 50 μm in thickness, was used as a test piece, and the test piece was measured by a split post dielectric resonator (SPDR) method. A measuring device used was a vector network analyzer E5071C manufactured by Keysight Technologies, an SPDR resonator was used, and a calculation program manufactured by QWED Company was used. The condition was set at a frequency of 10 GHz and at a measurement temperature of 25° C.

(Evaluation Criteria)

◎: Dk was less than 2.7.

○: Dk was 2.7 or more and less than 3.0.

x: Dk was 3.0 or more.

<Crack Resistance (Cooling and Heating Cycle Test)>>

Each resin composition varnish thus obtained was applied to a matte surface of an 18 μm-thick copper foil with an applicator so that the thickness of the cured product became 50 μm, and was dried at 90° C. for 30 minutes by a hot air circulation drying furnace, thereby producing a resin sheet with a copper foil composed of each resin composition. Then, the resin sheet with a copper foil was laminated on a bismaleimide triazine (BT) resin copper-clad laminate at a temperature of 90° C. by using a vacuum laminator (CVP- 600 manufactured by Nikko-Materials Co., Ltd.), nitrogen was then completely filled by using an inert oven, the temperature was increased to 200° C., and the resin sheet was cured for 60 minutes. Subsequently, the copper foil part was etched to form a comb-shaped circuit having a conductor circuit width of 50 μm and a width between conductor circuits of 200 μm. Thereafter, a resin sheet with a copper foil composed of the same resin composition was laminated on this conductor circuit under the same conditions as described above and then cured. Then, the outermost copper foil part was etched to form a comb-shaped circuit perpendicularly intersecting the underlying conductor circuit and having a conductor circuit width of 50 μm and a width between conductor circuits of 200 μm. The substrate for a cooling and heating cycle test produced in this way was put in a cooling and heating cycler which has a working temperature cycle between −65° C. and 150° C. to perform a cooling and heating cycle test. Then, appearance of the substrate was observed after 600 cycles, 800 cycles, and 1000 cycles.

(Evaluation Criteria)
⊚: No problem after 1000 cycles.
◯: No problem after 800 cycles, but cracks occurred at 1000 cycles.
Δ: No problem after 600 cycles, but cracks occurred at 800 cycles.
x: Cracks occurred after 600 cycles.

<<Light Resistance (Light Resistance Test)>>

Each resin composition varnish thus obtained was applied to a PET film with an applicator so that the thickness of the cured product became 50 μm, and was dried at 90° C. for 30 minutes by a hot air circulation drying furnace, thereby producing a resin sheet with a copper foil composed of each resin composition. Then, the resin sheet with a copper foil was laminated on a bismaleimide triazine (BT) resin copper-clad laminate at a temperature of 90° C. by using a vacuum laminator (CVP-600 manufactured by Nikko-Materials Co., Ltd.), the PET film was peeled off, nitrogen was then completely filled by using an inert oven, the temperature was increased to 200° C., and the resin sheet was cured for 60 minutes, thereby obtaining a test piece.

The test piece was repeatedly irradiated with UV light 100 times by using a conveyor type UV irradiation machine QRM-2082-E-01 (manufactured by ORC MANUFACTURING CO., LTD.) under conditions of a metal halide lamp, a cold mirror, 80 W/cm×three lamps, and a conveyor speed of 6.5 μm/min (accumulated amount of light: 1000 mJ/cm$^2$). The test piece was observed by visual inspection.

(Evaluation Criteria)
⊚: Yellowing was not confirmed by visual inspection.
x: Yellowing was confirmed by visual inspection.

<<Environment Resistance (High Temperature High Humidity Test)>>

The cured film having a size of 5 cm×5 cm was stored for 30 days at 85° C. and 85%. Dielectric characteristics before and after a high temperature high humidity test were measured.

(Evaluation Criteria)
⊚: The increase rate of Df was less than 100%.
◯: The increase rate of Df was 100% or more and less than 200%.
x: The increase rate of Df was 200% or more.

TABLE 12-2

| | | Example 1 | Example 2 | Reference Example 1 | Reference Example 2 | Comparative Example 1 | Comparative Example 2 | Comparative Example 3 | Comparative Example 4 |
|---|---|---|---|---|---|---|---|---|---|
| PPE | PPE-2 (Branched, terminal allyl) | 15 | 15 | | | | | | |
| | PPE-1 (Branched, terminal OH) | | | 15 | 15 | | | | |
| | PPE-4 (Unbranched, terminal allyl) | | | | | 15 | 15 | | |
| | PPE-3 (Unbranched, terminal OH) | | | | | | | 15 | 15 |
| Crosslinking aid | TAIC | 15 | | 15 | | 15 | | 15 | |
| | Divinylbenzene | | 15 | | 15 | | 15 | | 15 |
| Adhesion-imparting agent | Tuftec (H1051 manufactured by Asahi Kasei Corporation) | 10 | 10 | 10 | 10 | 10 | 10 | 10 | 10 |
| Inorganic filler | Silica (SC2500-SVJ manufactured by Admatechs Company Limited) | 60 | 60 | 60 | 60 | 60 | 60 | 60 | 60 |
| Initiator | PERBUTYL P | 2 | 2 | 2 | 2 | 2 | 2 | 2 | 2 |
| Solvent | Cyclohexanone | 100 | 100 | 100 | 100 | | | | |
| | Chloroform | | | | | 100 | 100 | 100 | 100 |
| Dielectric characteristics | Dk | 2.6 | 2.6 | 2.8 | 2.9 | 3.0 | 3.0 | 3.1 | 3.1 |
| | Df | 0.0015 | 0.0015 | 0.0017 | 0.0017 | 0.0018 | 0.0018 | 0.0019 | 0.0019 |
| | Evaluation | ⊚ | ⊚ | ◯ | ◯ | Δ | Δ | Δ | Δ |
| Strength | Tensile strength (Mpa) | 48 | 40 | 38 | 25 | 10 | 5 | 11 | 5 |
| | Evaluation | ⊚ | ⊚ | ◯ | ◯ | x | x | x | x |
| Crack resistance | | ⊚ | ⊚ | Δ | Δ | x | x | x | x |
| Light resistance | | ⊚ | ⊚ | x | x | x | x | x | x |
| Environment resistance | | ⊚ | ⊚ | x | x | ◯ | ◯ | x | x |

It can be understood from Examples I to XII described above that a poly(phenylene ether), which is obtained from one or more raw-material phenols satisfying at least Requirement 1 and has a slope of a conformational plot of less than 0.6, and a composition containing the poly(phenylene ether) are useful from the viewpoints of low-dielectric characteristics and solubility in a solvent.

The invention claimed is:

1. A poly(phenylene ether) obtained from at least one raw material phenol, wherein the at least one raw material phenol includes a phenol having hydrogen atoms in the ortho and para positions, and the poly(phenylene ether) has a slope calculated from a conformational plot of less than 0.6 and has a functional group including an unsaturated carbon bond, and the at least one raw-material phenol includes a phenol having hydrogen atoms in the ortho and para positions and a functional group including an unsaturated carbon bond, or a mixture of a phenol having hydrogen atoms in the ortho and para positions and a phenol having a hydrogen atom in the para position and a functional group including an unsaturated carbon bond.

2. The poly(phenylene ether) according to claim 1, wherein the poly(phenylene ether) is a terminal-modified poly(phenylene ether) in which a terminal hydroxyl group is modified.

3. The poly(phenylene ether) according to claim 1, wherein the at least one raw material phenol includes a phenol that is a polyhydric phenol having two or more phenolic hydroxyl groups in a molecular structure and does not have a hydrogen atom in the ortho position of the phenolic hydroxyl group.

4. The poly(phenylene ether) according to claim 1, wherein the poly(phenylene ether) is a side-chain epoxidized poly(phenylene ether) in which a part or the whole of the unsaturated carbon bond derived from the at least one raw-material phenol including the a phenol having hydrogen atoms in the ortho and para positions and a functional group including an unsaturated carbon bond or the at least one raw-material phenol including a phenol having a hydrogen atom in the para position and a functional group including an unsaturated carbon bond is epoxidized.

5. A curable composition, comprising:
the poly(phenylene ether) claim 1; and
at least one of silica, a cellulose nanofiber, a phosphorus compound incompatible with the poly(phenylene ether), an epoxy resin and an elastomer having a reactive functional group that reacts with an epoxy group, a cyanate ester resin, and an elastomer and a dispersant.

6. A dry film or prepreg obtained by a process comprising applying the curable composition of claim 5 to a base material.

7. A cured product obtained by a process comprising curing the curable composition of claim 5.

8. A laminate, comprising:
the cured product of claim 7.

9. An electronic component, comprising:
the cured product of claim 7.

10. The poly(phenylene ether) according to claim 1, wherein the poly(phenylene ether) has a slope calculated from a conformational plot in a range of less than 0.6 to 0.05.

11. The poly(phenylene ether) according to claim 1, wherein the poly(phenylene ether) has a slope calculated from a conformational plot in a range of less than 0.6 to 0.10.

12. The poly(phenylene ether) according to claim 1, wherein the poly(phenylene ether) has a slope calculated from a conformational plot in a range of less than 0.6 to 0.15.

13. The poly(phenylene ether) according to claim 1, wherein the poly(phenylene ether) has a slope calculated from a conformational plot in a range of less than 0.6 to 0.20.

14. The poly(phenylene ether) according to claim 1, wherein the poly(phenylene ether) has a slope calculated from a conformational plot of 0.55 or less.

15. The poly(phenylene ether) according to claim 1, wherein the poly(phenylene ether) has a slope calculated from a conformational plot of 0.50 or less.

16. The poly(phenylene ether) according to claim 1, wherein the poly(phenylene ether) has a slope calculated from a conformational plot of 0.45 or less.

17. The poly(phenylene ether) according to claim 1, wherein the poly(phenylene ether) has a slope calculated from a conformational plot of 0.40 or less.

18. The poly(phenylene ether) according to claim 1, wherein the poly(phenylene ether) obtained by a process comprising polymerizing the at least one raw material phenol such that the poly(phenylene ether) has the slope calculated from a conformational plot of less than 0.6.

19. The poly(phenylene ether) according to claim 2, wherein the poly(phenylene ether) has a slope calculated from a conformational plot in a range of less than 0.6 to 0.05.

* * * * *